US012435150B2

United States Patent
Espie et al.

(10) Patent No.: US 12,435,150 B2
(45) Date of Patent: Oct. 7, 2025

(54) ANTI-CD40 ANTIBODIES FOR USE IN TREATMENT OF HIDRADENITIS SUPPURATIVA

(71) Applicant: NOVARTIS AG, Basel (CH)

(72) Inventors: Pascal Espie, Saint Louis (FR); Christian Loesche, Hegenheim (FR); Lukas Roth, Riehen (CH); James Rush, Thalwil (CH); Grazyna Wieczorek, Schönenbuch (CH)

(73) Assignee: NOVARTIS AG, Basel (CH)

( * ) Notice: Subject to any disclaimer, the term of this patent is extended or adjusted under 35 U.S.C. 154(b) by 981 days.

(21) Appl. No.: 17/422,075

(22) PCT Filed: Jan. 9, 2020

(86) PCT No.: PCT/IB2020/050132
§ 371 (c)(1),
(2) Date: Jul. 9, 2021

(87) PCT Pub. No.: WO2020/144605
PCT Pub. Date: Jul. 16, 2020

(65) Prior Publication Data
US 2022/0098315 A1    Mar. 31, 2022

(30) Foreign Application Priority Data

Jan. 11, 2019   (EP) .................... 19151461

(51) Int. Cl.
| | | |
|---|---|---|
| *A61K 39/395* | (2006.01) | |
| *A61K 9/00* | (2006.01) | |
| *A61P 17/00* | (2006.01) | |
| *C07K 16/28* | (2006.01) | |
| *A61K 39/00* | (2006.01) | |

(52) U.S. Cl.
CPC ........ *C07K 16/2878* (2013.01); *A61K 9/0019* (2013.01); *A61K 39/3955* (2013.01); *A61P 17/00* (2018.01); *A61K 2039/505* (2013.01); *A61K 2039/54* (2013.01); *A61K 2039/545* (2013.01); *C07K 2317/21* (2013.01); *C07K 2317/33* (2013.01); *C07K 2317/71* (2013.01); *C07K 2317/76* (2013.01); *C07K 2317/77* (2013.01); *C07K 2317/92* (2013.01)

(58) Field of Classification Search
CPC .. A61K 39/3955; C07K 16/2878; A61P 17/00
See application file for complete search history.

(56) References Cited

U.S. PATENT DOCUMENTS 8,828,396 B2 * 9/2014 Heusser ............. C07K 16/2878
                                                424/152.1
2016/0347850 A1 * 12/2016 Benatuil ................. A61P 19/02

FOREIGN PATENT DOCUMENTS

| JP | 2014500720 A | 1/2014 |
|---|---|---|
| JP | 2018520654 A | 8/2018 |
| RU | 2355421 C2 | 5/2009 |
| WO | 2005063289 A1 | 7/2005 |
| WO | 2012065950 A1 | 5/2012 |
| WO | 2012121988 A2 | 9/2012 |
| WO | 2016196314 A1 | 12/2016 |
| WO | 2019106608 A1 | 6/2019 |

OTHER PUBLICATIONS

Argiriadi et al., BMC Molecular and Cell Biology, Aug. 5, 2019, vol. 20:29.*
Angelo V. Marzano et al "Association of Pyoderma Gangrenosum, Acne, and Suppurative Hidradenitis (PASH) Shares Genetic and Cytokine Profiles with other autoinflammatory diseases", Medicine vol. 93, No. 27, p. e187, (2014) XP055596501.
Jacinda Ristov et al "Characterization of the in vitro and in vivo properties of CFZ533, a blocking and non-depleting anti-CD40 monoclonal antibody", American Journal of Transplantation, vol. 18, No. 12, pp. 2895-2904, (2018) XP055601705.
F. Cordoba et al "A Novel, Blocking, Fc-Silent Anti-CD40 Monoclonal Antibody Prolongs Nonhuman Primate Renal Allograft Survival in the Absence of B Cell Depletion: Novel CD40 mAb Prolongs Allograft Survival", American Journal of Transplantation, vol. 15, No. 11, pp. 2825-2836, XP055542299, (2015).
Novartis: "Meeting Novartis Management NIBR", XP055596516, retrieved from the internet.
Clinicaltrials: "ClinicalTrials.gov: Study of Efficacy and Safety of Investigational Treatements in Pateients with Moderate to Severe Hidradenitis Suppurative", XP055596488, tretrieved form the internet, (2019).
Angelo Marzano et al: "Mechanisms of Inflammation in Neutrophil-Mediated Skin Diseases", Frontiers in Immunology, vol. 10, p. 1059, XP055602227, (2019).

* cited by examiner

*Primary Examiner* — Xiaozhen Xie
(74) *Attorney, Agent, or Firm* — David Goetz

(57) ABSTRACT

The disclosure relates to methods, treatment regimens, uses, kits and therapies for treating hidradenitis suppurativa, by employing CD40 antagonists, such as anti-CD40 antibodies.

4 Claims, 11 Drawing Sheets

Specification includes a Sequence Listing.

A

B

C

SEQUENCE LISTING

```
<160> NUMBER OF SEQ ID NOS: 19

<210> SEQ ID NO 1
<211> LENGTH: 5
<212> TYPE: PRT
<213> ORGANISM: Homo sapiens

<400> SEQUENCE: 1

Ser Tyr Gly Met His
1               5

<210> SEQ ID NO 2
<211> LENGTH: 17
<212> TYPE: PRT
<213> ORGANISM: Homo sapiens

<400> SEQUENCE: 2

Val Ile Ser Tyr Glu Glu Ser Asn Arg Tyr His Ala Asp Ser Val Lys
1               5                   10                  15

Gly

<210> SEQ ID NO 3
<211> LENGTH: 11
<212> TYPE: PRT
<213> ORGANISM: Homo Sapiens

<400> SEQUENCE: 3

Asp Gly Gly Ile Ala Ala Pro Gly Pro Asp Tyr
1               5                   10

<210> SEQ ID NO 4
<211> LENGTH: 16
<212> TYPE: PRT
<213> ORGANISM: Homo sapiens

<400> SEQUENCE: 4

Arg Ser Ser Gln Ser Leu Leu Tyr Ser Asn Gly Tyr Asn Tyr Leu Asp
1               5                   10                  15

<210> SEQ ID NO 5
<211> LENGTH: 7
<212> TYPE: PRT
<213> ORGANISM: Homo sapiens

<400> SEQUENCE: 5

Leu Gly Ser Asn Arg Ala Ser
1               5

<210> SEQ ID NO 6
<211> LENGTH: 9
<212> TYPE: PRT
<213> ORGANISM: Homo sapiens

<400> SEQUENCE: 6

Met Gln Ala Arg Gln Thr Pro Phe Thr
1               5

<210> SEQ ID NO 7
<211> LENGTH: 120
<212> TYPE: PRT
<213> ORGANISM: Homo sapiens

<400> SEQUENCE: 7

Gln Val Gln Leu Val Glu Ser Gly Gly Gly Val Val Gln Pro Gly Arg
```

```
1               5                   10                  15
Ser Leu Arg Leu Ser Cys Ala Ala Ser Gly Phe Thr Phe Ser Ser Tyr
            20                  25                  30

Gly Met His Trp Val Arg Gln Ala Pro Gly Lys Gly Leu Glu Trp Val
            35                  40                  45

Ala Val Ile Ser Tyr Glu Glu Ser Asn Arg Tyr His Ala Asp Ser Val
            50                  55                  60

Lys Gly Arg Phe Thr Ile Ser Arg Asp Asn Ser Lys Ile Thr Leu Tyr
65                  70                  75                  80

Leu Gln Met Asn Ser Leu Arg Thr Glu Asp Thr Ala Val Tyr Tyr Cys
            85                  90                  95

Ala Arg Asp Gly Gly Ile Ala Ala Pro Gly Pro Asp Tyr Trp Gly Gln
            100                 105                 110

Gly Thr Leu Val Thr Val Ser Ser
            115                 120

<210> SEQ ID NO 8
<211> LENGTH: 112
<212> TYPE: PRT
<213> ORGANISM: Homo sapeins

<400> SEQUENCE: 8

Asp Ile Val Met Thr Gln Ser Pro Leu Ser Leu Thr Val Thr Pro Gly
1               5                   10                  15

Glu Pro Ala Ser Ile Ser Cys Arg Ser Ser Gln Ser Leu Leu Tyr Ser
            20                  25                  30

Asn Gly Tyr Asn Tyr Leu Asp Trp Tyr Leu Gln Lys Pro Gly Gln Ser
            35                  40                  45

Pro Gln Val Leu Ile Ser Leu Gly Ser Asn Arg Ala Ser Gly Val Pro
            50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Met Gln Ala
            85                  90                  95

Arg Gln Thr Pro Phe Thr Phe Gly Pro Gly Thr Lys Val Asp Ile Arg
            100                 105                 110

<210> SEQ ID NO 9
<211> LENGTH: 450
<212> TYPE: PRT
<213> ORGANISM: Homo sapiens

<400> SEQUENCE: 9

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Gly Met His Trp Val Arg Gln Ala Pro Gly Lys Gly Leu Glu Trp Val
            35                  40                  45

Ala Val Ile Ser Tyr Glu Glu Ser Asn Arg Tyr His Ala Asp Ser Val
            50                  55                  60

Lys Gly Arg Phe Thr Ile Ser Arg Asp Asn Ser Lys Ile Thr Leu Tyr
65                  70                  75                  80

Leu Gln Met Asn Ser Leu Arg Thr Glu Asp Thr Ala Val Tyr Tyr Cys
            85                  90                  95

Ala Arg Asp Gly Gly Ile Ala Ala Pro Gly Pro Asp Tyr Trp Gly Gln
```

```
            100                 105                 110
Gly Thr Leu Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Arg Val Glu Pro Lys Ser Cys Asp
210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
            260                 265                 270

Asp Pro Glu Val Lys Phe Asn Trp Tyr Val Asp Gly Val Glu Val His
        275                 280                 285

Asn Ala Lys Thr Lys Pro Arg Glu Glu Gln Tyr Ala Ser Thr Tyr Arg
290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
                325                 330                 335

Lys Thr Ile Ser Lys Ala Lys Gly Gln Pro Arg Glu Pro Gln Val Tyr
            340                 345                 350

Thr Leu Pro Pro Ser Arg Glu Glu Met Thr Lys Asn Gln Val Ser Leu
        355                 360                 365

Thr Cys Leu Val Lys Gly Phe Tyr Pro Ser Asp Ile Ala Val Glu Trp
370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Met His
            420                 425                 430

Glu Ala Leu His Asn His Tyr Thr Gln Lys Ser Leu Ser Leu Ser Pro
        435                 440                 445

Gly Lys
    450

<210> SEQ ID NO 10
<211> LENGTH: 219
<212> TYPE: PRT
<213> ORGANISM: Homo sapiens

<400> SEQUENCE: 10

Asp Ile Val Met Thr Gln Ser Pro Leu Ser Leu Thr Val Thr Pro Gly
1               5                   10                  15
```

-continued

Glu Pro Ala Ser Ile Ser Cys Arg Ser Ser Gln Ser Leu Leu Tyr Ser
            20                  25                  30

Asn Gly Tyr Asn Tyr Leu Asp Trp Tyr Leu Gln Lys Pro Gly Gln Ser
        35                  40                  45

Pro Gln Val Leu Ile Ser Leu Gly Ser Asn Arg Ala Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Met Gln Ala
                85                  90                  95

Arg Gln Thr Pro Phe Thr Phe Gly Pro Gly Thr Lys Val Asp Ile Arg
            100                 105                 110

Arg Thr Val Ala Ala Pro Ser Val Phe Ile Phe Pro Pro Ser Asp Glu
        115                 120                 125

Gln Leu Lys Ser Gly Thr Ala Ser Val Val Cys Leu Leu Asn Asn Phe
    130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser
        195                 200                 205

Pro Val Thr Lys Ser Phe Asn Arg Gly Glu Cys
    210                 215

<210> SEQ ID NO 11
<211> LENGTH: 450
<212> TYPE: PRT
<213> ORGANISM: Homo sapiens

<400> SEQUENCE: 11

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Gly Met His Trp Val Arg Gln Ala Pro Gly Lys Gly Leu Glu Trp Val
        35                  40                  45

Ala Val Ile Ser Tyr Glu Glu Ser Asn Arg Tyr His Ala Asp Ser Val
    50                  55                  60

Lys Gly Arg Phe Thr Ile Ser Arg Asp Asn Ser Lys Ile Thr Leu Tyr
65                  70                  75                  80

Leu Gln Met Asn Ser Leu Arg Thr Glu Asp Thr Ala Val Tyr Tyr Cys
                85                  90                  95

Ala Arg Asp Gly Gly Ile Ala Ala Pro Gly Pro Asp Tyr Trp Gly Gln
            100                 105                 110

Gly Thr Leu Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Arg Val Glu Pro Lys Ser Cys Asp
    210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Ala Val Ser His Glu
        260                 265                 270

Asp Pro Glu Val Lys Phe Asn Trp Tyr Val Asp Gly Val Glu Val His
    275                 280                 285

Asn Ala Lys Thr Lys Pro Arg Glu Glu Gln Tyr Asn Ser Thr Tyr Arg
290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
                325                 330                 335

Lys Thr Ile Ser Lys Ala Lys Gly Gln Pro Arg Glu Pro Gln Val Tyr
            340                 345                 350

Thr Leu Pro Pro Ser Arg Glu Glu Met Thr Lys Asn Gln Val Ser Leu
        355                 360                 365

Thr Cys Leu Val Lys Gly Phe Tyr Pro Ser Asp Ile Ala Val Glu Trp
    370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Met His
            420                 425                 430

Glu Ala Leu His Asn His Tyr Thr Gln Lys Ser Leu Ser Leu Ser Pro
        435                 440                 445

Gly Lys
    450

<210> SEQ ID NO 12
<211> LENGTH: 219
<212> TYPE: PRT
<213> ORGANISM: Homo sapiens

<400> SEQUENCE: 12

Asp Ile Val Met Thr Gln Ser Pro Leu Ser Leu Thr Val Thr Pro Gly
1               5                   10                  15

Glu Pro Ala Ser Ile Ser Cys Arg Ser Ser Gln Ser Leu Leu Tyr Ser
            20                  25                  30

Asn Gly Tyr Asn Tyr Leu Asp Trp Tyr Leu Gln Lys Pro Gly Gln Ser
        35                  40                  45

Pro Gln Val Leu Ile Ser Leu Gly Ser Asn Arg Ala Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Met Gln Ala

```
            85                  90                  95
Arg Gln Thr Pro Phe Thr Phe Gly Pro Gly Thr Lys Val Asp Ile Arg
            100                 105                 110

Arg Thr Val Ala Ala Pro Ser Val Phe Ile Phe Pro Pro Ser Asp Glu
            115                 120                 125

Gln Leu Lys Ser Gly Thr Ala Ser Val Val Cys Leu Leu Asn Asn Phe
            130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
                180                 185                 190

Lys His Lys Val Tyr Ala Cys Glu Val Thr His Gln Gly Leu Ser Ser
                195                 200                 205

Pro Val Thr Lys Ser Phe Asn Arg Gly Glu Cys
            210                 215
```

<210> SEQ ID NO 13
<211> LENGTH: 217
<212> TYPE: PRT
<213> ORGANISM: Homo sapiens

<400> SEQUENCE: 13

```
Ala Pro Glu Leu Leu Gly Gly Pro Ser Val Phe Leu Phe Pro Pro Lys
1               5                   10                  15

Pro Lys Asp Thr Leu Met Ile Ser Arg Thr Pro Glu Val Thr Cys Val
            20                  25                  30

Val Val Asp Val Ser His Glu Asp Pro Glu Val Lys Phe Asn Trp Tyr
            35                  40                  45

Val Asp Gly Val Glu Val His Asn Ala Lys Thr Lys Pro Arg Glu Glu
            50                  55                  60

Gln Tyr Ala Ser Thr Tyr Arg Val Val Ser Val Leu Thr Val Leu His
65                  70                  75                  80

Gln Asp Trp Leu Asn Gly Lys Glu Tyr Lys Cys Lys Val Ser Asn Lys
                85                  90                  95

Ala Leu Pro Ala Pro Ile Glu Lys Thr Ile Ser Lys Ala Lys Gly Gln
            100                 105                 110

Pro Arg Glu Pro Gln Val Tyr Thr Leu Pro Pro Ser Arg Glu Glu Met
            115                 120                 125

Thr Lys Asn Gln Val Ser Leu Thr Cys Leu Val Lys Gly Phe Tyr Pro
            130                 135                 140

Ser Asp Ile Ala Val Glu Trp Glu Ser Asn Gly Gln Pro Glu Asn Asn
145                 150                 155                 160

Tyr Lys Thr Thr Pro Pro Val Leu Asp Ser Asp Gly Ser Phe Phe Leu
                165                 170                 175

Tyr Ser Lys Leu Thr Val Asp Lys Ser Arg Trp Gln Gln Gly Asn Val
                180                 185                 190

Phe Ser Cys Ser Val Met His Glu Ala Leu His Asn His Tyr Thr Gln
                195                 200                 205

Lys Ser Leu Ser Leu Ser Pro Gly Lys
            210                 215
```

<210> SEQ ID NO 14
<211> LENGTH: 217

```
<212> TYPE: PRT
<213> ORGANISM: Homo sapiens

<400> SEQUENCE: 14

Ala Pro Glu Leu Leu Gly Gly Pro Ser Val Phe Leu Phe Pro Pro Lys
1               5                   10                  15

Pro Lys Asp Thr Leu Met Ile Ser Arg Thr Pro Glu Val Thr Cys Val
            20                  25                  30

Val Val Ala Val Ser His Glu Asp Pro Glu Val Lys Phe Asn Trp Tyr
        35                  40                  45

Val Asp Gly Val Glu Val His Asn Ala Lys Thr Lys Pro Arg Glu Glu
    50                  55                  60

Gln Tyr Asn Ser Thr Tyr Arg Val Val Ser Val Leu Thr Val Leu His
65                  70                  75                  80

Gln Asp Trp Leu Asn Gly Lys Glu Tyr Lys Cys Lys Val Ser Asn Lys
                85                  90                  95

Ala Leu Pro Ala Pro Ile Glu Lys Thr Ile Ser Lys Ala Lys Gly Gln
            100                 105                 110

Pro Arg Glu Pro Gln Val Tyr Thr Leu Pro Pro Ser Arg Glu Glu Met
        115                 120                 125

Thr Lys Asn Gln Val Ser Leu Thr Cys Leu Val Lys Gly Phe Tyr Pro
    130                 135                 140

Ser Asp Ile Ala Val Glu Trp Glu Ser Asn Gly Gln Pro Glu Asn Asn
145                 150                 155                 160

Tyr Lys Thr Thr Pro Pro Val Leu Asp Ser Asp Gly Ser Phe Phe Leu
                165                 170                 175

Tyr Ser Lys Leu Thr Val Asp Lys Ser Arg Trp Gln Gln Gly Asn Val
            180                 185                 190

Phe Ser Cys Ser Val Met His Glu Ala Leu His Asn His Tyr Thr Gln
        195                 200                 205

Lys Ser Leu Ser Leu Ser Pro Gly Lys
    210                 215

<210> SEQ ID NO 15
<211> LENGTH: 1350
<212> TYPE: DNA
<213> ORGANISM: Homo sapiens

<400> SEQUENCE: 15
caggtgcagc tggtggaatc tggcggcgga gtggtgcagc ctggccggtc cctgagactg      60
tcttgcgccg cctccggctt caccttctcc agctacggca tgcactgggt cgacaggcc     120
cctggcaagg gactggaatg ggtggccgtg atctcctacg aggaatccaa cagataccac     180
gctgactccg tgaagggccg gttcacaatc tcccgggaca ctccaagat caccctgtac     240
ctgcagatga actccctgcg gaccgaggac accgccgtgt actactgcgc agggacgga     300
ggaatcgccg ctcctggacc tgattattgg ggccagggca cctggtgac agtgtcctcc     360
gctagcacca agggccctc cgtgttccct ctggccccct ccagcaagtc cacctctggc     420
ggcaccgccg ctctgggctg cctggtgaaa gactacttcc ccgagcccgt gaccgtgtcc     480
tggaactctg gcgccctgac ctccggcgtg cacaccttc agccgtgct gcagtcctcc     540
ggcctgtact ccctgtcctc cgtggtgacc gtgccctcta gctctctggg cacccagacc     600
tacatctgca acgtgaacca caagccctcc aacaccaagg tggacaagcg ggtgaacccc     660
aagtcctgcg acaagaccca cacctgtccc cctgccctg cccctgaact gctgggcgga     720
```

| | |
|---|---|
| ccttccgtgt tcctgttccc cccaaagccc aaggacaccc tgatgatctc ccggaccccc | 780 |
| gaagtgacct gcgtggtggt ggacgtgtcc cacgaggacc ctgaagtgaa gttcaattgg | 840 |
| tacgtggacg gcgtggaagt gcacaacgcc aagaccaagc ccagagagga acagtacgcc | 900 |
| tccacctacc gggtggtgtc tgtgctgacc gtgctgcacc aggactggct gaacggcaaa | 960 |
| gagtacaagt gcaaggtctc caacaaggcc ctgcctgccc ccatcgaaaa gaccatctcc | 1020 |
| aaggccaagg gccagccccg cgagccacag gtgtacacac tgccccccag ccgggaagag | 1080 |
| atgaccaaga accaggtgtc cctgacctgt ctggtcaaag gcttctaccc ctccgatatc | 1140 |
| gccgtggagt gggagtccaa cggacagccc gagaacaact acaagaccac cccccctgtg | 1200 |
| ctggactccg acggctcatt cttcctgtac tccaagctga ccgtggacaa gtcccggtgg | 1260 |
| cagcagggca acgtgttctc ctgctccgtg atgcacgagg ccctgcacaa ccactacacc | 1320 |
| cagaagtccc tgtccctgag ccccggcaag | 1350 |

<210> SEQ ID NO 16
<211> LENGTH: 657
<212> TYPE: DNA
<213> ORGANISM: Homo sapiens

<400> SEQUENCE: 16

| | |
|---|---|
| gacatcgtga tgacccagtc cccctgtcc ctgaccgtga cacctggcga gcctgcctct | 60 |
| atctcctgca gatcctccca gtccctgctg tactccaacg gctacaacta cctggactgg | 120 |
| tatctgcaga agcccggcca gtccccacag gtgctgatct ccctgggctc caacagagcc | 180 |
| tctggcgtgc ccgaccggtt ctccggctct ggctctggca ccgacttcac actgaagatc | 240 |
| tcacgggtgg aagccgagga cgtgggcgtg tactactgca tgcaggcccg gcagaccccc | 300 |
| ttcaccttcg gccctggcac caaggtggac atcggcgta cggtggccgc tcccagcgtg | 360 |
| ttcatcttcc ccccagcga cgagcagctg aagagcggca ccgccagcgt ggtgtgcctg | 420 |
| ctgaacaact tctacccccg ggaggccaag gtgcagtgga aggtggacaa cgccctgcag | 480 |
| agcggcaaca gccaggagag cgtcaccgag caggacagca aggactccac ctacagcctg | 540 |
| agcagcaccc tgaccctgag caaggccgac tacgagaagc ataaggtgta cgcctgcgag | 600 |
| gtgacccacc agggcctgtc cagccccgtg accaagagct tcaacagggg cgagtgc | 657 |

<210> SEQ ID NO 17
<211> LENGTH: 1350
<212> TYPE: DNA
<213> ORGANISM: Homo sapiens

<400> SEQUENCE: 17

| | |
|---|---|
| caggtgcagc tggtggaatc tggcggcgga gtggtgcagc ctggccggtc cctgagactg | 60 |
| tcttgcgccg cctccggctt caccttctcc agctacggca tgcactgggt gcgacaggcc | 120 |
| cctggcaagg gactgaatg ggtggccgtg atctcctacg aggaatccaa cagataccac | 180 |
| gctgactccg tgaagggccg gttcacaatc tcccgggaca actccaagat caccctgtac | 240 |
| ctgcagatga actccctgcg gaccgaggac accgccgtgt actactgcgc cagggacgga | 300 |
| ggaatcgccg ctcctggacc tgattattgg ggccagggca ccctggtgac agtgtcctcc | 360 |
| gctagcacca agggcccctc cgtgttccct ctggccccct ccagcaagtc cacctctggc | 420 |
| ggcaccgccg ctctgggctg cctggtgaaa gactacttcc ccgagccgt gaccgtgtcc | 480 |
| tggaactctg gcgccctgac ctccggcgtg cacacctttc cagccgtgct gcagtcctcc | 540 |
| ggcctgtact ccctgtcctc cgtggtgacc gtgccctcta gctctctggg cacccagacc | 600 |

```
tacatctgca acgtgaacca caagccctcc aacaccaagg tggacaagcg ggtggaaccc      660
aagtcctgcg acaagaccca cacctgtccc ccctgccctg cccctgaact gctgggcgga      720
ccttccgtgt tcctgttccc cccaaagccc aaggacaccc tgatgatctc ccggaccccc      780
gaagtgacct gcgtggtggt ggccgtgtcc acgaggacc ctgaagtgaa gttcaattgg      840
tacgtggacg gcgtggaagt gcacaacgcc aagaccaagc ccagagagga acagtacaac      900
tccacctacc gggtggtgtc tgtgctgacc gtgctgcacc aggactggct gaacggcaaa      960
gagtacaagt gcaaggtctc caacaaggcc ctgcctgccc ccatcgaaaa gaccatctcc     1020
aaggccaagg gccagccccg cgagccacag gtgtacacac tgcccccag ccgggaagag     1080
atgaccaaga accaggtgtc cctgacctgt ctggtcaaag gcttctaccc ctccgatatc     1140
gccgtggagt gggagtccaa cggacagccc gagaacaact acaagaccac ccccctgtg      1200
ctggactccg acggctcatt cttcctgtac tccaagctga ccgtggacaa gtcccggtgg     1260
cagcagggca acgtgttctc ctgctccgtg atgcacgagg ccctgcacaa ccactacacc     1320
cagaagtccc tgtccctgag ccccggcaag                                      1350

<210> SEQ ID NO 18
<211> LENGTH: 657
<212> TYPE: DNA
<213> ORGANISM: Homo sapiens

<400> SEQUENCE: 18
gacatcgtga tgacccagtc cccccctgtcc ctgaccgtga cacctggcga gcctgcctct      60
atctcctgca gatcctccca gtccctgctg tactccaacg gctacaacta cctggactgg      120
tatctgcaga agcccggcca gtccccacag gtgctgatct ccctgggctc aacagagcc      180
tctggcgtgc ccgaccggtt ctccggctct ggctctggca ccgacttcac actgaagatc      240
tcacgggtgg aagccgagga cgtgggcgtg tactactgca tgcaggcccg gcagaccccc      300
ttcaccttcg gccctggcac caaggtggac atccggcgta cggtggccgc tcccagcgtg      360
ttcatcttcc cccccagcga cgagcagctg aagagcggca ccgccagcgt ggtgtgcctg      420
ctgaacaact tctaccccg ggaggccaag gtgcagtgga aggtggacaa cgccctgcag      480
agcggcaaca gccaggagag cgtcaccgag caggacagca aggactccac ctacagcctg      540
agcagcaccc tgaccctgag caaggccgac tacgagaagc ataaggtgta cgcctgcgag      600
gtgacccacc agggcctgtc cagccccgtg accaagagct caacaggg cgagtgc          657

<210> SEQ ID NO 19
<211> LENGTH: 277
<212> TYPE: PRT
<213> ORGANISM: Homo sapiens

<400> SEQUENCE: 19

Met Val Arg Leu Pro Leu Gln Cys Val Leu Trp Gly Cys Leu Leu Thr
1               5                  10                  15

Ala Val His Pro Glu Pro Pro Thr Ala Cys Arg Glu Lys Gln Tyr Leu
            20                  25                  30

Ile Asn Ser Gln Cys Cys Ser Leu Cys Gln Pro Gly Gln Lys Leu Val
        35                  40                  45

Ser Asp Cys Thr Glu Phe Thr Glu Thr Glu Cys Leu Pro Cys Gly Glu
    50                  55                  60

Ser Glu Phe Leu Asp Thr Trp Asn Arg Glu Thr His Cys His Gln His
65                  70                  75                  80
```

-continued

```
Lys Tyr Cys Asp Pro Asn Leu Gly Leu Arg Val Gln Gln Lys Gly Thr
            85              90              95

Ser Glu Thr Asp Thr Ile Cys Thr Cys Glu Glu Gly Trp His Cys Thr
           100             105             110

Ser Glu Ala Cys Glu Ser Cys Val Leu His Arg Ser Cys Ser Pro Gly
        115             120             125

Phe Gly Val Lys Gln Ile Ala Thr Gly Val Ser Asp Thr Ile Cys Glu
    130             135             140

Pro Cys Pro Val Gly Phe Phe Ser Asn Val Ser Ser Ala Phe Glu Lys
145             150             155             160

Cys His Pro Trp Thr Ser Cys Glu Thr Lys Asp Leu Val Val Gln Gln
            165             170             175

Ala Gly Thr Asn Lys Thr Asp Val Val Cys Gly Pro Gln Asp Arg Leu
            180             185             190

Arg Ala Leu Val Val Ile Pro Ile Ile Phe Gly Ile Leu Phe Ala Ile
        195             200             205

Leu Leu Val Leu Val Phe Ile Lys Lys Val Ala Lys Lys Pro Thr Asn
    210             215             220

Lys Ala Pro His Pro Lys Gln Glu Pro Gln Glu Ile Asn Phe Pro Asp
225             230             235             240

Asp Leu Pro Gly Ser Asn Thr Ala Ala Pro Val Gln Glu Thr Leu His
            245             250             255

Gly Cys Gln Pro Val Thr Gln Glu Asp Gly Lys Glu Ser Arg Ile Ser
            260             265             270

Val Gln Glu Arg Gln
            275
```

ANTI-CD40 ANTIBODIES FOR USE IN TREATMENT OF HIDRADENITIS SUPPURATIVA

TECHNICAL FIELD

The disclosure relates to methods, treatment regimens, uses, kits and therapies for treating hidradenitis suppurativa, by employing CD40 antagonists, particularly anti-CD40 antibodies, such as CFZ533 (iscalimab).

BACKGROUND OF THE DISCLOSURE

Hidradenitis suppurativa (HS), also called "acne inversa" or "maladie de Verneuilh", is a chronic, recurrent, and debilitating inflammatory skin condition that typically presents with deep, inflammatory, painful lesions in apocrine gland-bearing parts of the body. The most common areas affected are the axillae, the groin, and the anogenital region (Jemec 2012; Fimmel and Zouboulis 2010).

HS is currently considered to be an inflammatory disease of the pilosebaceous follicle with an underlying immune system imbalance that occurs in genetically predisposed individuals (Kelly et al 2014). While it is considered a disease primarily triggered by follicular occlusion, HS is an inflammatory skin disease characterized by large numbers of neutrophils and macrophages in inflammatory lesions (Lima et al 2016, Shah et al 2017). While HS pathophysiology is still largely unknown, the benefit of tumour necrosis factor alpha (TNFα) blockade have been described in larger studies (Kimball et al 2016).

Evidence of the efficacy of anti-IL1 treatment (Tzanetakou et al 2016) and of blocking IL-17A (Thorlacius et al 2017, Schuch et al 2018, Giuseppe et al 2018, Jorgensen et al 2018) or anti IL-23 treatment (Sharon et al 2012, Blok et al 2016) has also been observed in smaller studies and/or in case reports. More recently, investigational approaches using the oral PDE4 inhibitor apremilast (Weber et al 2017) or an anti-complement 5a compound (Kanni et al 2018) have been described.

The disease starts after puberty and women are more frequently affected than men (3:1). Risk factors include obesity and smoking. Although epidemiological prevalence estimates vary widely (0.03-4.3%; Jemec 2012, Jemec and Kimball 2015), and geographical differences exist, a prevalence of approximately 0.1-1% is accepted by the scientific community (Garg et al 2018).

The clinical manifestations of HS are heterogeneous, but the disease tends to manifest with chronic relapsing, deep, painful, inflammatory skin lesions, mostly inflammatory nodules and abscesses, leading to possible drainage and suppuration. Inflammatory lesions are complicated during disease progression by sinus tract formation and fistulization, and may lead to hypertrophic scarring with a possible impact on functional use.

HS is associated with pain, malodorous discharge from the wounds, and scarring, and does frequently have devastating psychosocial effects. HS is a profoundly debilitating disease with a high negative impact on quality of life (QoL), with multiple studies confirming that the impact is greater than that seen with other dermatologic diseases (Deckers and Kimball 2016). Patients with HS also often suffer from depression, social isolation, have impaired sexual health, and may have difficulty performing their work duties (Esmann and Jemec 2011, Fimmel and Zouboulis 2010, Janse et al 2017).

HS is difficult to treat. Official European treatment guidelines were only developed in 2015 and suggest that patients should be provided with adjuvant, medical and surgical therapy (Zouboulis et al 2015).

While topical antibiotics can be used for mild cases, long courses of multiple systemic antimicrobial therapies are preferred for moderate to severe HS, generally with tetracyclines or a combination of clindamycin and rifampicin, which can be followed by maintenance with chronic antibiotic treatment for months or even years (Bettoli et al 2016, Dessinioti et al 2016, Zouboulis et al 2015).

However, it is widely recognized that HS is a chronic inflammatory condition, not an infectious disease (Jemec 2012). Therefore, anti-inflammatory agents are an alternative and probably more appropriate approach than antibiotics or could be complementary to antibiotics. Over time, the consequence of chronic, recurrent, inadequately treated inflammation is irreversible fibrosis, which manifests as scarring and tunnels, or sinus tracts, which often do not respond to medical therapy. Once lasting anatomical changes occur, the only therapeutic option to reduce the volume of fibrotic tissue and improve functionality in the areas of affected skin is surgery (Andersen and Jemec 2017). One of the future treatment goals should be to reduce persistent scarring and to avoid surgery, which may be achieved by prevention of inflammatory lesions or may need a specific treatment.

In 2015, adalimumab (Humira®), a recombinant human monoclonal immunoglobulin G1 (IgG1) antibody to soluble and membrane bound TNF-α, received regulatory approval for the treatment of moderate to severe HS. Efficacy has been seen with adalimumab, with HiSCR (Hidradenitis suppurativa clinical response) response rates over placebo of approximately 16% (41.8% adalimumab vs 26% placebo) and 31% (58.9% adalimumab vs 27.6% placebo) as reported in PIONEER I and II studies, respectively (Kimball et al 2016). As captured in the adalimumab labels, adalimumab is associated with an increased safety risk for serious infections including tuberculosis, invasive fungal infections and other opportunistic infections. An increased incidence of malignancies has also been reported with adalimumab.

There is, therefore, an unmet need for systemic therapies that effectively reduce inflammation while having a favorable safety profile for patients suffering from moderate to severe HS.

CFZ533 (iscalimab) is a human monoclonal antibody directed against human CD40. It belongs to the IgG1 isotype subclass with and comprises an Fc-silencing mutation (N297A) which abolishes FcγR binding and associated effector functions like ADCC and CDC. CFZ533 is disclosed in U.S. Pat. Nos. 8,828,396 and 9,221,913, incorporated herein by reference.

SUMMARY OF THE DISCLOSURE

While the pathogenesis of HS is still not fully understood, this chronic skin disease is characterized by high numbers of neutrophils and macrophages in inflamed HS lesions. Neutrophils and macrophages seem to be key drivers of the pathomechanism of HS (Shah et al 2017, Lima et al 2016). CD40 is abundantly expressed in HS lesional skin biopsies (mainly by macrophages and B cells). CD40L is expressed by T cells in HS lesional skin biopsies. Thus, any antagonist capable of inhibiting CD40-CD40L signaling, such as an anti-CD40 antibody or fragments thereof with silenced ADCC activity, could be suitable for the treatment of HS.

According to a first aspect of the invention a CD40 antagonist for use in the treatment of hidradenitis suppurativa is provided.

In a preferred embodiment, the CD40 antagonist is an anti-CD40 antibody.

In another embodiment of the first aspect the anti-CD40 antibody or fragments thereof is anti-CD40 antibody with silenced ADCC activity.

The antibody may be selected from the group consisting of:
a. an anti-CD40 antibody comprising an immunoglobulin VH domain comprising the amino acid sequence of SEQ ID NO: 7 and an immunoglobulin VL domain comprising the amino acid sequence of SEQ ID NO: 8;
b. an anti-CD40 antibody comprising an immunoglobulin VH domain comprising the hypervariable regions set forth as SEQ ID NO: 1, SEQ ID NO: 2, and SEQ ID NO: 3 and an immunoglobulin VL domain comprising the hypervariable regions set forth as SEQ ID NO: 4, SEQ ID NO: 5 and SEQ ID NO: 6;
c. an anti-CD40 antibody comprising an immunoglobulin VH domain comprising the amino acid sequence of SEQ ID NO: 7 and an immunoglobulin VL domain comprising the amino acid sequence of SEQ ID NO: 8, and an Fc region of SEQ ID NO: 13;
d. an anti-CD40 antibody comprising an immunoglobulin VH domain comprising the amino acid sequence of SEQ ID NO: 7 and an immunoglobulin VL domain comprising the amino acid sequence of SEQ ID NO: 8, and an Fc region of SEQ ID NO: 14; and
e. an anti-CD40 antibody comprising a silent Fc IgG1 region.

The antibody may comprises the heavy chain amino acid sequence of SEQ ID NO: 9 and the light chain amino acid sequence of SEQ ID NO: 10; or the heavy chain amino acid sequence of SEQ ID NO: 11 and the light chain amino acid sequence of SEQ ID NO: 12.

The antibody may furthermore be selected from the group consisting of mAb1 (also called CFZ533 or iscalimab), mAb2 and ASKP1240.

In one embodiment, a pharmaceutical composition is provided comprising a therapeutically effective amount of the antibody for use according the first aspect and one or more pharmaceutically acceptable carriers.

In one embodiment, the route of administration is subcutaneous or intravenous of the antibody according to the first aspect, or a combination of subcutaneous or intravenous.

The dose may be about 3 mg to about 30 mg active ingredient per kilogram of a human subject. The dose may be given weekly, every two weeks or every four weeks.

In one embodiment, the dose is about 10 mg active ingredient per kilogram of a human subject.

In one embodiment, the dose is about 150 mg to about 600 mg active ingredient. The dose may be given weekly, every two weeks or every four weeks.

In one embodiment, the dose is about 300 mg active ingredient.

In one preferred embodiment, the dose is 150 mg active ingredient. In another preferred embodiment, the dose is 300 mg active ingredient. In yet another preferred embodiment, the dose is 600 mg active ingredient.

In one embodiment, the antibody is administered through a loading dosing and a maintenance dosing.

In one embodiment, the loading dosing is administered via subcutaneous injections of a first dose and the maintenance dosing is administered via subcutaneous injections of a second dose. The first dose may be the same as the second dose or higher than the second dose.

In one embodiment, the first dose is between about 150 mg and about 600 mg active ingredient, such as about 300 mg active ingredient and the second dose is between about 150 mg and about 600 mg active ingredient, such as about 300 mg active ingredient.

In one embodiment, the first dose is 150 mg, 300 mg or 600 mg active ingredient and the second dose is 150 mg, 300 mg or 600 mg active ingredient.

In one embodiment, the loading dosing comprises at least two subcutaneous injections and the maintenance dosing consists of weekly (Q1W), biweekly (Q2W) or monthly (Q4W) subcutaneous injections. In one embodiment, the loading dosing consists of two subcutaneous injections. In another embodiment, the loading dosing consists of three subcutaneous injections.

In one embodiment, the subcutaneous injections of the loading dosing are different doses. In another embodiment, the subcutaneous injections of the loading dosing are the same dose.

The HS patient may be selected according to one of the following criteria:
the patient has moderate to severe HS;
the patient is an adult;
the patient is an adolescent;
prior to treatment with the CD40 antagonist, the patient has an HS-PGA score of ≥3;
prior to treatment with the CD40 antagonist, the patient has at least 3 inflammatory lesions; or
prior to treatment with the CD40 antagonist, the patient does not have extensive scarring (<10 fistulas) as a result of HS.

In one embodiment, by week 16 of treatment the HS patient achieves at least one of the following:
a simplified HiSCR;
a reduction in HS flares;
a NRS30;
a reduction of ≤6 as measured by the DLQI; and/or
an improvement in DLQI.

In one embodiment, by week 16 of treatment, at least 40% of said patients achieve a simplified HiSCR; or at least 25% of said patients achieve an NRS30 response; or less than 15% of said patients experience an HS flare.

In one embodiment, the patient has at least one of the following as early as one week after the first dose of the CD40 antagonist:
a rapid reduction in pain, as measured by VAS or NRS, and
a rapid reduction in CRP, as measured using a standard hsCRP assay.

In one embodiment, the patient achieves a sustained response 3 months after the end of the treatment, as measured by inflammatory lesion count, HS Clinical Response (HiSCR), Numerical Rating Scale (NRS), modified Sartorius HS score, Hidradenitis Suppurativa-Physician Global Assessment (HS-PGA), or Dermatology Life Quality Index (DLQI).

In one embodiment, the patient achieves a sustained response 3 months after the end of treatment, as measured by the simplified HiSCR (sHiSCR).

According to a second aspect, a method of treating HS in a human subject is provided, comprising administering a therapeutically effective dose of a CD40 antagonist to said subject.

In a preferred embodiment, the CD40 antagonist is an anti-CD40 antibody.

In one embodiment the antibody is selected from the group consisting of:
a. an anti-CD40 antibody comprising an immunoglobulin VH domain comprising the amino acid sequence of SEQ ID NO: 7 and an immunoglobulin VL domain comprising the amino acid sequence of SEQ ID NO: 8;
b. an anti-CD40 antibody comprising an immunoglobulin VH domain comprising the hypervariable regions set forth as SEQ ID NO: 1, SEQ ID NO: 2, and SEQ ID NO: 3 and an immunoglobulin VL domain comprising the hypervariable regions set forth as SEQ ID NO: 4, SEQ ID NO: 5 and SEQ ID NO: 6;
c. an anti-CD40 antibody comprising an immunoglobulin VH domain comprising the amino acid sequence of SEQ ID NO: 7 and an immunoglobulin VL domain comprising the amino acid sequence of SEQ ID NO: 8, and an Fc region of SEQ ID NO: 13;
d. an anti-CD40 antibody comprising an immunoglobulin VH domain comprising the amino acid sequence of SEQ ID NO: 7 and an immunoglobulin VL domain comprising the amino acid sequence of SEQ ID NO: 8, and an Fc region of SEQ ID NO: 14; and
e. an anti-CD40 antibody comprising a silent Fc IgG1 region.

In one embodiment, the antibody comprises the heavy chain amino acid sequence of SEQ ID NO: 9 and the light chain amino acid sequence of SEQ ID NO: 10; or the heavy chain amino acid sequence of SEQ ID NO: 11 and the light chain amino acid sequence of SEQ ID NO: 12.

In one embodiment, the antibody is administered together with one or more pharmaceutically acceptable carriers.

In one embodiment, the antibody is administered subcutaneously or intravenously, or a combination of subcutaneous or intravenous.

In one embodiment, the antibody is administered as a dose of about 3 mg to about 30 mg active ingredient per kilogram of a human subject.

In one embodiment, the dose is about 10 mg active ingredient per kilogram of the human subject.

In one embodiment, the antibody is administered as a dose of about 150 mg to about 600 mg active ingredient, such as 300 mg active ingredient.

In one preferred embodiment, the dose is 150 mg active ingredient. In another preferred embodiment, the dose is 300 mg active ingredient. In yet another preferred embodiment, the dose is 600 mg active ingredient.

In one embodiment, the antibody is administered with a loading dosing and a maintenance dosing.

In one embodiment, the loading dosing is administered via subcutaneous injections of a first dose and the maintenance dosing is administered via subcutaneous injections of a second dose.

The first dose may be the same as the second dose or higher than the second dose.

In one embodiment, the first dose is between about 150 mg and about 600 mg active ingredient, such as about 300 mg active ingredient and the second dose is between about 150 mg and about 600 mg active ingredient, such as about 300 mg active ingredient.

In one embodiment, the first dose is 150 mg, 300 mg or 600 mg active ingredient and the second dose is 150 mg, 300 mg or 600 mg active ingredient.

In one embodiment, the loading dosing comprises at least two subcutaneous injections and the maintenance dosing consists of weekly weekly (Q1W), biweekly (Q2W) or monthly (Q4W) subcutaneous injections.

In one embodiment, the loading dosing consists of two subcutaneous injections. In another embodiment, the loading dosing consists of three subcutaneous injections In one embodiment, the subcutaneous injections of the loading dosing are different doses. In another embodiment, the subcutaneous injections of the loading dosing are the same dose.

According to a third aspect, use of a liquid pharmaceutical composition comprising an anti-CD40 antibody, a buffer, a stabilizer and a solubilizer, and means for subcutaneously administering the anti-CD40 antibody to a patient having HS, for the manufacture of a medicament for the treatment of HS is provided, wherein the anti-CD40 antibody:
a. is to be subcutaneously administered with a first loading dosing; and
b. thereafter, with a second maintenance dosing, wherein said anti-CD40 antibody is selected from the group consisting of:
i. an anti-CD40 antibody comprising an immunoglobulin VH domain comprising the amino acid sequence of SEQ ID NO: 7 and an immunoglobulin VL domain comprising the amino acid sequence of SEQ ID NO: 8;
ii. an anti-CD40 antibody comprising an immunoglobulin VH domain comprising the hypervariable regions set forth as SEQ ID NO: 1, SEQ ID NO: 2, and SEQ ID NO: 3 and an immunoglobulin VL domain comprising the hypervariable regions set forth as SEQ ID NO: 4, SEQ ID NO: 5 and SEQ ID NO: 6;
iii. an anti-CD40 antibody comprising an immunoglobulin VH domain comprising the amino acid sequence of SEQ ID NO: 7 and an immunoglobulin VL domain comprising the amino acid sequence of SEQ ID NO: 8, and an Fc region of SEQ ID NO: 13;
iv. an anti-CD40 antibody comprising an immunoglobulin VH domain comprising the amino acid sequence of SEQ ID NO: 7 and an immunoglobulin VL domain comprising the amino acid sequence of SEQ ID NO: 8, and an Fc region of SEQ ID NO: 14;
v. an anti-CD40 antibody comprising a silent Fc IgG1 region: and
vi. an anti-CD40 antibody comprising the heavy chain amino acid sequence of SEQ ID NO: 9 and the light chain amino acid sequence of SEQ ID NO: 10; or the heavy chain amino acid sequence of SEQ ID NO: 11 and the light chain amino acid sequence of SEQ ID NO: 12.

The invention further relates to combinations of a CD40 antagonist with one or more additional therapeutic agents, for use in the treatment or prevention of HS, in a patient in need of such treatment and/or prevention.

DETAILED DESCRIPTION OF THE DISCLOSURE

Figure 1:
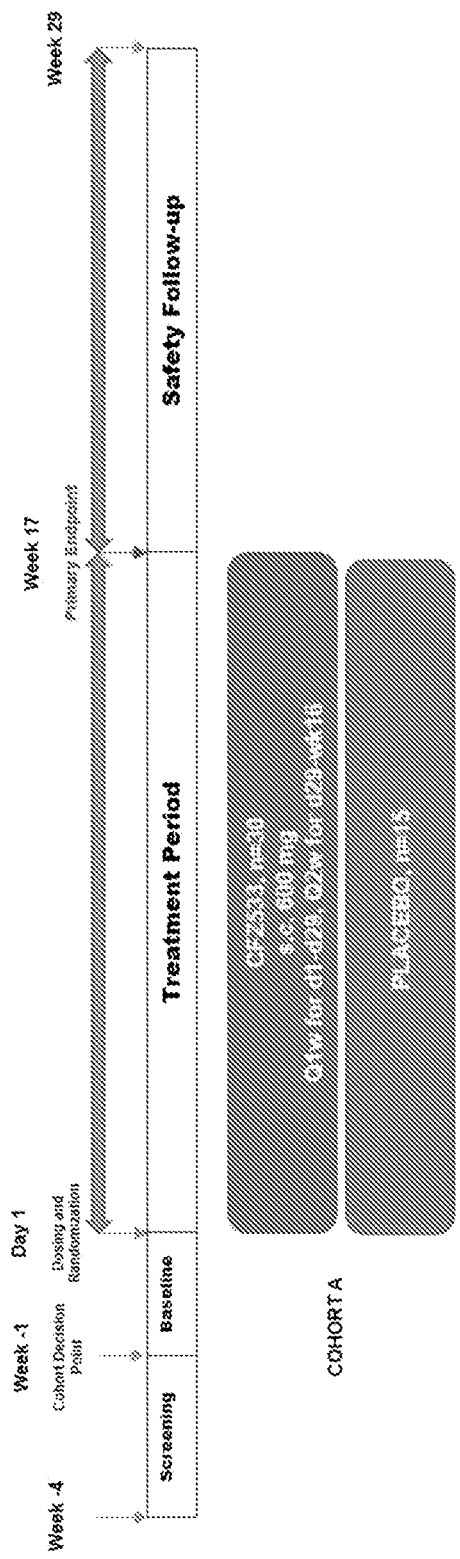
FIG. 1 is a graphical representation of the dosage regimen according to the clinical trial design.

It has been shown that the CD40-CD154 (CD154 is the CD40 ligand, CD40L) pathway may influence skin inflammation (Mehling et al 2001).

The presence and upregulation of B cells has also been observed previously in HS lesions (Hunger et al 2008, van der Zee et al 2012). B cells and plasma cells were detected in HS lesions and in particular in chronic lesions (as opposed to early-stage) by van der Zee, as compared to perilesional and healthy skin. In some samples, lymphoid follicles with CD20+B cells were detected in chronic lesions. In a recent study conducted by Novartis (CJM112X2202) involving moderate to severe HS subjects, histology samples showed a high amount of B-cell infiltrates in lesional skin as well as several germinal centers in the lesional tissue. In the same study, cell type signature in gene expression data from skin biopsies showed not only a clear B-cell signature but also a macrophage signature based on transcriptomics. In line with these observations, abnormalities and upregulation in circulating B-cell subsets in HS patients were communicated at the European HS foundation meeting in Rotterdam in 2018 (Musilova J, 2018).

In addition, and perhaps more importantly, macrophages are abundantly found in chronic HS lesional skin (Shah et al 2017). Recently, these macrophages were identified as potentially M2 CD163+ macrophages (Byrd et al 2018). In the CJM112×2202 HS samples, CD40 was expressed on macrophages and B cells present in HS lesions and is abundantly expressed in HS lesional skin biopsies while the CD40L was expressed by T cells in HS lesional skin biopsies. The skin biopsies confirmed the pathway engagement seen with signatures on the transcriptional level. Thus, iscalimab could be the first treatment for HS that targets the macrophage and B-cell pathophysiology recently observed in HS.

Thus, any CD40 pathway antagonist capable of blocking CD40-CD154 signaling, such as an anti-CD40 antibody with silenced ADCC activity, could be suitable for the treatment of HS.

Without wishing to be bound by theory, the inventors have identified that sustained plasma concentrations of at least 40 µg/mL of the CFZ533 antibody during the maintenance regimen was necessary to block the CD40-CD40L pathway in target tissues. Also, because CFZ533 is subjected to target mediated disposition (which is in relation to target turnover and expression), and HS patients are presenting with high CD40 expression in the body, a loading regimen was necessary at start of treatment to fully saturate CD40 receptors in these patients in conditions where CD40 levels have been enhanced, requiring higher doses or a more frequent regimen at start of treatment. Thus, with a loading dosing regimen providing at start of treatment (2 to 3 weeks) rapid saturation of CD40 receptors, followed by a maintenance dosing regimen providing, throughout the entire treatment period, sustained plasma concentrations at least 40 µg/mL or at least 100 µg/mL, in situations where CD40 expression in affected tissues would be enhanced (severity of the condition), is considered for a therapeutic effect.

The appropriate dosage will vary depending upon, for example, the particular CD40 pathway antagonist, e.g. an anti-CD40 antibody or antigen binding fragment thereof (e.g., mAb1, also called CFZ533 or iscalimab herein, mAb2, ASKP1240) or anti-CD40L antibody (e.g. BIIB063) or antigen-binding fragment thereof to be employed, the subject of treatment, the mode of administration and the nature and severity of the condition being treated, and on the nature of prior treatments that the patient has undergone. Ultimately, the attending health care provider will decide the amount of the CD40 pathway antagonist with which to treat each individual patient. In some embodiments, the attending health care provider may administer low or even single doses of the CD40 pathway antagonist and observe the patient's response. In other embodiments, the initial dose(s) of CD40 pathway antagonist administered to a patient are high, and then are titrated downward until signs of relapse occur. Larger doses of the CD40 pathway antagonist may be administered until the optimal therapeutic effect is obtained for the patient, and the dosage is not generally increased further.

In one embodiment, the disclosure relates to an anti-CD40 antibody or antigen binding fragment thereof for use according to any of the first, second or third aspect of the disclosure as described above, wherein the loading dose and the maintenance dose of the anti-CD40 antibody or antigen binding fragment thereof (e.g., mAb1, also called CFZ533 or iscalimab, mAb2 or ASKP1240) is adjusted so that plasma or serum concentration of antibody is at least 40 µg/mL.

In practicing some of the methods of treatment or uses of the present disclosure, a therapeutically effective amount of an CD40 pathway antagonist, e.g. an anti-CD40 antibody or antigen binding fragment thereof (e.g., mAb1, also called CFZ533 herein, mAb2, ASKP1240) or anti-CD40L antibody or antigen-binding fragment thereof is administered to a patient, e.g., a mammal (e.g., a human). While it is understood that the disclosed methods provide for treatment of HS patients using a CD40 pathway antagonist (e.g., mAb1/CFZ533, mAb2, ASKP1240), this does not preclude that, if the patient is to be ultimately treated with a CD40 pathway antagonist, such CD40 pathway antagonist therapy is necessarily a monotherapy. Indeed, if a patient is selected for treatment with a CD40 pathway antagonist, then the CD40 pathway antagonist (e.g., mAb1/CFZ533, mAb2, ASKP1240) may be administered in accordance with the methods of the disclosure either alone or in combination with other agents and therapies.

It will be understood that regimen changes may be appropriate for certain HS patients, e.g., patients that display inadequate response to treatment with the CD40 pathway antagonists, e.g. an anti-CD40 antibody or antigen binding fragment thereof (e.g., mAb1, also called CFZ533 herein, mAb2, ASKP1240) or anti-CD40L antibody or antigen-binding fragment thereof to be employed. Thus, administration (e.g mAb1/CFZ533 or mAb2) may be more frequent than monthly dosing, e.g., bi-weekly dosing (every two weeks) or weekly dosing.

Some patients may benefit from a loading regimen (e.g., weekly administrations for several weeks [e.g., 1 to 4 weeks, e.g., dosing at weeks 0, 1, 2, and/or 3, such as 2 weeks, loading dosing regimen at Weeks 0 and 1]) followed by a maintenance regimen starting e.g. at Week 3 or 4 where CFZ533 may be administered weekly, bi-weekly or every 4 weeks for several weeks.

For example, an appropriate regimen for mAb1/CFZ533 or mAb2 can be weekly for several weeks [e.g., 1 to 4 weeks, e.g., dosing at weeks 0, 1, 2, and 3] followed by a monthly maintenance regimen.

In another example, an appropriate regimen for mAb1/CFZ533 or mAb2 is weekly for several weeks (e.g., 2 to 8 weeks, such as 3 weeks, e.g., dosing at weeks 0, 1, 2) followed by a bi-weekly maintenance regimen.

It will also be understood that administration (e.g for mAb1/CFZ533 or mAb2) may be less frequent than monthly dosing, e.g., dosing every 6 weeks, every 8 weeks (every two months), quarterly (every three months), etc.

It will be understood that dose escalation may be appropriate for certain HS patients, based on severity of the disease, e.g., patients that display inadequate response to treatment with the CD40 pathway antagonists, e.g. an anti-CD40 antibody or antigen binding fragment thereof (e.g., mAb1, also called CFZ533 herein, mAb2, ASKP1240) or anti-CD40L antibody or antigen-binding fragment thereof to be employed. Thus, subcutaneous (s.c.) dosages (loading or maintenance doses) may be greater than about 150 mg to about 900 mg s.c., e.g., about 75 mg, about 100 mg, about 125 mg, about 175 mg, about 200 mg, about 250 mg, about 350 mg, about 400 mg, about 450 mg, about 500 mg, about 600 mg, etc.; similarly, intravenous (i.v.) dosages may be greater than about 10 mg/kg, e.g., about 11 mg/kg, 12 mg/kg, 15 mg/kg, 20 mg/kg, 25 mg/kg, 30 mg/kg, 35 mg/kg, etc. It will also be understood that dose reduction may also be appropriate for certain HS patients, e.g., patients that display adverse events or an adverse response to treatment with the CD40 pathway antagonist (e.g. an anti-CD40 antibody or antigen binding fragment thereof (e.g., mAb1, also called CFZ533 herein, mAb2, ASKP1240) or anti-CD40L antibody or antigen-binding fragment thereof). Thus, dosages of the CD40 pathway antagonist (e.g. an anti-CD40 antibody or antigen binding fragment thereof (e.g., mAb1, also called CFZ533 herein, mAb2, ASKP1240) or anti-CD40L antibody or antigen-binding fragment thereof), may be less than about 150 mg to about 900 mg s.c., e.g., about 25 mg, about 50 mg, about 75 mg, about 100 mg, about 125 mg, about 175 mg, about 200 mg, about 250 mg, about 350 mg, about 400 mg, about 450 mg, about 500 mg, about 600 mg, etc.

In some embodiments, the CD40 antagonist, e.g. an anti-CD40 antibody or antigen binding fragment thereof (e.g., mAb1, also called CFZ533 herein, mAb2, ASKP1240) or anti-CD40L antibody or antigen-binding fragment thereof may be administered to the patient at an initial dose of 600 mg delivered s.c., and the dose may be then adjusted to 150 mg or 300 mg delivered s.c. if needed, as determined by a physician.

In some embodiments, the CD40 antagonist, e.g. an anti-CD40 antibody or antigen binding fragment thereof (e.g., mAb1, also called CFZ533 herein, mAb2, ASKP1240) or anti-CD40L antibody or antigen-binding fragment thereof may be administered to the patient at an initial dose of 10 mg/kg delivered i.v., and the dose may be then adjusted to 150 mg or 300 mg delivered s.c. if needed, as determined by a physician.

In a specific embodiment, 3 mg/kg CFZ533 is administered s.c. on day 1 (D1), day 15 (D15), D29, D57, D85, D99, D113, and D141.

In another specific embodiment, 10 mg/kg CFZ533 is administered i.v. on D1, D15, D29, D57, D85, D99, D113, and D141.

In yet another specific embodiment, a loading dose which comprises four unit doses of 600 mg CFZ533 administered s.c. once weekly (Q1W), i.e. 600 mg CFZ533 s.c. on D1, D8, D15 and D22, followed by a maintenance dose which comprises unit doses of 300 mg administered s.c. once weekly (Q1W), i.e. 300 mg CFZ533 s.c. once weekly from D29 to D85.

In a further specific embodiment, a loading dose which comprises one dose of 10 mg CFZ533 per kg of the subject, administered i.v. one time on day 1, followed by a maintenance dose which comprises unit doses of 300 mg administered s.c. once weekly (Q1W), i.e. 300 mg CFZ533 s.c. once weekly from D8 to D85.

CFZ533 may be administered quarterly, monthly, weekly or biweekly e.g. subcutaneously at a dosing of about 75 mg to about 600 mg or about 150 mg to about 300 mg being administered, by subcutaneous injection, at an unit dose of about 75 mg, about 150 mg, about 300 mg, about 450 mg or about 600 mg.

CFZ533 may be administered by subcutaneous injection, weekly, with loading doses of about 150 mg to about 600 mg, wherein the loading doses are administered during 1 to 4 weeks.

The loading dose may also be an i.v. administration of about 10 mg/kg to about 30 mg/kg. Also, the loading doses may be administered subcutaneously weekly or biweekly with doses of about 150 mg, 300 mg and/or 600 mg of the active ingredient.

The loading regimen or dosing of CFZ533 (such as 150/300/600 mg, weekly or bi-weekly) is preferably followed by a maintenance regimen or dosing, administered weekly, biweekly or monthly (every four weeks). The maintenance dose is preferably 300 mg s.c. weekly or bi-weekly, or 600 mg bi-weekly or 600 mg every 4 weeks.

The anti-CD40 antibody or antigen-binding fragment thereof may be CFZ533, a functional derivative thereof or a biosimilar thereof.

As herein defined, "unit dose" refers to a s.c. dose that can be comprised between about 75 mg to 900 mg, e.g. about 150 mg to about 600 mg, e.g. about 150 mg to about 600 mg, e.g. about 300 mg to about 600 mg, or a e.g. about 150 mg to about 300 mg. For example an unit s.c. dose is about 75 mg, about 150 mg, about 300 mg, about 350 mg, about 400 mg, about 450 mg, about 500 mg, about 550 mg, about 600 mg.

Definitions

As used herein, CD40 refers to cluster of differentiation 40, also called tumor necrosis factor receptor superfamily member 5. The term CD40 refers to human CD40, for example as defined in SEQ ID NO: 19, unless otherwise described.

The term "about" in relation to a numerical valuexmeans, for example, +/−10%. When used in front of a numerical range or list of numbers, the term "about" applies to each number in the series, e.g., the phrase "about 1-5" should be interpreted as "about 1-about 5", or, e.g., the phrase "about 1, 2, 3, 4" should be interpreted as "about 1, about 2, about 3, about 4, etc."

The word "substantially" does not exclude "completely," e.g., a composition which is "substantially free" from Y may be completely free from Y. Where necessary, the word "substantially" may be omitted from the definition of the disclosure.

The term "comprising" encompasses "including" as well as "consisting," e.g., a composition "comprising" X may consist exclusively of X or may include something additional, e.g., X+Y.

AUC0-t designates the area under the plasma concentration-time curve from time zero to time 't' where t is a defined time point after administration [mass×time/volume].

AUCtx-ty represents the area under the plasma concentration-time curve from time 'x' to time 'y' where 'time x' and 'time y' are defined time points after administration.

$C_{max}$ is the observed maximum plasma concentration following drug administration [mass/volume].

$C_{min}$ is the observed minimum plasma concentration following drug administration $C_{trough}$ is the observed plasma concentration that is just prior to the beginning of, or at the end of a dosing interval.

$T_{max}$ is the time to reach the maximum concentration after drug administration [time].

ss (subscript) indicate that the parameter is defined at steady state.

The term "antibody" or "anti-CD40 antibody" and the like as used herein refers to whole antibodies that interact with (e.g., by binding, steric hindrance, stabilizing/destabilizing, spatial distribution) a CD40. A naturally occurring "antibody" is a glycoprotein comprising at least two heavy (H) chains and two light (L) chains inter-connected by disulfide bonds. Each heavy chain is comprised of a heavy chain variable region (abbreviated herein as VH) and a heavy chain constant region. The heavy chain constant region is comprised of three domains, CH1, CH2 and CH3. Each light chain is comprised of a light chain variable region (abbreviated herein as VL) and a light chain constant region. The light chain constant region is comprised of one domain, CL. The VH and VL regions can be further subdivided into regions of hypervariability, termed complementarity determining regions (CDRs), interspersed with regions that are more conserved, termed framework regions (FRs). Each VH and VL is composed of three CDRs and four FRs arranged from amino-terminus to carboxy-terminus in the following order: FR1, CDR1, FR2, CDR2, FR3, CDR3, FR4. The variable regions of the heavy and light chains contain a binding domain that interacts with an antigen. The constant regions of the antibodies may mediate the binding of the immunoglobulin to host tissues or factors, including various cells of the immune system (e.g., effector cells) and the first component (Clq) of the classical complement system. The term "antibody" includes for example, monoclonal antibodies, human antibodies, humanized antibodies, camelid antibodies, or chimeric antibodies. The antibodies can be of any isotype (e.g., IgG, IgE, IgM, IgD, IgA and IgY), class (e.g., IgG1, IgG2, IgG3, IgG4, IgA1 and IgA2) or subclass, preferably IgG and most preferably IgG1. Exemplary antibodies include CFZ533 (herein also designated mAb1) and mAb2, as set forth in Table 1.

Both the light and heavy chains are divided into regions of structural and functional homology. The terms "constant" and "variable" are used functionally. In this regard, it will be appreciated that the variable domains of both the light (VL) and heavy (VH) chain portions determine antigen recognition and specificity. Conversely, the constant domains of the light chain (CL) and the heavy chain (CH1, CH2 or CH3) confer important biological properties such as secretion, transplacental mobility, Fc receptor binding, complement binding, and the like. By convention the numbering of the constant region domains increases as they become more distal from the antigen binding site or amino-terminus of the antibody. The N-terminus is a variable region and at the C-terminus is a constant region; the CH3 and CL domains actually comprise the carboxy-terminus of the heavy and light chain, respectively. In particular, the term "antibody" specifically includes an IgG-scFv format.

The term "antigen binding portion" of an antibody (or simply "antigen portion"), as used herein, refers to full length or one or more fragments of an antibody, such as a protein, that retain the ability to specifically bind to an antigen or epitope (e.g., a portion of CD40).

The "Complementarity Determining Regions" ("CDRs") are amino acid sequences with boundaries determined using any of a number of well-known schemes, including those described by Kabat et al. (1991), "Sequences of Proteins of Immunological Interest," 5th Ed. Public Health Service, National Institutes of Health, Bethesda, MD ("Kabat" numbering scheme), Al-Lazikani et al., (1997) JMB 273, 927-948 ("Chothia" numbering scheme) and ImMunoGenTics (IMGT) numbering (Lefranc, M.-P., The Immunologist, 7, 132-136 (1999); Lefranc, M.-P. et al., Dev. Comp. Immunol., 27, 55-77 (2003) ("IMGT" numbering scheme). Under IMGT, the CDR regions of an antibody can be determined using the program IMGT/DomainGap Align.

The term "epitope" as used herein refers to any determinant capable of binding with high affinity to an immunoglobulin. An epitope is a region of an antigen that is bound by an antibody that specifically targets that antigen, and when the antigen is a protein, includes specific amino acids that directly contact the antibody. Most often, epitopes reside on proteins, but in some instances, may reside on other kinds of molecules, such as nucleic acids. Epitope determinants may include chemically active surface groupings of molecules such as amino acids, sugar side chains, phosphoryl or sulfonyl groups, and may have specific three dimensional structural characteristics, and/or specific charge characteristics. Furthermore, although the two domains of the Fv fragment, VL and VH, are coded for by separate genes, they can be joined, using recombinant methods, by a synthetic linker that enables them to be made as a single protein chain in which the VL and VH regions pair to form monovalent molecules (known as single chain Fv (scFv); see e.g., Bird et al., (1988) Science 242:423-426; and Huston et al., (1988) Proc. Natl. Acad. Sci. 85:5879-5883).

The phrase "isolated antibody", as used herein, refers to antibody that is substantially free of other antibodies having different antigenic specificities (e.g., an isolated antibody that specifically binds CD40 is substantially free of antibodies that specifically bind antigens other than CD40). An isolated antibody that specifically binds CD40 may, however, have cross-reactivity to other antigens, such as CD40 molecules from other species. Moreover, an isolated antibody may be substantially free of other cellular material and/or chemicals. The term "monoclonal antibody" or "monoclonal antibody composition" as used herein refer to a preparation of antibody molecules of single molecular composition. The term "human antibody", as used herein, is intended to include antibodies having variable regions in which both the framework and CDR regions are derived from sequences of human origin. A "human antibody" need not be produced by a human, human tissue or human cell. The human antibodies of the disclosure may include amino acid residues not encoded by human sequences (e.g., mutations introduced by random or site-specific mutagenesis in vitro, by N-nucleotide addition at junctions in vivo during recombination of antibody genes, or by somatic mutation in vivo).

"Identity" with respect to a native polypeptide and its functional derivative is defined herein as the percentage of amino acid residues in the candidate sequence that are identical with the residues of a corresponding native polypeptide, after aligning the sequences and introducing gaps, if necessary, to achieve the maximum percent identity, and not considering any conservative substitutions as part of the sequence identity. Neither N- or C-terminal extensions nor insertions shall be construed as reducing identity. Methods and computer programs for the alignment are well known. The percent identity can be determined by standard alignment algorithms, for example, the Basic Local Alignment Search Tool (BLAST) described by Altshul et al. ((1990) J. Mol. Biol., 215: 403 410); the algorithm of Needleman et al. ((1970) J. Mol. Biol., 48: 444 453); or the algorithm of Meyers et al. ((1988) Comput. Appl. Biosci., 4: 11 17). A set of parameters may be the Blosum 62 scoring matrix with a gap penalty of 12, a gap extend penalty of 4, and a frameshift gap penalty of 5. The percent identity between two amino acid or nucleotide sequences can also be determined using the algorithm of E. Meyers and W. Miller ((1989) CABIOS, 4:11-17) which has been incorporated into the ALIGN program (version 2.0), using a PAM120 weight residue table, a gap length penalty of 12 and a gap penalty of 4.

"Amino acid(s)" refer to all naturally occurring L-α-amino acids, e.g., and include D-amino acids. The phrase "amino acid sequence variant" refers to molecules with some differences in their amino acid sequences as compared to the sequences according to the present disclosure. Amino acid sequence variants of an antibody according to the present disclosure, e.g., of a specified sequence, still have the ability to bind the human CD40. Amino acid sequence variants include substitutional variants (those that have at least one amino acid residue removed and a different amino acid inserted in its place at the same position in a polypeptide according to the present disclosure), insertional variants (those with one or more amino acids inserted immediately adjacent to an amino acid at a particular position in a polypeptide according to the present disclosure) and deletional variants (those with one or more amino acids removed in a polypeptide according to the present disclosure).

The term "Fc region" as used herein refers to a polypeptide comprising the CH3, CH2 and at least a portion of the hinge region of a constant domain of an antibody. Optionally, an Fc region may include a CH4 domain, present in some antibody classes. An Fc region, may comprise the entire hinge region of a constant domain of an antibody. In one embodiment, the invention comprises an Fc region and a CH1 region of an antibody. In one embodiment, the invention comprises an Fc region CH3 region of an antibody. In another embodiment, the invention comprises an Fc region, a CH1 region and a $C_{kappa/lambda}$ region from the constant domain of an antibody. In one embodiment, a binding molecule of the invention comprises a constant region, e.g., a heavy chain constant region. In one embodiment, such a constant region is modified compared to a wild-type constant region. That is, the polypeptides of the invention disclosed herein may comprise alterations or modifications to one or more of the three heavy chain constant domains (CH1, CH2 or CH3) and/or to the light chain constant region domain (CL). Example modifications include additions, deletions or substitutions of one or more amino acids in one or more domains. Such changes may be included to optimize effector function, half-life, etc.

As used herein, the term "Affinity" refers to the strength of interaction between antibody and antigen at single antigenic sites. Within each antigenic site, the variable region of the antibody "arm" interacts through weak non-covalent forces with the antigen at numerous sites; the more interactions, the stronger the affinity. As used herein, the term "high affinity" for an IgG antibody or fragment thereof (e.g., a Fab fragment) refers to an antibody having a $K_D$ of $10^{-8}$ M or less, $10^{-9}$ M or less, or $10^{-10}$ M, or $10^{-11}$ M or less, or $10^{-12}$ M or less, or $10^{-13}$ M or less for a target antigen. However, high affinity binding can 10 vary for other antibody isotypes. For example, high affinity binding for an IgM isotype refers to an antibody having a $K_D$ of $10^{-7}$ M or less, or $10^{-8}$ M or less.

As used herein, an antibody or a protein that "specifically binds to CD40 polypeptide" is intended to refer to an antibody or protein that binds to human CD40 polypeptide with a $K_D$ of 100 nM or less, 10 nM or less, 1 nM or less.

An antibody that "cross-reacts with an antigen other than CD40" is intended to refer to an antibody that binds that antigen with a $K_D$ of 1 μM or less, 100 nM or less, 10 nM or less, 1 nM or less. An antibody that "does not cross-react with a particular antigen" is intended to refer to an antibody that binds to that antigen, with a $K_D$ of 100 nM or greater, or a $K_D$ of 1 μM or greater, or a $K_D$ of 10 μM or greater. In certain embodiments, such antibodies that do not cross-react with the antigen exhibit essentially undetectable binding against these proteins in standard binding assays.

The term "$K_{assoc}$" or "$K_a$", as used herein, is intended to refer to the association rate of a particular antibody-antigen interaction, whereas the term "$K_{dis}$" or "$K_d$," as used herein, is intended to refer to the dissociation rate of a particular antibody-antigen interaction.

The term "$K_D$", as used herein, is intended to refer to the dissociation constant, which is obtained from the ratio of $K_d$ to $K_a$ (i.e. $K_d/K_a$) and is expressed as a molar concentration (M). $K_D$ values for antibodies can be determined using methods well established in the art. A method for determining the $K_D$ of an antibody is by using surface plasmon resonance, or using a biosensor system such as a Biacore® system.

As used herein, the term "ADCC" or "antibody-dependent cellular cytotoxicity" activity refers to cell depleting activity. ADCC activity can be measured by the ADCC assay as well known to a person skilled in the art.

As used herein, the term "silent" antibody refers to an antibody that exhibits no or low ADCC activity as measured in an ADCC assay.

In one embodiment, the term "no or low ADCC activity" means that the silent antibody exhibits an ADCC activity that is below 50% specific cell lysis, for example below 10% specific cell lysis as measured in a standard ADCC assay. No ADCC activity means that the silent antibody exhibits an ADCC activity (specific cell lysis) that is below 1%.

Silenced effector functions can be obtained by mutation in the Fc region of the antibodies and have been described in the art: LALA and N297A (Strohl, W., 2009, Curr. Opin. Biotechnol. vol. 20(6):685-691); and D265A (Baudino et al., 2008, J. Immunol. 181:6664-69; Strohl, W., supra). Examples of silent Fc IgG1 antibodies comprise the so-called LALA mutant comprising L234A and L235A mutation in the IgG1 Fc amino acid sequence. Another example of a silent IgG1 antibody comprises the D265A mutation. Another silent IgG1 antibody comprises the N297A mutation, which results in aglycosylated/non-glycosylated antibodies.

As used herein, the term "inhibit", "inhibition" or "inhibiting" refers to the reduction or suppression of a given condition, symptom, or disorder, or disease, or a significant decrease in the baseline activity of a biological activity or process.

As used herein, the term "treat", "treating" or "treatment" of any disease or disorder refers in one embodiment, to ameliorating the disease or disorder (i.e., slowing or arresting or reducing the development or progression of the disease or at least one of the clinical symptoms thereof). In another embodiment "treat", "treating" or "treatment" refers to alleviating or ameliorating at least one physical parameter including those which may not be discernible by the patient. In yet another embodiment, "treat", "treating" or "treatment" refers to modulating the disease or disorder, either physically, (e.g., stabilization of a discernible symptom), physiologically, (e.g., stabilization of a physical parameter), or both. More specifically, the term "treating" the disease HS refers to treating the inflammatory lesions in HS patients (in numbers or quality or reducing their volume and size), and/or treating the abscesses and inflammatory nodules and/or draining fistulae in HS patients, and/or decreasing the amount of scarring and/or relieving the functional limitations associated with scarring. Treating the disease HS also refers to alleviating the pain, fatigue and/or itching associated with HS, reducing pus release and reducing the odor associated with pus release, and/or improving the quality of life and/or reducing the work impairment for HS patients.

As used herein, the term "prevention" refers delaying the onset or development or progression of the disease or disorder. More specifically, the term "preventing" the disease HS refers to preventing HS flares and or new lesions to appear; preventing scarring and preventing functional limitations associated with scarring and/or in particular preventing surgical interventions for HS.

As used herein, a subject is "in need of" a treatment if such subject would benefit biologically, medically or in quality of life from such treatment.

The term "pharmaceutically acceptable" means a nontoxic material that does not interfere with the effectiveness of the biological activity of the active ingredient(s).

As used herein, the term "administration" or "administering" of the subject compound means providing a compound of the invention and prodrugs thereof to a subject in need of treatment. Administration "in combination with" one or more further therapeutic agents includes simultaneous (concurrent) and consecutive administration in any order, and in any route of administration. One administration may be a single injection, or multiple injections delivered in conjunction with each other, depending on how much drug substance needs to be administered to achieve therapeutic effect.

As used herein, a "therapeutically effective amount" refers to an amount of an anti-CD40 antibody or antigen binding fragment thereof, e.g., mAb1, that is effective, upon single or multiple dose administration to a patient (such as a human) for treating, preventing, preventing the onset of, curing, delaying, reducing the severity of, ameliorating at least one symptom of a disorder or recurring disorder, or prolonging the survival of the patient beyond that expected in the absence of such treatment. When applied to an individual active ingredient (e.g., an anti-CD40 antibody, e.g., mAb1) administered alone, the term refers to that ingredient alone. When applied to a combination, the term refers to combined amounts of the active ingredients that result in the therapeutic effect, whether administered in combination, serially or simultaneously.

The phrase "therapeutic regimen" means the regimen used to treat an illness, e.g., the dosing protocol used during the treatment of HS. A therapeutic regimen may include an loading regimen (or loading dosing), followed by a maintenance regimen (or maintenance dosing).

The phrase "loading regimen" or "loading period" refers to a treatment regimen (or the portion of a treatment regimen) that is used for the initial treatment of a disease. In some embodiments, the disclosed methods, uses, kits, processes and regimens (e.g., methods of treating HS) employ a loading regimen (or loading dosing). In some cases, the loading period is the period until maximum efficacy is reached. The general goal of a loading regimen is to provide a high level of drug to a patient during the initial period of a treatment regimen. A loading regimen may include administering a greater dose of the drug than a physician would employ during maintenance regimen, administering a drug more frequently than a physician would administer the drug during a maintenance regimen, or both. Dose escalation may occur during or after the loading regimen.

The phrase "maintenance regimen" or "maintenance period" refers to a treatment regimen (or the portion of a treatment regimen) that is used for the maintenance of a patient during treatment of an illness, e.g., to keep the patient in remission for long periods of time (months or years) following the loading regimen or period. In some embodiments, the disclosed methods, uses and regimens employ a maintenance regimen. A maintenance regimen may employ continuous therapy (e.g., administering a drug at a regular intervals, e.g., weekly, bi-weekly or monthly (every 4 weeks), yearly, etc.) or intermittent therapy (e.g., interrupted treatment, intermittent treatment, treatment at relapse, or treatment upon achievement of a particular predetermined criteria [e.g., pain, disease manifestation, etc.]). Dose escalation may occur during a maintenance regimen.

The phrase "means for administering" is used to indicate any available implement for systemically administering a drug to a patient, including, but not limited to, a pre-filled syringe, a vial and syringe, an injection pen, an autoinjector, an i.v. drip and bag, a pump, a patch pump, etc. With such items, a patient may self-administer the drug (i.e., administer the drug on their own behalf) or a physician may administer the drug.

Example 1. CD40 Antagonists

Anti-CD40 mAbs with silenced ADCC activity have been disclosed in U.S. Pat. Nos. 8,828,396 and 9,221,913, incorporated by reference here in their entirety. Anti-CD40 mAbs with silenced ADCC activity are predicted to have an improved safety profile relative to other anti-CD40 antibodies, and in particular may be more suitable for non-oncologic indications, hidradenitis suppurativa (HS).

According to a non-binding hypothesis of the inventors, the two mAbs from U.S. Pat. Nos. 8,828,396 and 9,221,913, designated mAb1 and mAb2, are thought to be suitable compounds for treatment of HS. The antibody mAb1, also called CFZ533, is particularly preferred.

mAb1 inhibits CD154-induced activation in vitro and T cell-dependent antibody formation and germinal center formation in vivo.

To enable a person skilled in the art to practice the invention, the amino acid and nucleotide sequences of mAb1 and mAb2 are provided in Table 1 below.

Another anti-CD40 mAb known in the art is ASKP1240 from Astellas Pharma/Kyowa Hakko Kirin Co, as described e.g. in U.S. Pat. No. 8,568,725B2, incorporated by reference herein.

Yet another anti-CD40 mAb known in the art is BI655064 from Boehringer Ingelheim, as described e.g. in U.S. Pat. No. 8,591,900, incorporated by reference herein.

A further anti-CD40 mAb known in the art is FFP104 by Fast Forward Pharmaceuticals, as described e.g. in U.S. Pat. No. 8,669,352, incorporated by reference herein.

Another treatment modality might be MEDI4920 from AstraZeneca, which is a Anti-CD40L-Tn3 fusion protein, or the anti-CD40L antibody BIIB063 from Biogen, dapirolizumab pegol from UCB/Biogen, or letolizumab from Bristol-Myers Squibb.

Antibodies with the same mode of action as the above mentioned antibodies, so called biosimilars, are also covered by the disclosure, as will be appreciated by a person skilled in the art.

TABLE 1

Sequence table

| SEQ ID NO: | Description of sequence | Detailed amino acid or nucleotide sequences |
|---|---|---|
| 1 | HCDR1 of mAb 1 and mAb2 (Kabat) | SYGMH |
| 2 | HCDR2 of mAb 1 and mAb2 (Kabat) | VISYEESNRYHADSVRG |
| 3 | HCDR3 of mAb 1 and mAb2 (Kabat) | DGGIAAPGPDY |
| 4 | LCDR1 of mAb 1 and mAb2 (Kabat) | RSSQSLLYSNGYNYLD |
| 5 | LCDR2 of mAb 1 and mAb2 (Kabat) | LGSNRAS |
| 6 | LCDR3 of mAb 1 and mAb2 (Kabat) | MQARQTPFT |
| 7 | Variable Heavy chain of mAb1 and mAb2 | QVQLVESGGGVVQPGRSLRLSCAASGFTFSSYGMHWVRQAPGRGLEWVAVISYEESNRYHADSVRGRFTISRDNSRITLYLQMNSLRTEDTAVYYCARDGGIAAPGPDYWGQGTLVTVSS |
| 8 | Variable light chain of mAb1 and mAb2 | DIVMTQSPLSLTVTPGEPASISCRSSQSLLYSNGYNYLDWYLQRPGQSPQVLISLGSNRASGVPDRFSGSGSGTDFTLKISRVEAEDVGVYYCMQARQTPFTFGPGTRVDIR |
| 9 | Full length heavy chain of mAb1 | QVQLVESGGGVVQPGRSLRLSCAASGFTFSSYGMHWVRQAPGRGLEWVAVISYEESNRYHADSVRGRFTISRDNSKITLYLQMNSLRTEDTAVYYCARDGGIAAPGPDYWGQGTLVTVSSASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKRVEPKSCDKTHTCPPCPAPELLGGPSVFLFPPKPKDTLMISRTPEVTCVVVDVSHEDPEVKFNWYVDGVEVHNAKTKPREEQYASTYRVVSVLTVLHQDWLNGKEYKCKVSNKALPAPIEKTISKAKGQPREPQVYTLPPSREEMTKNQVSLTCLVKGFYPSDIAVEWESNGQPENNYKTTPPVLDSDGSFFLYSKLTVDKSRWQQGNVFSCSVMHEALHNHYTQKSLSLSPGK |
| 10 | Full length light chain of mAb 1 | DIVMTQSPLSLTVTPGEPASISCRSSQSLLYSNGYNYLDWYLQKPGQSPQVLISLGSNRASGVPDRFSGSGSGTDFTLKISRVEAEDVGVYYCMQARQTPFTFGPGTKVDIRRTVAAPSVFIFPPSDEQLKSGTASVVCLLNNFYPREAKVQWKVDNALQSGNSQESVTEQDSKDSTYSLSSTLTLSKADYEKHKVYACEVTHQGLSSPVTKSFNRGEC |
| 11 | Full length heavy chain of mAb2 | QVQLVESGGGVVQPGRSLRLSCAASGFTFSSYGMHWVRQAPGKGLEWVAVISYEESNRYHADSVKGRFTISRDNSKITLYLQMNSLRTEDTAVYYCARDGGIAAPGPDYWGQGTLVTVSSASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKRVEPKSCDKTHTCPPCPAPELLGGPSVFLFPPKPKDTLMISRTPEVTCVVVAVSHEDPEVKFNWYVDGVEVHNAKTKPREEQYNSTYRVVSVLTVLHQDWLNGKEYKCKVSNKALPAPIEKTISKAKGQPREPQVYTLPPSREEMTKNQVSLTCLVKGFYPSDIAVEWESNGQPENNYKTTPPVLDSDGSFFLYSKLTVDKSRWQQGNVFSCSVMFIEALHNHYTQKSLSLSPGK |

TABLE 1-continued

Sequence table

| SEQ ID NO: | Description of sequence | Detailed amino acid or nucleotide sequences |
|---|---|---|
| 12 | Full length light chain of mAb2 | DIVMTQSPLSLTVTP GEPASISCRSSQSLL YSNGYNYLDWYLQKP GQSPQVLISLGSNRA SGVPDRFSGSGSGTD FTLKISRVEAEDVGV YYCMQARQTPFTFGP GTKVDIRRTVAAPSV FIFPPSDEQLKSGTA SVVCLLNNFYPREAK VQWKVDNALQSGNSQ ESVTEQDSKDSTYSL SSTLTLSKADYEKHK VYACEVTHQGLSSPV TKSFNRGEC |
| 13 | Fc region of mAb1 | APELLGGPSVFLFPP KPKDTLMISRTPEVT CVVVDVSHEDPEVKF NWYVDGVEVHNAKTK PREEQYASTYRVVSV LTVLHQDWLNGKEYK CKVSNKALPAPIEKT ISKAKGQPREPQVYT LPPSREEMTKNQVSL TCLVKGFYPSDIAVE WESNGQPENNYKTTP PVLDSDGSFFLYSKL TVDKSRWQQGNVFSC SVMHEALHNHYTQKS LSLSPGK |
| 14 | Fc region of mAb2 | APELLGGPSVFLFPP KPKDTLMISRTPE VTCVVVAVSH EDPEVKFNWYVDGVE VHNAKTKPREEQYNS TYRVVSVLTVLHQDW LNGKEYKCKVSNKAL PAPIEKTISKAKGQP REPQVYTLPPSREEM TKNQVSLTCLVKGFY PSDIAVEWESNGQPE NNYKTTPPVLDSDGS FFLYSKLTVDKSRWQ QGNVFSCSVMHEALH NHYTQKSLSLSPGK |
| 15 | DNA encoding Full length heavy chain of mAb1 | CAGGTGCAGCTGGTG GAATCTGGCGGCGGA GTGGTGCAGCCTGGC CGGTCCCTGAGACTG TCTTGCGCCGCCTCC GGCTTCACCTTCTCC AGCTACGGCATGCAC TGGGTGCGACAGGCC CCTGGCAAGGGACTG GAATGGGTGGCCGTG ATCTCCTACGAGGAA TCCAACAGATACCAC GCTGACTCCGTGAAG GGCCGGTTCACAATC TCCCGGGACAACTCC AAGATCACCCTGTAC CTGCAGATGAACTCC CTGCGGACCGAGGAC ACCGCCGTGTACTAC TGCGCCAGGGACGGA GGAATCGCCGCTCCT GGACCTGATTATTGG GGCCAGGGCACCCTG GTGACAGTGTCCTCC GCTAGCACCAAGGGC CCCTCCGTGTTCCCT CTGGCCCCCTCCAGC AAGTCCACCTCTGGC GGCACCGCCGCTCTG GGCTGCCTGGTGAAA GACTACTTCCCCGAG CCCGTGACCGTGTCC TGGAACTCTGGCGCC CTGACCTCCGGCGTG CACACCTTTCCAGCC GTGCTGCAGTCCTCC GGCCTGTACTCCCTG TCCTCCGTGGTGACC GTGCCCTCTAGCTCT CTGGGCACCCAGACC TACATCTGCAACGTG AACCACAAGCCCTCC AACACCAAGGTGGAC AAGCGGGTGGAACCC AAGTCCTGCGACAAG ACCCACACCTGTCCC CCTGCCCTGCCCCT GAACTGCTGGGCGGA CCTTCCGTGTTCCTG TTCCCCCCAAAGCCC AAGGACACCCTGATG ATCTCCCGGACCCCC GAAGTGACCTGCGTG GTGGTGGACGTGTCC CACGAGGACCCTGAA GTGAAGTTCAATTGG TACGTGGACGGCGTG GAAGTGCACAACGCC AAGACCAAGCCCAGA GAGGAACAGTACGCC TCCACCTACCGGGTG GTGTCTGTGCTGACC GTGCTGCACCAGGAC TGGCTGAACGGCAAA GAGTACAAGTGCAAG GTCTCCAACAAGGCC CTGCCTGCCCCCATC GAAAAGACCATCTCC AAGGCCAAGGGCCAG CCCCGCGAGCCACAG GTGTACACACTGCCC CCCAGCCGGGAAGAG ATGACCAAGAACCAG GTGTCCCTGACCTGT CTGGTCAAAGGCTTC TACCCCTCCGATATC GCCGTGGAGTGGGAG TCCAACGGACAGCCC GAGAACAACTACAAG ACCACCCCCCCTGTG CTGGACTCCGACGGC TCATTCTTCCTGTAC TCCAAGCTGACCGTG GACAAGTCCCGGTGG CAGCAGGGCAACGTG TTCTCCTGCTCCGTG ATGCACGAGGCCCTG CACAACCACTACACC CAGAAGTCCCTGTCC CTGAGCCCCGGCAAG |
| 16 | DNA encoding Full length light chain of mAb1 | GACATCGTGATGACC CAGTCCCCCCTGTCC CTGACCGTGACACCT GGCGAGCCTGCCTCT ATCTCCTGCAGATCC TCCCAGTCCCTGCTG TACTCCAACGGCTAC |

TABLE 1-continued

Sequence table

| SEQ ID NO: | Description of sequence | Detailed amino acid or nucleotide sequences |
|---|---|---|
| | | AACTACCTGGACTGG |
| | | TATCTGCAGAAGCCC |
| | | GGCCAGTCCCCACAG |
| | | GTGCTGATCTCCCTG |
| | | GGCTCCAACAGAGCC |
| | | TCTGGCGTGCCCGAC |
| | | CGGTTCTCCGGCTCT |
| | | GGCTCTGGCACCGAC |
| | | TTCACACTGAAGATC |
| | | TCACGGGTGGAAGCC |
| | | GAGGACGTGGGCGTG |
| | | TACTACTGCATGCAG |
| | | GCCCGGCAGACCCCC |
| | | TTCACCTTCGGCCCT |
| | | GGCACCAAGGTGGAC |
| | | ATCCGGCGTACGGTG |
| | | GCCGCTCCCAGCGTG |
| | | TTCATCTTCCCCCCC |
| | | AGCGACGAGCAGCTG |
| | | AAGAGCGGCACCGCC |
| | | AGCGTGGTGTGCCTG |
| | | CTGAACAACTTCTAC |
| | | CCCCGGGAGGCCAAG |
| | | GTGCAGTGGAAGGTG |
| | | GACAACGCCCTGCAG |
| | | AGCGGCAACAGCCAG |
| | | GAGAGCGTCACCGAG |
| | | CAGGACAGCAAGGAC |
| | | TCCACCTACAGCCTG |
| | | AGCAGCACCCTGACC |
| | | CTGAGCAAGGCCGAC |
| | | TACGAGAAGCATAAG |
| | | GTGTACGCCTGCGAG |
| | | GTGACCCACCAGGGC |
| | | CTGTCCAGCCCCGTG |
| | | ACCAAGAGCTTCAAC |
| | | AGGGGCGAGTGC |
| 17 | DNA encoding Full length heavy chain of mAb2 | CAGGTGCAGCTGGTG |
| | | GAATCTGGCGGCGGA |
| | | GTGGTGCAGCCTGGC |
| | | CGGTCCCTGAGACTG |
| | | TCTTGCGCCGCCTCC |
| | | GGCTTCACCTTCTCC |
| | | AGCTACGGCATGCAC |
| | | TGGGTGCGACAGGCC |
| | | CCTGGCAAGGGACTG |
| | | GAATGGGTGGCCGTG |
| | | ATCTCCTACGAGGAA |
| | | TCCAACAGATACCAC |
| | | GCTGACTCCGTGAAG |
| | | GGCCGGTTCACAATC |
| | | TCCCGGGACAACTCC |
| | | AAGATCACCCTGTAC |
| | | CTGCAGATGAACTCC |
| | | CTGCGGACCGAGGAC |
| | | ACCGCCGTGTACTAC |
| | | TGCGCCAGGGACGGA |
| | | GGAATCGCCGCTCCT |
| | | GGACCTGATTATTGG |
| | | GGCCAGGGCACCCTG |
| | | GTGACAGTGTCCTCC |
| | | GCTAGCACCAAGGGC |
| | | CCCTCCGTGTTCCCT |
| | | CTGGCCCCCTCCAGC |
| | | AAGTCCACCTCTGGC |
| | | GGCACCGCCGCTCTG |
| | | GGCTGCCTGGTGAAA |
| | | GACTACTTCCCCGAG |
| | | CCCGTGACCGTGTCC |
| | | TGGAACTCTGGCGCC |
| | | CTGACCTCCGGCGTG |
| | | CACACCTTTCCAGCC |

TABLE 1-continued

Sequence table

| SEQ ID NO: | Description of sequence | Detailed amino acid or nucleotide sequences |
|---|---|---|
| | | GT |
| | | GCTGCAGTCCTCCGG |
| | | CCTGTACTCCCTGTC |
| | | CTCCGTGGTGACCGT |
| | | GCCCTCTAGCTCTCT |
| | | GGGCACCCAGACCTA |
| | | CATCTGCAACGTGAA |
| | | CCACAAGCCCTCCAA |
| | | CACCAAGGTGGACAA |
| | | GCGGGTGGAACCCAA |
| | | GTCCTGCGACAAGAC |
| | | CCACACCTGTCCCCC |
| | | CTGCCCTGCCCCTGA |
| | | ACTGCTGGGCGGACC |
| | | TTCCGTGTTCCTGTT |
| | | CCCCCCAAAGCCCAA |
| | | GGACACCCTGATGAT |
| | | CTCCCGGACCCCCGA |
| | | AGTGACCTGCGTGGT |
| | | GGTGGACGTGTCCCA |
| | | CGAGGACCCTGAAGT |
| | | GAAGTTCAATTGGTA |
| | | CGTGGACGGCGTGGA |
| | | AGTGCACAACGCCAA |
| | | GACCAAGCCCAGAGA |
| | | GGAACAGTACAACTC |
| | | CACCTACCGGGTGGT |
| | | GTCTGTGCTGACCGT |
| | | GCTGCACCAGGACTG |
| | | GCTGAACGGCAAAGA |
| | | GTACAAGTGCAAGGT |
| | | CTCCAACAAGGCCCT |
| | | GCCTGCCCCCATCGA |
| | | AAAGACCATCTCCAA |
| | | GGCCAAGGGCCAGCC |
| | | CCGCGAGCCACAGGT |
| | | GTACACACTGCCCCC |
| | | CAGCCGGGAAGAGAT |
| | | GACCAAGAACCAGGT |
| | | GTCCCTGACCTGTCT |
| | | GGTCAAAGGCTTCTA |
| | | CCCCTCCGATATCGC |
| | | CGTGGAGTGGGAGTC |
| | | CAACGGACAGCCCGA |
| | | GAACAACTACAAGAC |
| | | CACCCCCCCTGTGCT |
| | | GGACTCCGACGGCTC |
| | | ATTCTTCCTGTACTC |
| | | CAAGCTGACCGTGGA |
| | | CAAGTCCCGGTGGCA |
| | | GCAGGGCAACGTGTT |
| | | CTCCTGCTCCGTGAT |
| | | GCACGAGGCCCTGCA |
| | | CAACCACTACACCCA |
| | | GAAGTCCCTGTCCCT |
| | | GAGCCCCGGCAAG |
| 18 | DNA encoding Full length light chain of mAb2 | GACATCGTGATGACC |
| | | CAGTCCCCCCTGTCC |
| | | CTGACCGTGACACCT |
| | | GGCGAGCCTGCCTCT |
| | | ATCTCCTGCAGATCC |
| | | TCCCAGTCCCTGCTG |
| | | TACTCCAACGGCTAC |
| | | AACTACCTGGACTGG |
| | | TATCTGCAGAAGCCC |
| | | GGCCAGTCCCCACAG |
| | | GTGCTGATCTCCCTG |
| | | GGCTCCAACAGAGCC |
| | | TCTGGCGTGCCCGAC |
| | | CGGTTCTCCGGCTCT |
| | | GGCTCTGGCACCGAC |
| | | TTCACACTGAAGATC |

TABLE 1-continued

Sequence table

| SEQ ID NO: | Description of sequence | Detailed amino acid or nucleotide sequences |
|---|---|---|
| | | TCACGGGTGGAAGCC GAGGACGTGGGCGTG TACTACTGCATGCAG GCCCGGCAGACCCCC TTCACCTTCGGCCCT GGCACCAAGGTGGAC ATCCGGCGTACGGTG GCCGCTCCCAGCGTG TTCATCTTCCCCCCC AGCGACGAGCAGCTG AAGAGCGGCACCGCC AGCGTGGTGTGCCTG CTGAACAACTTCTAC CCCCGGGAGGCCAAG GTGCAGTGGAAGGTG GACAACGCCCTGCAG AGCGGCAACAGCCAG GAGAGCGTCACCGAG CAGGACAGCAAGGAC TCCACCTACAGCCTG AGCAGCACCCTGACC CTGAGCAAGGCCGAC TACGAGAAGCATAAG GTGTACGCCTGCGAG GTGACCCACCAGGGC CTGTCCAGCCCCGTG ACCAAGAGCTTCAAC AGGGGCGAGTGC |
| 19 | Amino acid sequence of human CD40 | MVRLPLQCVLWGCLL TAVHPEPPTACREKQ YLINSQCCSLCQPGQ KLVSDCTEFTETECL PCGESEFLDTWNRET HCHQHKYCDPNLGLR VQQKGTSETDTICTC EEGWHCTSEACESCV LHRSCSPGFGVKQIA TGVSDTICEPCPVGF FSNVSSAFEKCHPWT SCETKDLVVQQAGTN KTDVVCGPQDRLRAL VVIPIIFGILFAILL VLVFIKKVAKKPTNK APHPKQEPQEINFPD DLPGSNTAAPVQETL HGCQPVTQEDGKESR ISVQERQ |

In one embodiment, an anti-CD40 antibody is provided, said antibody comprising an immunoglobulin VH domain comprising the amino acid sequence of SEQ ID NO: 7 and an immunoglobulin VL domain comprising the amino acid sequence of SEQ ID NO: 8.

In one embodiment, an anti-CD40 antibody is provided, said antibody comprising an immunoglobulin VH domain comprising the hypervariable regions set forth as SEQ ID NO: 1, SEQ ID NO: 2, and SEQ ID NO: 3 and an immunoglobulin VL domain comprising the hypervariable regions set forth as SEQ ID NO: 4, SEQ ID NO: 5 and SEQ ID NO: 6.

In one embodiment, an anti-CD40 antibody is provided, said antibody comprising an immunoglobulin VH domain comprising the amino acid sequence of SEQ ID NO: 7 and an immunoglobulin VL domain comprising the amino acid sequence of SEQ ID NO: 8, and an Fc region of SEQ ID NO: 13.

In one embodiment, an anti-CD40 antibody is provided, said antibody comprising an immunoglobulin VH domain comprising the amino acid sequence of SEQ ID NO: 7 and an immunoglobulin VL domain comprising the amino acid sequence of SEQ ID NO: 8, and an Fc region of SEQ ID NO: 14.

In one embodiment, an anti-CD40 antibody is provided, said antibody comprising a silent Fc IgG1 region.

In a preferred embodiment, an anti-CD40 antibody designated mAb1 is provided. Specifically, mAb1 comprises the heavy chain amino acid sequence of SEQ ID NO: 9 and the light chain amino acid sequence of SEQ ID NO: 10; and mAb2 comprises the heavy chain amino acid sequence of SEQ ID NO: 11 and the light chain amino acid sequence of SEQ ID NO: 12.

1. Expression Systems

For expression of the light and heavy chains, the expression vector(s) encoding the heavy and light chains are transfected into a host cell by standard techniques. The various forms of the term "transfection" are intended to encompass a wide variety of techniques commonly used for the introduction of exogenous DNA into a prokaryotic or eukaryotic host cell, e.g., electroporation, calcium-phosphate precipitation, DEAE-dextran transfection and the like. It is theoretically possible to express the antibodies of the invention in either prokaryotic or eukaryotic host cells. Expression of antibodies in eukaryotic cells, for example mammalian host cells, yeast or filamentous fungi, is discussed because such eukaryotic cells, and in particular mammalian cells, are more likely than prokaryotic cells to assemble and secrete a properly folded and immunologically active antibody.

Particularly a cloning or expression vector can comprise either at least one of the following coding sequences (a)-(b), operatively linked to suitable promoter sequences:

(a) SEQ ID NO: 15 and SEQ ID NO: 16 encoding respectively the full length heavy and light chains of mAb1; or (b) SEQ ID NO: 17 and SEQ ID NO: 18 encoding respectively the full length heavy and light chains of mAb2.

Mammalian host cells for expressing the recombinant antibodies of the invention include Chinese Hamster Ovary (CHO cells) (including dhfr-CHO cells, described Urlaub and Chasin, 1980 Proc. Natl. Acad. Sci. USA 77:4216-4220 used with a DH FR selectable marker, e.g., as described in R. J. Kaufman and P. A. Sharp, 1982 Mol. Biol. 159:601-621), CHOK1 dhfr+ cell lines, NSO myeloma cells, COS cells and SP2 cells. In particular, for use with NSO myeloma cells, another expression system is the GS gene expression system shown in PCT Publications WO 87/04462, WO 89/01036 and EP0338841.

When recombinant expression vectors encoding antibody genes are introduced into mammalian host cells, the antibodies are produced by culturing the host cells for a period of time sufficient to allow for expression of the antibody in the host cells or secretion of the antibody into the culture medium in which the host cells are grown. Antibodies can be recovered from the culture medium using standard protein purification methods (See for example Abhinav et al. 2007, Journal of Chromatography 848: 28-37).

The host cells may be cultured under suitable conditions for the expression and production of mAb1 or mAb2.

2. Pharmaceutical Compositions

Therapeutic antibodies are typically formulated either in aqueous form ready for administration or as lyophilisate for reconstitution with a suitable diluent prior to administration. An anti-CD40 antibody may be formulated either as a lyophilisate, or as an aqueous composition, for example in pre-filled syringes. The formulation is also called drug product (DP).

Suitable formulation can provide an aqueous pharmaceutical composition or a lyophilisate which can be reconstituted to give a solution with a high concentration of the antibody active ingredient and a low level of antibody aggregation for delivery to a patient. High concentrations of antibody are useful as they reduce the amount of material which must be delivered to a patient. Reduced dosing volumes minimize the time taken to deliver a fixed dose to the patient. The aqueous compositions of the invention with high concentration of anti-CD40 antibodies are particularly suitable for subcutaneous administration.

Thus the invention provides an aqueous pharmaceutical composition, suitable for administration in a subject, e.g., for subcutaneous administration, comprising an anti-CD40 antibody such as mAb1 or mAb2.

The anti-CD40 antibody may be used as a pharmaceutical composition when combined with a pharmaceutically acceptable carrier. Such a composition may contain, in addition to an anti-CD40 antibody such as mAb1 or mAb2, carriers, various diluents, fillers, salts, buffers, stabilizers, solubilizers, and other materials well known in the art. The characteristics of the carrier will depend on the route of administration. The pharmaceutical compositions for use in the disclosed methods may also contain additional therapeutic agents for treatment of the particular targeted disorder.

In one specific embodiment the composition, also called drug product (DP) is a lyophilized formulation prepared from an aqueous formulation having a pH of 6.0 and comprising:
(i) 150 mg/mL mAb1 or mAb2
(ii) 270 mM sucrose as a stabilizer,
(iii) 30 mM L-histidine as a buffering agent, and
(iv) 0.06% Polysorbate 20 as a surfactant.

In another specific embodiment the pharmaceutical composition, also called drug product (DP), is an aqueous pharmaceutical composition has a pH of 6.0 and comprising:
(i) 150 mg/mL mAb1 or mAb2
(ii) 270 mM sucrose as a stabilizer,
(iii) 30 mM L-histidine as a buffering agent, and
(iv) 0.06% Polysorbate 20 as a surfactant.

3. Combinations

The invention further relates to combinations of a CD40 antagonist, particularly an anti-CD40 antibody, such as CFZ533 (iscalimab), with one or more additional therapeutic agents, for use in the treatment or prevention of HS, in a patient in need of such treatment and/or prevention.

Such additional therapeutic agents may be included in topical treatments (creams [non-steroidal or steroidal], washes, antiseptics,), systemic treatments (e.g., with biologicals, antibiotics, or chemical entities), antiseptics, photodynamic therapy, and surgical intervention (laser, draining or incision, excision).

Additional non-limiting therapeutic agents for use in combination with the disclosed CD40 antagonists, such as anti-CD40 antibodies antibodies, such as isclaimab, during treatment of HS Non-limiting examples of HS agents used in systemic treatment for use with the disclosed CD40 antagonists, include IL-17 antagonists (ixekizumab, brodalumab, secukinumab, CJM112), but as well IL17A/F antagonists such as bimekizumab or IL17C antagonists such as MOR106, tumor necrosis factor-alpha (TNF-alpha) blockers (such as Enbrel® (etanercept), Humira® (adalimumab), Remicade® (infliximab) and Simponi® (golimumab)), interleukin 12/23 blockers (such as Stelara® (ustekinumab), tasocitinib, and briakinumab), IL-23 blockers (such as guselkumab, tildrakizumab and risankizumab) p19 inhibitors, PDE4 inhibitors such as apremilast or Otezla®), complement pathway inhibitors, such as Factor B inhibitors (for example compounds disclosed in WO2015/009616, or LNP023 which is also known as 4-((2S,4S)-4-ethoxy-1-((5-methoxy-7-methyl)-1H-indol-4-yl)methyl)piperidin-2-yl)benzoic acid), C5a inhibitors (IFX-001, CCX168 also known as Avacopan), IL-1 antagonists (canakinumab, gevokizumab, rilonacept, anakinra, MaBp1 (XBiotech), Inflammasome inhibitors, such as NLRP3 inhibitors and NLRP5 inhibitors, CXCR1/2 inhibitors, IL-18 antagonists, IL-6 antagonists, IL-36 antagonists, CD20 antagonists, CTLA4 antagonists, IL-8 antagonists, B-cell depletors (particularly CD20 antagonists, such as rituximab, as well as BAFF-R and LTA4H inhibitors), IL-21 antagonists, IL-22 antagonist, VEGF antagonists, CXCL antagonists, MMP antagonists, and defensin antagonists (e.g., receptor decoys, antagonistic antibodies, etc.), as well as broad spectrum oral JAK inhibitors or more specific TYK2 or JAK 1, JAK2 or JAK 3 inhibitors.

Additional HS agents for use in combination with the disclosed CD40 antagonists, during treatment of HS include retinoids, such as Acitretin (e.g., Soriatane®) and isotretinoin, immune system suppressants (e.g., rapamycin, T-cell blockers [e.g., Amevive® (alefacept) and Raptiva® [efalizumab]) cyclosporine, methotrexate, mycophenolate mofetil, mycophenolic acid, leflunomide, tacrolimus, etc.), hydroxyurea (e.g., Hydrea®), sulfasalazine, 6-thioguanine, fumarates (e.g, dimethylfumarate and fumaric acid esters), azathioprine, colchicine, alitretinoin, steroids, corticosteroids, certolizumab, mometasone, rosiglitazone, pioglitazone, botulinum toxin, triamcinolone, IFX-1 (InflaRx), LY-3041658 (Eli Lilly), TE-2232 (Immunwork), NSAIDs, COX inhibitors, prescription narcotics, ketoprofen, codeine, gabapentin, pregabalin gentanyl, antibiotics (topical, oral, IV) (e.g., clindamycin, rifampin, tetracycline, sarecycline, doxycycline, minocycline, lymecycline, trimethoprim-sulfamethoxazole, erythromycin, ceftriaxone, moxifloxacin, metronidazole, separately or as combinations), corticosteroid (injectable or oral), antiandrogen/hormonal therapy (oral contraceptives, spironolactone, finasteride, dutasteride, progesterone IUD, cyproterone acetate, ethinyloestradiol, gestodene, norgestimate, desogestrel, drospirenone, spironolactone), Triamcinolone Acetonide, MEDI8968, hydroxychloroquine, dapsone, metformin, adapalene, azelaic acid and zinc.

Preferred combinations for used in the disclosed kits, methods, and uses include other biologics, such as TNFα blockers, IL-17 or IL23 and/or IL1 and/or IL18 blockers.

Examples of TNFα blockers for use in combination are etanercept, adalimumab, infliximab and golimumab. Examples of IL17 blockers are ixekizumab, brodalumab, secukinumab or CJM112. Examples of IL23 blockers are guselkumab, tildrakizumab and risankizumab. Examples of IL1 blockers are canakinumab, gevokizumab, rilonacept, anakinra, MaBp1 (XBiotech).

4. Route of Administration

Typically, the antibodies or proteins are administered by injection, for example, either intravenously, intraperitoneally, or subcutaneously. Methods to accomplish this administration are known to those of ordinary skill in the art. It may also be possible to obtain compositions that may be topically or orally administered, or which may be capable of transmission across mucous membranes. As will be appreciated by a person skilled in the art, any suitable means for administering can be used, as appropriate for a particular selected route of administration.

Examples of possible routes of administration include parenteral, (e.g., intravenous (I.V. or IV), intramuscular (IM), intradermal, subcutaneous (S.C. or SC), or infusion), oral and pulmonary (e.g., inhalation), nasal, transdermal (topical), transmucosal, and rectal administration. Solutions or suspensions used for parenteral, intradermal, or subcutaneous application can include the following components: a sterile diluent such as water for injection, saline solution, fixed oils, polyethylene glycols, glycerin, propylene glycol or other synthetic solvents; antibacterial agents such as benzyl alcohol or methyl parabens; antioxidants such as ascorbic acid or sodium bisulfite; chelating agents such as ethylenediaminetetraacetic acid; buffers such as acetates, citrates or phosphates and agents for the adjustment of tonicity such as sodium chloride or dextrose. pH can be adjusted with acids or bases, such as hydrochloric acid or sodium hydroxide. The parenteral preparation can be enclosed in ampoules, disposable syringes, or multiple dose vials made of glass or plastic.

An anti-CD40 therapy can be initiated by administering a loading regimen or loading dosing of the antibody or protein of the invention to the subject in need of anti-CD40 therapy. By "loading dose(s)" is intended an initial dosing of the anti-CD40 antibody or protein of the invention that is administered to the subject one or several times, where the dose of the antibody or protein of the invention administered falls within the higher dosing range (i.e., from about 10 mg/kg to about 50 mg/kg, such as about 30 mg/kg intravenously, or about 600 mg, or about 300 mg or about 150 mg weekly, bi-weekly for up to 4 weeks). The "loading regimen" can be administered as a single administration or multiple administrations, for example, a single or multiple intravenous infusion(s), or as multiple subcutaneous administrations combined in a "loading dosing" regimen depending on the severity of the disease). Following administration of the "loading regimen", the subject is then administered one or more additional therapeutically effective doses of the anti-CD40 antibody or protein of the invention. Subsequent therapeutically effective doses can be administered, for example, according to a weekly dosing schedule, or once every two weeks (bi-weekly), once every three weeks, or once every four weeks. In such embodiments, the subsequent therapeutically effective doses generally fall within the lower dosing range (i.e. about 0.003 mg/kg to about 30 mg/kg, such as about 10 mg/kg, e.g. 10 mg/kg IV or about 150 mg, about 300 mg or about 600 mg administered weekly, bi-weekly or every 4 weeks subcutaneously).

Alternatively, in some embodiments, following the "loading regimen", the subsequent therapeutically effective doses of the anti-CD40 antibody or protein of the invention are administered according to a "maintenance schedule", wherein the therapeutically effective dose of the antibody or protein of the invention is administered once a month, once every 6 weeks, once every two months, once every 10 weeks, once every three months, once every 14 weeks, once every four months, once every 18 weeks, once every five months, once every 22 weeks, once every six months, once every 7 months, once every 8 months, once every 9 months, once every 10 months, once every 11 months, or once every 12 months. In such embodiments, the therapeutically effective doses of the anti-CD40 antibody or protein of the invention fall within the lower dosing range (i.e. about 0.003 mg/kg to about 30 mg/kg, such as about 10 mg/kg, e.g. 10 mg/kg), particularly when the subsequent doses are administered at more frequent intervals, for example, weekly, once every two weeks to once every four weeks, or within the higher dosing range (i.e., from 10 mg/kg to 50 mg/kg, such as 30 mg/kg), particularly when the subsequent doses are administered at less frequent intervals, for example, where subsequent doses are administered one month to 12 months apart.

The timing of dosing is generally measured from the day of the first dose of the active compound (e.g., mAb1), which is also known as "baseline". However, different health care providers use different naming conventions.

Figure 2:
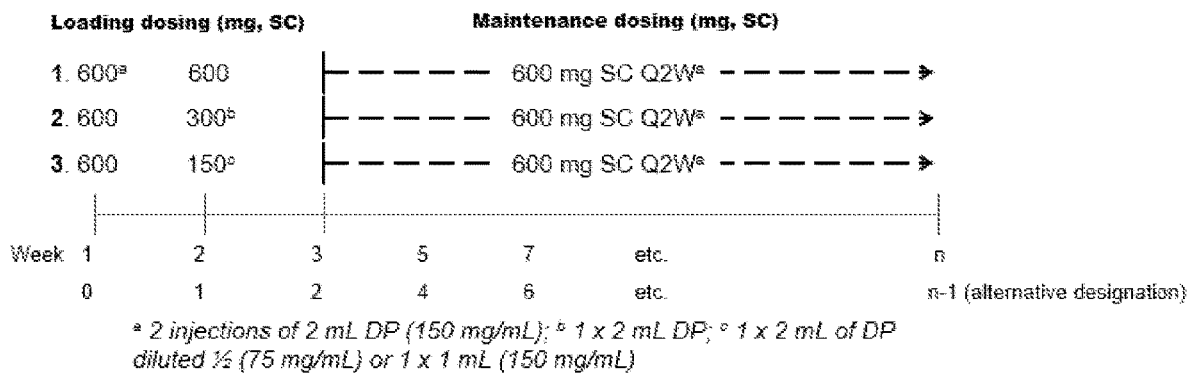
FIGS. 2A, 2B and 2C are graphical representations of possible weekly loading doses of the active ingredient given subcutaneously followed by bi-weekly maintenance regimen of the active ingredient (subcutaneously).
Figure 2:
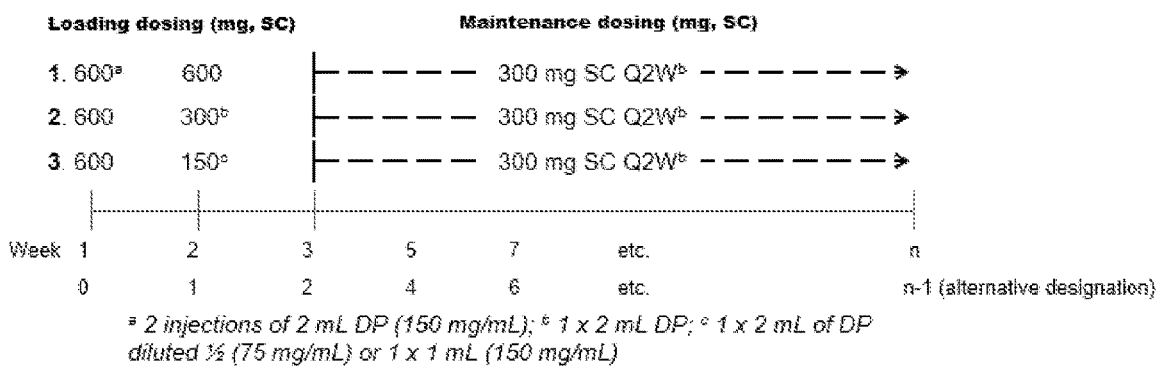
Figure 2:
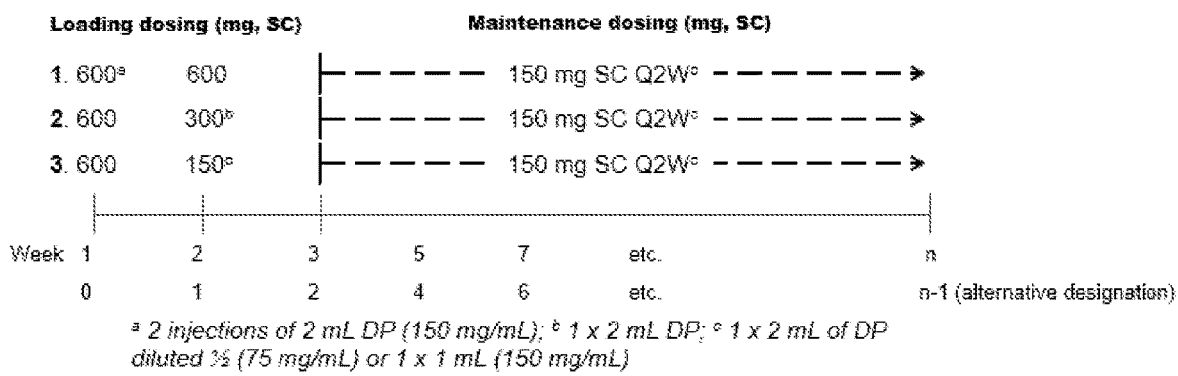

Notably, week zero may be referred to as week 1 by some health care providers, while day zero may be referred to as day one by some health care providers. Thus, it is possible that different physicians will designate, e.g., a dose as being given during week 3/on day 21, during week 3/on day 22, during week 4/on day 21, during week 4/on day 22, while referring to the same dosing schedule. For consistency, the first week of dosing will be referred to herein as week 0, while the first day of dosing will be referred to as day 1. However, it will be understood by a skilled artisan that this naming convention is simply used for consistency and should not be construed as limiting, i.e., weekly dosing is the provision of a weekly dose of the anti-CD40 antibody, e.g., mAb1, regardless of whether the physician refers to a particular week as "week 1" or "week 2". Example of dosage regimes as noted herein are found in FIGS. 1 and 2. It will be understood that a dose need not be provided at an exact time point, e.g., a dose due approximately on day 29 could be provided, e.g., on day 24 to day 34, e.g., day 30, as long as it is provided in the appropriate week.

As used herein, the phrase "container having a sufficient amount of the anti-CD40 antibody to allow delivery of [a designated dose]" is used to mean that a given container (e.g., vial, pen, syringe) has disposed therein a volume of an anti-CD40 antibody (e.g., as part of a pharmaceutical composition) that can be used to provide a desired dose. As an example, if a desired dose is 500 mg, then a clinician may use 2 ml from a container that contains an anti-CD40 antibody formulation with a concentration of 250 mg/ml, 1 ml from a container that contains an anti-CD40 antibody formulation with a concentration of 500 mg/ml, 0.5 ml from a container contains an anti-CD40 antibody formulation with a concentration of 1000 mg/ml, etc. In each such case, these containers have a sufficient amount of the anti-CD40 antibody to allow delivery of the desired 500 mg dose.

As used herein, the phrase "formulated at a dosage to allow [route of administration] delivery of [a designated dose]" is used to mean that a given pharmaceutical composition can be used to provide a desired dose of an anti-CD40 antibody, e.g., mAb1, via a designated route of administration (e.g., s.c. or i.v.). As an example, if a desired subcutaneous dose is 500 mg, then a clinician may use 2 ml of an anti-CD40 antibody formulation having a concentration of 250 mg/ml, 1 ml of an anti-CD40 antibody formulation having a concentration of 500 mg/ml, 0.5 ml of an anti-CD40 antibody formulation having a concentration of 1000 mg/ml, etc. In each such case, these anti-CD40 antibody formulations are at a concentration high enough to allow subcutaneous delivery of the anti-CD40 antibody. Subcutaneous delivery typically requires delivery of volumes of less than about 2 ml, preferably a volume of about 1 ml or less. However, higher volumes may be delivered over time using, e.g., a patch/pump mechanism.

Disclosed herein is the use of an anti-CD40 antibody (e.g., mAb1) for the manufacture of a medicament for the treatment of hidradenitis suppurativa in a patient, wherein the medicament is formulated to comprise containers, each container having a sufficient amount of the anti-CD40 antibody to allow delivery of at least about 75 mg, 150 mg, 300 mg or 600 mg anti-CD40 antibody or antigen binding fragment thereof (e.g., mAb1) per unit dose.

Disclosed herein is the use of an anti-CD40 antibody (e.g., mAb1) for the manufacture of a medicament for the treatment of hidradenitis suppurativa in a patient, wherein the medicament is formulated at a dosage to allow systemic delivery (e.g., i.v. or s.c. delivery) 75 mg, 150 mg, 300 mg of 600 mg anti-CD40 antibody or antigen binding fragment thereof (e.g., mAb1) per unit dose.

5. Kits

The disclosure also encompasses kits for treating a patient with hidradenitis suppurativa (as the case may be) with an anti-CD40 antibody or antigen binding fragment thereof, e.g., mAb1. Such kits comprise an anti-CD40 antibody or antigen binding fragment thereof, e.g., mAb1 (e.g., in liquid or lyophilized form) or a pharmaceutical composition comprising the anti-CD40 antibody (described supra). Additionally, such kits may comprise means for administering the anti-CD40 antibody (e.g., a syringe and vial, a prefilled syringe, a prefilled pen, a patch/pump) and instructions for use. The instructions may disclose providing the anti-CD40 antibody (e.g., mAb1) to the patient as part of a specific dosing regimen. These kits may also contain additional therapeutic agents (described supra) for treating psoriasis, e.g., for delivery in combination with the enclosed anti-CD40 antibody, e.g., mAb1.

The phrase "means for administering" is used to indicate any available implement for systemically administering a drug top a patient, including, but not limited to, a pre-filled syringe, a vial and syringe, an injection pen, an autoinjector, an i.v. drip and bag, a pump, patch/pump, etc. With such items, a patient may self-administer the drug (i.e., administer the drug on their own behalf) or a care-giver or a physician may administer the drug.

Disclosed herein are kits for the treatment of a patient having hidradenitis suppurativa, comprising: a) a pharmaceutical composition comprising a therapeutically effective amount of an anti-CD40 antibody or antigen binding fragment thereof; b) means for administering the anti-CD40 antibody or antigen binding fragment thereof to the patient; and c) instructions providing subcutaneously administering an anti-CD40 antibody or antigen binding fragment thereof to a patient in need thereof as a dose of about 3 to about 30 mg active ingredient per kilogram of a human subject, three times, once every other week, followed by monthly dosing of about 3 to about 30 mg, such as 10 mg, active ingredient per kilogram of a human subject, or at about 150 mg, about 300 mg or about 600 mg, weekly, bi-weekly or monthly during a maintenance regimen.

In one specific embodiment, a use is provided, of a) a liquid pharmaceutical composition comprising an anti-CD40 antibody, a buffer, a stabilizer and a solubilizer, and b) means for subcutaneously administering the anti-CD40 antibody to a patient having hidradenitis suppurativa, for the manufacture of a medicament for the treatment of hidradenitis suppurativa, wherein the anti-CD40 antibody:
 i) is to be intravenously administered to the patient with a dose of about 3 to about 30 mg, such as 10 mg, active ingredient per kilogram of a human subject, three times, once every other week; and
 ii) thereafter, is to be intravenously administered to the patient as monthly doses of about 3 to about 30 mg, such as 10 mg, active ingredient per kilogram of a human subject, wherein said anti-CD40 antibody is selected from the group consisting of:
  a) an anti-CD40 antibody comprising an immunoglobulin VH domain comprising the amino acid sequence of SEQ ID NO: 7 and an immunoglobulin VL domain comprising the amino acid sequence of SEQ ID NO: 8;
  b) an anti-CD40 antibody comprising an immunoglobulin VH domain comprising the hypervariable regions set forth as SEQ ID NO: 1, SEQ ID NO: 2, and SEQ ID NO: 3 and an immunoglobulin VL domain comprising the hypervariable regions set forth as SEQ ID NO: 4, SEQ ID NO: 5 and SEQ ID NO: 6;
  c) an anti-CD40 antibody comprising an immunoglobulin VH domain comprising the amino acid sequence of SEQ ID NO: 7 and an immunoglobulin VL domain comprising the amino acid sequence of SEQ ID NO: 8, and an Fc region of SEQ ID NO: 13;
  d) an anti-CD40 antibody comprising an immunoglobulin VH domain comprising the amino acid sequence of SEQ ID NO: 7 and an immunoglobulin VL domain comprising the amino acid sequence of SEQ ID NO: 8, and an Fc region of SEQ ID NO: 14;
  e) an anti-CD40 antibody comprising a silent Fc IgG1 region: and
  f) an anti-CD40 antibody comprising the heavy chain amino acid sequence of SEQ ID NO: 9 and the light chain amino acid sequence of SEQ ID NO: 10; or the heavy chain amino acid sequence of SEQ ID NO: 11 and the light chain amino acid sequence of SEQ ID NO: 12.

In another specific embodiment, a use is provided, of a) a liquid pharmaceutical composition comprising an anti-CD40 antibody, a buffer, a stabilizer and a solubilizer, and b) means for subcutaneously administering the anti-CD40 antibody to a patient having HS, for the manufacture of a medicament for the treatment of HS, wherein the anti-CD40 antibody:
 i) is to be subcutaneously administered to the patient with a dose of about 150 mg active substance, about 300 mg active substance or about 600 mg active substance (weekly or bi-weekly); and
 ii) thereafter, is to be subcutaneously administered to the patient as weekly, biweekly or monthly (every four weeks) doses of about 150 mg active substance, about 300 mg active substance or about 600 mg active substance, wherein said anti-CD40 antibody is selected from the group consisting of:
  a) an anti-CD40 antibody comprising an immunoglobulin VH domain comprising the amino acid sequence of SEQ ID NO: 7 and an immunoglobulin VL domain comprising the amino acid sequence of SEQ ID NO: 8;
  b) an anti-CD40 antibody comprising an immunoglobulin VH domain comprising the hypervariable regions set forth as SEQ ID NO: 1, SEQ ID NO: 2, and SEQ ID NO: 3 and an immunoglobulin VL domain comprising the hypervariable regions set forth as SEQ ID NO: 4, SEQ ID NO: 5 and SEQ ID NO: 6;
  c) an anti-CD40 antibody comprising an immunoglobulin VH domain comprising the amino acid sequence of SEQ ID NO: 7 and an immunoglobulin VL domain comprising the amino acid sequence of SEQ ID NO: 8, and an Fc region of SEQ ID NO: 13;
  d) an anti-CD40 antibody comprising an immunoglobulin VH domain comprising the amino acid sequence of SEQ ID NO: 7 and an immunoglobulin VL domain comprising the amino acid sequence of SEQ ID NO: 8, and an Fc region of SEQ ID NO: 14;

e) an anti-CD40 antibody comprising a silent Fc IgG1 region: and f) an anti-CD40 antibody comprising the heavy chain amino acid sequence of SEQ ID NO: 9 and the light chain amino acid sequence of SEQ ID NO: 10; or the heavy chain amino acid sequence of SEQ ID NO: 11 and the light chain amino acid sequence of SEQ ID NO: 12.

Example 2. Pharmacology

1. Primary Pharmacology mAb1 binds to human CD40 with high affinity ($K_d$ of 0.3 nM). However, it does not bind to Fcγ receptors (including CD16) or mediate antibody-dependent cellular cytotoxicity or complement-dependent cytotoxicity. mAb1 inhibits recombinant CD154 (rCD154)-induced activation of human leukocytes, but does not induce PBMC proliferation or cytokine production by monocyte-derived dendritic cells (DCs). mAb1 binds human and non-human primate CD40 with very similar affinities.

In vivo, mAb1 blocks primary and secondary T cell-dependent antibody responses (TDAR), and can prolong survival of kidney allografts in non-human primates (Cordoba et al 2015). In addition, mAb1 can disrupt established germinal centers (GCs) in vivo.

The CD40 receptor occupancy and functional activity were simultaneously assessed in vitro using human whole blood cultures. Functional activity was quantified via CD154-induced expression of CD69 (the activation marker) on CD20 positive cells (B cells) and CD40 occupancy was monitored using fluorescently labeled mAb1. Almost complete CD40 occupancy by mAb1 was required for full inhibition of rCD154-induced CD69 expression.

2. Secondary Pharmacology

The effects of mAb1 on platelet function and blood hemostasis were investigated, indicating that mAb1 does not induce platelet aggregation responses, rather displays certain mild inhibitory effects on platelet aggregation at high concentrations.

Example 3. Non-Clinical Toxicology and Safety Pharmacology

Toxicology studies with mAb1 did not reveal any significant organ toxicities, including no evidence of thromboembolic events as reported in clinical trials with anti-CD154 mAbs (Kawai et al 2000). In a 13-week GLP rhesus monkey study (weekly dosing at 10, 50 and 150 mg/kg), increased lymphoid cellularity was noted in 5/22 animals which was considered to be due to ongoing infection, an observation consistent with the pharmacology of mAb1. Inflammatory lesions in the kidneys and lungs of 2 animals at 50 mg/kg were noted, and in one of the two animals, lesions in the eyes and trachea were also noted. While a direct effect of mAb1 on the kidney and lung cannot be excluded, the weight of evidence including confirmation of opportunistic pathogens, suggests these findings are likely secondary to mAb1-mediated immunosuppression and of an infectious origin. In view of these inflammatory findings, the No Observed Adverse Effect Level (NOAEL) for the 13-week toxicity study was set at 10 mg/kg. In a 26-week chronic toxicity study in cynomolgus monkeys, no adverse, mAb1-related findings were discovered. Based on these data, the NOAEL was set at 150 mg/kg (26-week). The mean (all animals) $C_{max,ss}$ was 44, 3235, and 9690 µg/mL at 1, 50, and 150 (NOAEL) mg/kg S.C. weekly, respectively. The NOAEL derived from the 26-week cynomolgus monkey study is considered the most relevant for supporting the clinical dosing regimen.

Post-mortem histological and immuno-histological evaluation revealed a decrease in GCs in cortical B-cell areas of the spleen and lymphatic tissues. The recovery animals showed some cases of increased lymph node cellularity with normal T cell areas and increased B cell areas, which is consistent with reconstitution of GCs after drug withdrawal. Recovery animals were able to mount primary TDAR to keyhole limpet hemocyanin (KLH) immediately after blood levels of mAb1 dropped below the level necessary for full receptor occupancy.

Because of the complete inhibition of T cell-dependent antibody responses (TDAR), KLH, the formation of anti-drug antibodies (ADA) to mAb1 is not expected and therefore ADA-related side effects are considered unlikely when concentrations of mAb1 are maintained continuously at pharmacological levels.

Tissue cross-reactivity studies revealed that CD40 is not only present on immune cells, but also in various tissues. This is mainly due to its expression on endothelial and epithelial cells, where CD40 is involved in signaling such as responding to wound healing processes, upregulation of virus-defense, and inflammatory-related mediators. An antagonistic anti-CD40 monoclonal antibody like mAb1 is not expected to contribute to inflammatory processes, which was confirmed by in vitro studies using human umbilical vein endothelial cells (HUVEC).

Full guideline-conform reproductive toxicity studies have not been conducted thus far. However, a dose-range finding, embryo-fetal development (EFD) study in rabbits has been conducted in order to confirm the rabbit as relevant reproductive toxicology species. No effects on embryo-fetal development were seen and there was no treatment-related fetal external malformation in any group.

In conclusion, the nonclinical data support studies in patients with hidradenitis suppurativa.

Example 4. Non-Clinical Pharmacokinetics and Pharmacodynamics

1. Pharmacokinetics (PK)

Typical for IgG immunoglobulins, the primary route of elimination of mAb1 is likely via proteolytic catabolism, occurring at sites that are in equilibrium with plasma. In addition, binding and internalization of mAb1-CD40 complexes resulted in rapid and saturable clearance routes. This was illustrated by non-linear mAb1 serum concentration-time profiles showing an inflection point at about 10-20 µg/mL. The contribution of the CD40-mediated clearance to the overall clearance depends on mAb1 concentration, together with levels of CD40 expression, internalization and receptor turnover rates. For serum concentrations of mAb1>10-20 µg/mL, linear kinetics are expected, while non-linear kinetics emerged at lower concentrations.

2. Pharmacodynamics (PD)

In a PK/PD study in cynomolgus monkeys, the inflection point (about 10 µg/mL) in the PK profiles was associated with a drop of CD40 saturation, as determined in an independent lymphocyte target saturation assay. As such this inflection point is viewed as a marker for the level of saturation of CD40, and an evidence for target engagement.

The link between CD40 occupancy and pharmacodynamic activity was further demonstrated in rhesus monkeys immunized with KLH. Monkeys were immunized with KLH three times (the first was about 3 weeks prior to dosing, the second was 2 weeks after mAb1 administration, and the third was after complete wash-out of mAb1). CD40 occupancy by mAb1 at plasma concentrations >40 μg/mL at the time of the second KLH vaccination completely prevented recall antibody responses. Once mAb1 was cleared, all animals mounted a full memory antibody response to the third KLH. These results suggest that the function of pre-existing memory B cells were not affected. After complete elimination of mAb1, immunization with tetanus toxoid (TTx) led to anti-TTx-IgG/IgM titers similar to non-treated animals and demonstrated that full TDAR was regained after mAb1 elimination.

3. Immunogenicity

As expected from an immunosuppressive drug, immunogenicity data in rhesus monkey (single dose) are in agreement with the results from the KLH-TDAR experience and confirmed that no immune response against mAb1 could be mounted under full CD40 occupancy by mAb1.

4. Therapeutic Regimens

Based on the pharmacokinetics and pharmacodynamic profiles of mAb1, and the result from pre-clinical and clinical studies of mAb1, the following therapeutic regimens may be used.

In one embodiment (cf. FIG. 1), the mAb1 therapeutic regimen consists of a loading dosing of 600 mg mAb1 (2×2 mL) weekly s.c. Doses on Day 1 (Week 1), Day 8 (Week 2), Day 15 (Week 3), Day 22 (Week 4) and Day 29 (Week 5). After Week 5, patients receive a maintenance dosing of 600 mg (2×2 mL) s.c. mAb1 every other week (or bi-weekly), on Day 43 (Week 7), Day 57 (Week 9), etc.

In one embodiment (cf. FIG. 2A, 1), the mAb1 therapeutic regimen consists of a loading dosing consisting of two doses of 600 mg mAb1, administered with one week between the two doses, followed by a maintenance dosing consisting of doses of 600 mg mAb1, administered every 2 weeks (Q2W). The 600 mg dose is preferably administered subcutaneously; through 2 injections of 2 mL drug product (150 mg/mL).

In another embodiment (cf. FIG. 2A, 2), the mAb1 therapeutic regimen consists of a loading dosing consisting of a first dose of 600 mg mAb1, and a second dose of 300 mg mAb1, wherein the second dose is administered one week after the first dose, followed by a maintenance dosing consists of doses of 600 mg mAb1, administered every 2 weeks (Q2W). The 300 mg dose is preferably administered subcutaneously; through 1 injection of 2 mL drug product (150 mg/mL). The 600 mg dose is preferably administered subcutaneously; through 2 injections of 2 mL drug product (150 mg/mL).

Figure 3:
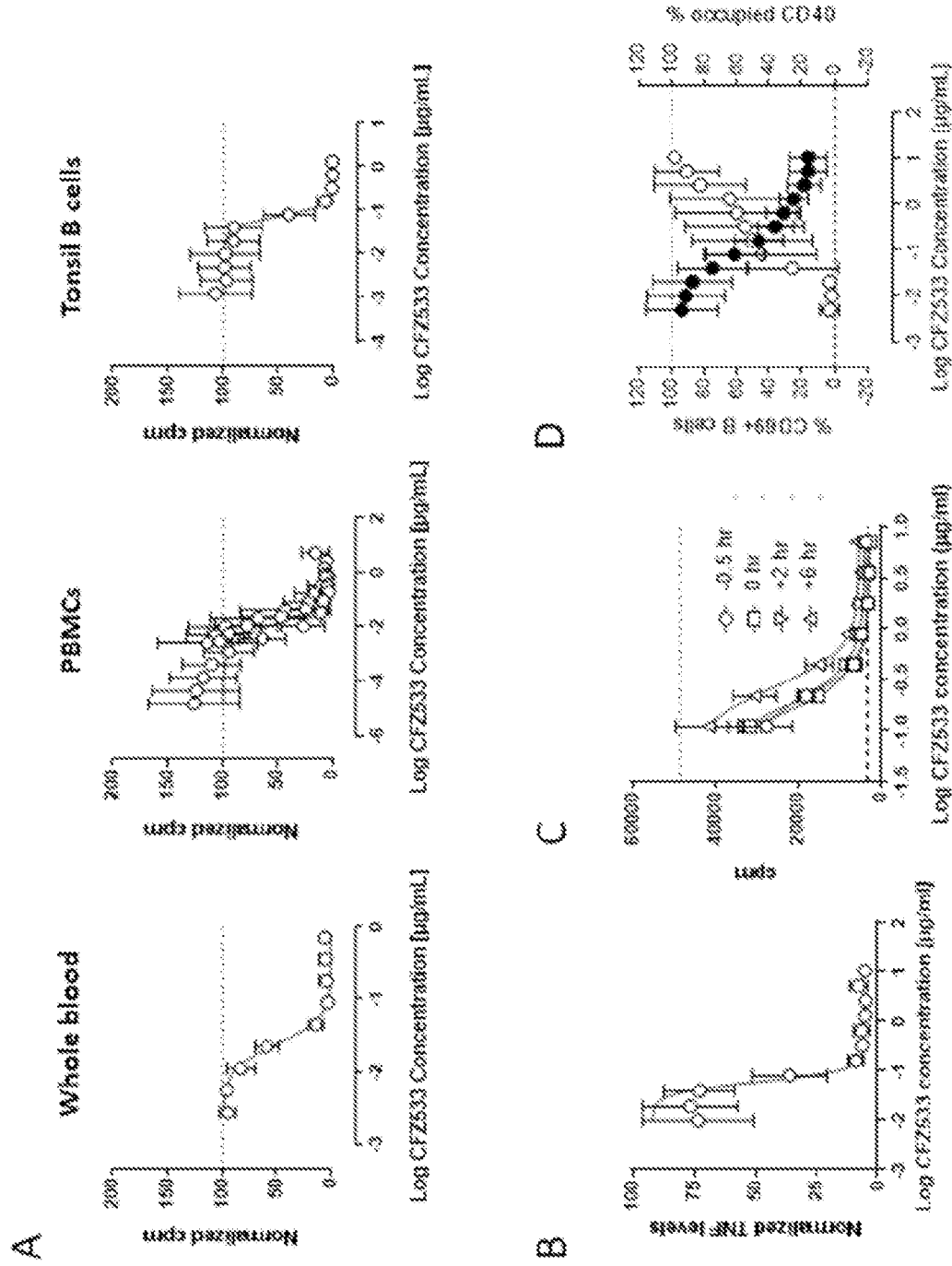
FIG. 3 is graphs showing in vitro CFZ533 inhibition of the rCD154-induced pathway activation.

In yet another embodiment (cf. FIG. 2A, 3), the mAb1 therapeutic regimen consists of a loading dosing consisting of a first dose of 600 mg mAb1, and a second dose of 150 mg mAb1, wherein the second dose is administered one week after the first dose, followed by a maintenance dosing consists of doses of 600 mg mAb1, administered every 2 weeks (Q2W). The 150 mg dose is preferably administered subcutaneously; through 1 injection of 1 mL drug product (150 mg/mL), alternatively through 1 injection of 2 mL drug product diluted ½ times (75 mg/mL). The 600 mg dose is preferably administered subcutaneously; through 2 injections of 2 mL drug product (150 mg/mL).

In one embodiment (cf. FIG. 2B, 1), the mAb1 therapeutic regimen consists of a loading dosing consisting of two doses of 600 mg mAb1, administered with one week between the two doses, followed by a maintenance dosing consisting of doses of 300 mg mAb1, administered every 2 weeks (Q2W). The 600 mg dose is preferably administered subcutaneously; through 2 injections of 2 mL drug product (150 mg/mL). The 300 mg dose is preferably administered subcutaneously; through 1 injection of 2 mL drug product (150 mg/mL).

In another embodiment (cf. FIG. 2B, 2), the mAb1 therapeutic regimen consists of a loading dosing consisting of a first dose of 600 mg mAb1, and a second dose of 300 mg mAb1, wherein the second dose is administered one week after the first dose, followed by a maintenance dosing consists of doses of 300 mg mAb1, administered every 2 weeks (Q2W). The 300 mg dose is preferably administered subcutaneously; through 1 injection of 2 mL drug product (150 mg/mL). The 600 mg dose is preferably administered subcutaneously; through 2 injections of 2 mL drug product (150 mg/mL).

In yet another embodiment (cf. FIG. 2B, 3), the mAb1 therapeutic regimen consists of a loading dosing consisting of a first dose of 600 mg mAb1, and a second dose of 150 mg mAb1, wherein the second dose is administered one week after the first dose, followed by a maintenance dosing consists of doses of 300 mg mAb1, administered every 2 weeks (Q2W). The 150 mg dose is preferably administered subcutaneously; through 1 injection of 1 mL drug product (150 mg/mL), alternatively through 1 injection of 2 mL drug product diluted ½ times (75 mg/mL). The 600 mg dose is preferably administered subcutaneously; through 2 injections of 2 mL drug product (150 mg/mL). The 300 mg dose is preferably administered subcutaneously; through 1 injection of 2 mL drug product (150 mg/mL).

In one embodiment (cf. FIG. 2C, 1), the mAb1 therapeutic regimen consists of a loading dosing consisting of two doses of 600 mg mAb1, administered with one week between the two doses, followed by a maintenance dosing consisting of doses of 150 mg mAb1, administered every 2 weeks (Q2W). The 600 mg dose is preferably administered subcutaneously; through 2 injections of 2 mL drug product (150 mg/mL). The 150 mg dose is preferably administered subcutaneously; through 1 injection of 1 mL drug product (150 mg/mL), alternatively through 1 injection of 2 mL drug product diluted ½ times (75 mg/mL).

In another embodiment (cf. FIG. 2C, 2), the mAb1 therapeutic regimen consists of a loading dosing consisting of a first dose of 600 mg mAb1, and a second dose of 300 mg mAb1, wherein the second dose is administered one week after the first dose, followed by a maintenance dosing consists of doses of 150 mg mAb1, administered every 2 weeks (Q2W). The 300 mg dose is preferably administered subcutaneously; through 1 injection of 2 mL drug product (150 mg/mL). The 600 mg dose is preferably administered subcutaneously; through 2 injections of 2 mL drug product (150 mg/mL). The 150 mg dose is preferably administered subcutaneously; through 1 injection of 1 mL drug product (150 mg/mL), alternatively through 1 injection of 2 mL drug product diluted ½ times (75 mg/mL).

In yet another embodiment (cf. FIG. 2C, 3), the mAb1 therapeutic regimen consists of a loading dosing consisting of a first dose of 600 mg mAb1, and a second dose of 150 mg mAb1, wherein the second dose is administered one week after the first dose, followed by a maintenance dosing consists of doses of 150 mg mAb1, administered every 2 weeks (Q2W). The 150 mg dose is preferably administered subcutaneously; through 1 injection of 1 mL drug product (150 mg/mL), alternatively through 1 injection of 2 mL drug product diluted ½ times (75 mg/mL). The 600 mg dose is preferably administered subcutaneously; through 2 injections of 2 mL drug product (150 mg/mL). The 300 mg dose is preferably administered subcutaneously; through 1 injection of 2 mL drug product (150 mg/mL).

An advantage of having a therapeutic regimen divided into a loading dosing part and a maintenance dosing part is that it allows for optimal therapeutic effect.

For all therapeutic regimens described herein, the purpose of the loading dosing is to achieve target saturation (plasma concentrations close to 40 µg/mL) and thus onset of therapeutic effect, and the purpose of the maintenance dosing is to sustain efficacy.

Example 5. Human Safety and Tolerability Data

The safety, tolerability, PK and PD activity of mAb1 are being assessed in an ongoing, randomized, double-blind, placebo-controlled, single-ascending dose study of mAb1 in healthy subjects and patients with rheumatoid arthritis (RA). A total of 48 subjects have been enrolled: 36 healthy subjects who received single doses of mAb1 up to 3 mg/kg IV or S.C., and 12 patients with RA, 6 of whom received single doses of mAb1 at 10 mg/kg IV. Overall, single doses up to 3 mg/kg mAb1 in healthy volunteers and a single of 10 mg/kg mAb1 in RA patients have been safe and well tolerated and no suspected serious adverse events (SAEs) have occurred. An investigation of the 30 mg/kg IV dose is ongoing in RA patients. As this study is still ongoing, all clinical data are preliminary in nature and based on interim analyses conducted up to a dose of 10 mg/kg in RA patients.

Example 6. Human Pharmacokinetics and Pharmacodynamics (Healthy Volunteers and Rheumatoid Arthritis Patients)

In healthy subjects as well as in patients with rheumatoid arthritis, after single IV or SC administration, CFZ533 PK profiles were consistent with target mediated disposition resulting in non-linear PK profiles and more rapid clearance when CD40 receptor occupancy dropped below approximately 90%.

Despite some inter-individual variability in the PK profiles from the Chinese subjects, the disposition of CFZ533 in Chinese subjects was generally similar as for non-Chinese subjects, and the target engagement was also similar (about 4 weeks) after 3 mg/kg IV CFZ533. At this dose level, similar PK/PD profiles were demonstrated through free CFZ533 profiles in plasma, CD40 occupancy on peripheral B cells measuring free CD40 and total CD40, and total sCD40 concentrations in plasma.

After SC administration in healthy subjects, CFZ533 was rapidly absorbed and distributed in line with what is expected for a typical IgG1 antibody in human. At 3 mg/kg SC, CFZ533 generally peaked at 3 days post-dose (7 days for 2 subjects), and 1 week after dosing plasma concentrations were in the same range as for after IV. At 3 mg/kg SC, duration of target engagement was also about 4 weeks.

In patients with rheumatoid arthritis at 10 mg/kg IV, as measured by free CD40 on whole blood B cells compared to mean pre-dose, and total sCD40 profiles in plasma, full CD40 occupancy was generally maintained for 8 weeks. At 30 mg/kg IV, PK and total sCD40 profiles in plasma are consistent with duration of target engagement of 16 weeks.

In healthy subjects CD40 engagement by CFZ533 generally led to a decrease in total CD40 on peripheral B cells by about 50%, tracking CD40 occupancy on B cells as measured by free CD40 on B cells. This is likely due to internalization and/or shedding of the membrane bound CD40 upon binding to CFZ533. In patients with rheumatoid arthritis the decrease in total CD40 on peripheral B cells was not confirmed.

The relationship between CFZ533 in plasma and CD40 occupancy on whole blood B cells (free CD40 on B cells) was defined, and CFZ533 concentrations of 0.3-0.4 µg/mL were associated with full (defined as ≥90%) CD40 occupancy on whole blood B cells.

More generally, non-specific and specific elimination pathways have been identified for CFZ533. The non-specific and high capacity pathway mediated by FcRn receptors is commonly shared by endogenous IgGs. The specific target mediated disposition of CFZ533 led to the formation of CFZ533-CD40 complexes that were partially internalized (with subsequent lysosomal degradation) and/or shed from the membrane. Target-mediated processes resulted in saturable and nonlinear disposition of CFZ533. The formation of CFZ533-CD40 complexes was dose/concentration-dependent, with saturation occurring at high concentrations of CFZ533.

Overall, the disposition of CFZ533 is dependent on the relative contribution of the specific (target mediated) and non-specific elimination pathways to the overall clearance of CFZ533. Nonlinear PK behavior was observed when CFZ533 concentrations were lower than that of the target, while at higher concentrations with CD40 receptors being saturated, the non-specific pathways predominate and the elimination of CFZ533 was linear.

As expected for a typical IgG1 antibody targeting a membrane bound receptor and demonstrating target mediated disposition, the extent of exposure of CFZ533 (AUClast) increased more than the increase in dose (hyperproportionality). Consequently, this is expected to be associated with a decrease in the volume of distribution and clearance of CFZ533 at higher doses.

One subject at 1 mg/kg IV CFZ533 (1 week full CD40 occupancy) developed specific antibodies to CFZ533 detected 6 weeks after CFZ533 plasma concentrations were below the limit of quantification, and definitively too low to block any CD40 pathway-relevant effects in tissue. The presence of anti-drug antibodies (ADAs) in this subject did not compromised exposure, and was not associated with an immune related safety signal. This corresponds to an ADA incidence of 2% in this study.

A single dose of 3 mg/kg (IV and SC) of CFZ533 transiently suppressed anti-KLH responses to the first KLH immunization, at CFZ533 concentrations corresponding to full (≥90%) receptor occupancy (for about 3-4 weeks). Anti-KLH primary responses were detected in all subjects as CFZ533 concentration, and accompanying receptor occupancy, declined. All subjects were able to mount recall responses to a second KLH immunization (administered after loss of receptor occupancy was anticipated).

Data suggest that CD40 engagement by CFZ533 prevented recombinant human CD154 (rCD154) mediated B cell activation in human whole blood. The rCD154-induced-CD69 expression on B cells was generally suppressed during a period corresponding to full CD40 occupancy on B cells. When CD40 occupancy was incomplete, the functional activity of rCD154 was restored.

There was no evidence of any effect of CFZ533 on immunophenotyping data.

Example 7. Characterization of the In Vitro and In Vivo Properties of CFZ533, a Blocking and Non-Depleting Anti-CD40 Monoclonal Antibody 1. Methods Surface Plasmon Resonance Analysis of Affinity of CFZ533 for CD40

The binding analyses of recombinant CFZ533 were performed at 25° C. with HBS-EP+ as running buffer. A typical binding analysis cycle consisted of three steps: (i) capture of the antibody via ProteinA immobilized on the chip surface, (ii) binding of CD40 antigen to the captured anti-CD40 antibody, and (iii) regeneration of the ProteinA surface. To determine the kinetic rate constants of the antigen-antibody binding interactions, binding data were processed, double referenced with responses from blank injections. The binding curves were fitted locally using the 1:1 interaction model of the Biacore T100 Evaluation software to determine kinetic rate constants. The value for the equilibrium dissociation constant (KD) was calculated as the ratio of the rate constants kd/ka. All binding measurements were performed in two independent experiments.

Surface Plasmon Resonance Analysis of Affinity of CFZ533 for FcγRIIIA

Extracellular domains of human FcγRIIIA tagged with a 4-amino acid purification tag (4APP; Novartis) and an Avi biotinylation tag (GLNDIFEAQKIEWHE; Avidity) were synthesized by Geneart: human FcγRIIIA (CD16a) 158V (Uniprot: P08637, 17-199), human FcγRIIIA 158F (Uniprot: P08637, 17-199), expressed in HEK293 cells and purified with anti-4APP affinity chromatography. Receptors were site directed biotinylated with BirA (Avidity), bound to streptavidin sensor chips (General Electric), and the equilibrium-binding levels of the different Abs were analyzed by surface plasmon resonance (T100, General Electric) as described (Warncke et al. 2012). Equilibrium dissociation constants ($K_D$) were calculated by a 1:1 model.

Human Leukocyte Cultures

Whole blood buffy coats were obtained from healthy volunteers (Blutspendezentrum, Basel, Switzerland) or whole blood collected from healthy volunteers provided under informed consent in accordance with the Swiss Human Research Act and approval of the responsible ethic committee (Ethikkommission Nordwest- and Zentralschweiz; EKNZ). Human tonsil samples were obtained from both Ergolz Klinik (Liestal, Switzerland) (Study Protocol No. 1000244 v.03; approved by Ethikkommission beider Basel; EKBB) and Kantonspital (Liestal, Switzerland) (Study Protocol No. TRI0149 v.01; approved by EKNZ). For in vitro culture experiments, please see supplementary material for detailed methods. Briefly, whole blood, isolated PBMCs, in vitro derived monocyte DCs or human tonsil B cells were incubated with single concentrations or a dose titration of CFZ533 or relevant control antibodies. For pathway blocking experiments, these cultures also included an EC80 concentration of recombinant human CD154 (5 μg/ml) and IL-4 (75 ng/ml). Readouts for in vitro assays included proliferation assessed by thymidine incorporation ($^3$H-TdR), flow cytometric-based assessment of expression of the activation molecule CD69 on B cells, and cytokine secretion assessed by ELISA. Similar assays were used for NHP whole blood and PBMCs. In some human whole blood experiments, CD40 receptor occupancy was also examined by used of a fluorescently tagged CFZ533. Where appropriate, IC50 values were estimated using linear regression-based curve-fitting in GraphPad Prism® software.

In Vitro Cell Depletion Assays

See supplementary material for detailed methods. Briefly, the ability of CFZ533 to mediated depletion of $CD20^{pos}$ B cells was monitored in human whole blood over a period of three days in comparison to the B cell depleting antibody Rituximab. For CDC, CFZ533 or Rituximab were incubated with RAJI B cells in the presence or absence of rabbit complement and cell lysis was assessed by luminescence.

Internalization of CFZ533

Internalization of fluorescently tagged CFZ533 and rCD154 was assessed in vitro using the human B cell line RI-1 (Th'ng et al, 1987). CD40 dependence of CFZ533 internalization was assessed using a CD40 knockout RI-1 cell line. Internalization was assessed using an Amnis® image flow cytometer (Merck KHaA, Darnstadt) according to the manufacturer's instructions and data analyzed using ImageStream®$^X$ software.

In Vivo Studies

Single dose pharmacokinetic/pharmacodynamic (PK/PD) studies utilized biologics-treatment naive cynomolgus monkeys (*Macaca fascicularis*) between 7.5-8.5 years old (6.5±2.6 kg) and captive-bred from Philippines (Siconbrec, Makati City, Philippines). Animal handling, care, drug treatments and blood sampling are performed according to the Swiss Federal Law for animal protection (animal licenses BS #1900, BS #1495). For the recall immunization experiments, we utilized animals from a toxicology study conducted at Covance Laboratories GmbH, Muenster, Germany, (manuscript in preparation). The study was performed according to an authorized study protocol and local standard operating procedures in strict compliance with national legal regulations on animal welfare law and accepted animal welfare standards.

In the PK study, CFZ533 was administered to three animals at calculated single doses of 16.2 (5532), 18.5 (5531) and 20 (5530) mg/kg. Blood was sampled for analyses of CFZ533 serum concentrations, numbers of peripheral T and B lymphocytes, and CD40 occupancy on peripheral B cells by CFZ533. For recall TDAR experiments, animals were immunized with keyhole limpet hemocyanin (KLH) in Alum on study days 8 (priming) and 43 (recall; during CFZ533 treatment) respectively. Serum was sampled one day before and 7, 14 and 21 days after priming and recall immunizations. KLH specific IgM/IgG titers were determined with sandwich ELISA using cynomolgus monkey anti-KLH IgM/IgG reference serum as standard. PK assessment was performed as described above. See supplementary material for additional details on the PK and TDAR experiments.

Histological Analysis of Germinal Centers

Sections of formalin fixed, embedded in paraffin wax (FFPE) spleen and lymph nodes (axillary, mandibular and mesenteric) stained with hematoxylin and eosin as well as with an indirect immune-peroxidase method (HRP+DAB from Dako) with the following markers: anti-CD20 antibody (M0755, Dako), anti-CD8 antibody (RM-9116-SO, Medac) and Ki67 (M7240, Dako). All slides were assessed and graded according to the intensity of the staining (negative to intense). In addition, the staining pattern and distribution of any immunohistochemical stained cells within the tissue were also described.

2. Results

CFZ533 Binds Human CD40 and Inhibits rCD154-Induced Activation of Multiple CD40 Expressing Cell Types Table 2 indicates that the KD of CFZ533 for recombinant human CD40 was determined by surface plasmon resonance as 0.3 nM, thus being very similar to its parental antibody HCD122 (wild-type IgG1 version of CFZ533).

TABLE 2

Binding affinities (KD) and kinetics of HCD122 and CFZ533 to human CD40.

|  | HCD122 | CFZ533 |
|---|---|---|
| $K_D$ [M] | $4.67 \pm 1.00 \times 10^{-10}$ | $3.05 \pm 0.26 \times 10^{-10}$ |
| $k_a$ [1/Ms] | $2.84 \pm 0.67 \times 10^{5}$ | $3.13 \pm 0.73 \times 10^{5}$ |
| $k_d$ [1/s] | $1.26 \pm 0.03 \times 10^{-4}$ | $0.93 \pm 0.14 \times 10^{-4}$ |
| Chi$^2$[RU$^2$] | 0.17-0.19 | 0.10-0.15 |

FIG. 3A shows effect of CFZ533 on rCD154 and IL-4-mediated proliferation (3H-TdR) of human whole blood cultures, PBMCs, and isolated tonsil B cells from multiple donors (5, 32 and 6 donors respectively). Data is presented as normalized cpm (rCD154+IL-4=100; dotted lines). FIG. 3B shows CFZ533 inhibited TNF-alpha production by rCD154-stimulated moDCs after overnight culture. FIG. 3C shows delayed addition of CFZ533 inhibited rCD154+IL-4 mediated human PBMC proliferation. CFZ533 was added to human PBMCs one hour before, simultaneously with, or two and six hours after stimulation with rCD154+IL-4, and proliferation (3H-TdR) was assessed after a subsequent four days of culture (dotted and dashed lines represent rCD154+IL-4 and cell plus media controls). For all data, the mean and SD of readouts of rCD154-induced stimulation were graphed as a function of log-transformed CFZ533 concentrations. Where appropriate, IC50 values were determined using linear regression based curve-fitting. FIG. 3D shows relationship between CD40 occupancy and pathway blockade by CFZ533. Human whole blood from 10 donors was cultured overnight with rCD154 in presence of a dose titration of CFZ533. The degree of pathway activation (% CD69pos on B cells) and degree of CD40 occupancy (staining with AlexaFlour 488 labeled CFZ533) was evaluated. Open and filled circles indicate the percent of CD40 occupied by CFZ533 and percent CD69pos expressing cells on CD20pos B cells as a function of log-transformed CFZ533 concentration respectively (Mean and SD shown). Dotted and dashed lines represent rCD154-induced CD69 expression and cells plus media control cultures normalized across all donors.

FIG. 3A indicates that CFZ533 completely inhibited rCD154-induced proliferation of human whole blood cultures, PBMCs as well as purified tonsillar B cells from multiple donors with potencies (IC50 values) of 0.024 µg/ml (0.16 nM), 0.017 µg/ml (0.12 nM) and 0.071 µg/ml (0.47 nM) respectively. In addition, we could demonstrate that CFZ533 completely blocked rCD154-induced TNF production by primary monocyte-derived dendritic cells (moDCs) with an IC50 of 0.04 µg/ml (0.27 nM) (FIG. 3B).

As published previously, CFZ533 inhibited rCD154-induced proliferation of PBMCs from Cynomolgus monkeys (Cordoba et al., 2015). CFZ533 inhibited rCD154-induced proliferation of PBMCs from humans, rhesus and cynomolgus animals with similar potency (IC50 of 0.02, 0.03, and 0.01 µg/ml, respectively), and could also bind CD40 on B cells from these species with EC50 values of approximately 0.2 µg/ml, see Table 3.

TABLE 3

Cellular binding and functional properties of CFZ533 in human and NHPs.

| | Inhibition of rCD154-induced proliferation (IC50 PBMCs) | CD40 occupancy by CFZ533 (MFI EC50 on CD20+ cells) |
|---|---|---|
| Human | 0.017 + 0.012 µg/ml<br>0.12 + 0.08 µM<br>(n = 32) | 0.22 + 0.042 µg/ml<br>1.49 + 0.28 µM<br>(n = 4) |
| Rhesus | 0.026 + 0.017 µg/ml<br>0.18 + 0.12 µM<br>(n = 8) | 0.22 + 0.033 µg/ml<br>1.49 + 0.22 µM<br>(n = 6) |
| Cynomolgus | 0.010 + 0.003 µg/ml<br>0.07 + 0.02 µM<br>(n = 4) | 0.20 + 0.068 µg/ml<br>1.35 + 0.46 µM<br>(n = 4) |

The above cellular data were derived from experiments where CFZ533 was added prior to, or simultaneously with rCD154, indicating that the antibody could prevent binding of the endogenous ligand. We could also demonstrate that addition of CFZ533 up to 6 hours following initiation of leukocyte cultures containing rCD154 resulted in complete inhibition of cellular activation with minimal loss of potency, indicating that CFZ533 could displace the endogenous ligand from CD40 (FIG. 3C).

We also wanted to evaluate the relationship between the degree of CD40 occupancy by CFZ533, and the extent of pathway inhibition. To do so we simultaneously assessed CD40 receptor occupancy by CFZ533 and rCD154-induced CD69 in whole blood from multiple donors. FIG. 3D indicates that CD40 receptor occupancy by CFZ533 of at least 90% was required for complete blockade of CD40 pathway activation. A similar relationship between receptor occupancy and pathway inhibition was also observed using CD23 and CD54 as readouts of CD40 pathway activation (data not shown).

CFZ533 Displays Minimal Stimulatory Potential In Vitro

Figure 4:
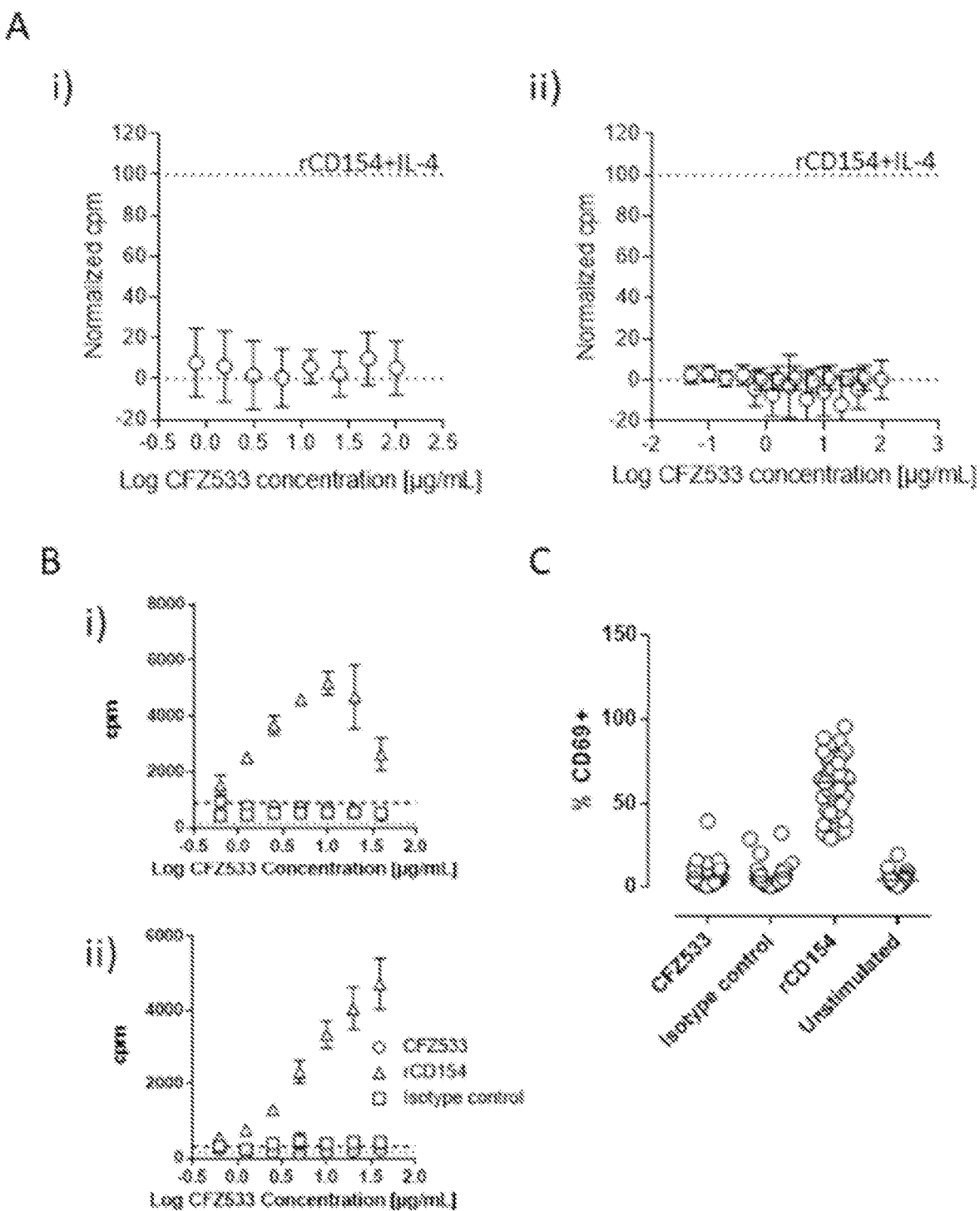
FIG. 4 is graphs showing CFZ533 minimal stimulatory activity in vitro.

The ability of CFZ533 to stimulate activation of human leukocytes was assessed using proliferation and upregulation of the activation molecule CD69 on B cells in whole blood. FIG. 4A shows data regaring i. Human whole blood from multiple donors (n=13) were incubated with a dose titration of CFZ533, and proliferation ($^3$H-TdR) was assessed after three days of culture. ii. Human PBMCs from multiple donors (n=26) were incubated with a dose titration of CFZ533, and proliferation ($^3$H-TdR) was assessed after three days of culture. For both graphs, data is presented as mean and SD of normalized cpm as a function of log-transformed CFZ533 concentration (rCD154+IL-4=100; dotted lines, cells plus media=0; dashed lines). FIG. 4B shows that CFZ533 does not induce human PBMC proliferation in the presence of additional stimuli. Human PBMCs were stimulated for 3 days with a dose titration of CFZ533 in the presence of IL-4 (i) or anti-IgM F(ab')2. (ii). The mean and SD of 3H-TdR (cpm) is shown as a function of log-transformed CFZ533 concentration. In FIG. 4C it is shown how human whole blood (41 donors) was cultured overnight with no stimuli, CFZ533, isotype control or rCD154 and CD69 expression on B cells was assessed by FACS. Each dot represents data from a single donor with mean % CD69 values indicated by a horizontal red line.

FIG. 4A shows that CFZ533 was unable to induce thymidine incorporation by human whole blood (1:10 dilution) or PBMCs in contrast to rCD154. The inability of CFZ533 to induce proliferation was unaffected by the addition of additional co-stimuli such as IL-4, or anti-IgM (FIG. 4B).

We could also demonstrate that CFZ533 was unable to induce upregulation of CD69 on B cells in whole blood from multiple donors, again in contrast to rCD154 (FIG. 4C). Finally, CFZ533 was unable to induce cytokine production by CD40 expressing monocyte-derived DCs or human umbilical vein endothelial cells (HUVECs) (data not shown).

CFZ533 does not Mediate Cell Depletion

CFZ533 was engineered to contain a N297A mutation, previously demonstrated to abrogate FcγR binding resulting in an inability to mediate antibody-dependent cellular cytotoxicity (ADCC). CFZ533 was not able to bind FcγRIIIA in comparison to HCD122 (wild-type IgG1) (Table 4), and we wanted to examine how this lack of binding affected the ability of CFZ533 to mediate cell depletion.

TABLE 4

Binding affinities ($k_a[1/M]$) of HCD122 and CFZ533 to human FcγRIIIA

| FcγR species | HCD122 (wild-type IgG1) | CFZ533 (N297A IgG1) |
| --- | --- | --- |
| Human FcγRIIIA 158V | $1.72 \times 10^6$ | n.d. |
| Human FcγRIIIA 158F | $6.99 \times 10^5$ | n.d. | n.d. not detected

Figure 5:
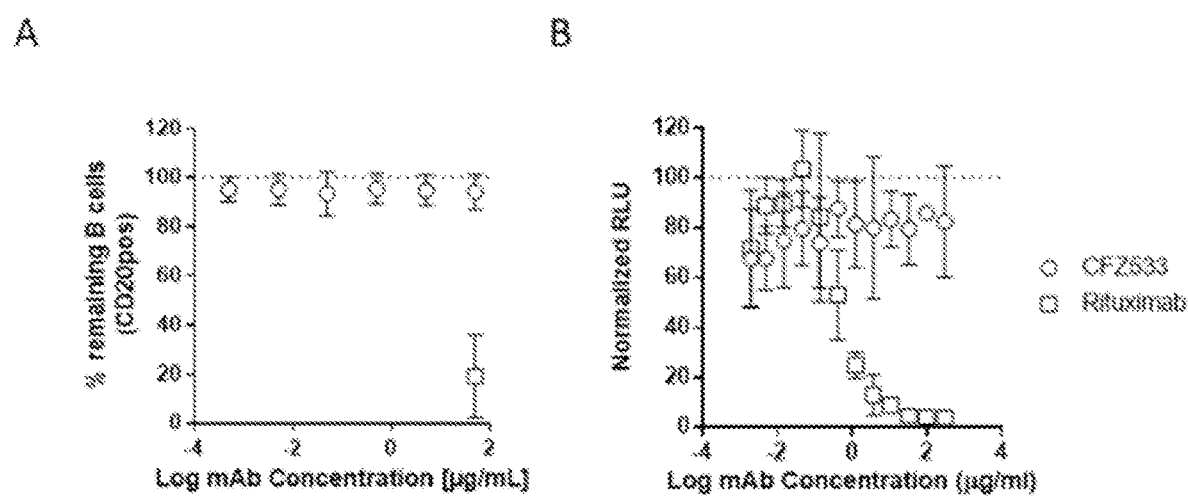
FIG. 5 is graphs showing that CFZ533 does not mediate cell depletion in vitro.

FIG. 5A shows data from human whole blood cultures incubated for 72 hours in the presence of a dose titration of CFZ533 or 50 µg/ml Rituximab. B cells numbers were determined based on CD45pos and CD19pos events falling within lymphocyte FSC/SSC gate. Results for individual antibody concentrations were calculated as percent remaining B cells with reference to untreated samples and graphed as a function of log-transformed antibody concentration (adjusted to 100% and shown as a dotted line). Data represent the mean and SD of eight independent donors. FIG. 5B shows results from Raji B cells incubated with different concentrations of Rituximab or CFZ533 and a fixed concentration of rabbit complement. Concentration dependent killing of the Raji cells was analyzed after 2 hours, where the viability of the cells was measured by determination of the ATP concentration in each well using luciferase. Results are presented as isotype-control normalized relative luciferase units (RLU) as a function of log-transformed antibody concentration.

FIG. 5A indicates that while the depleting anti-CD20 antibody Rituximab was able to eliminate approximately 80% of B cells in human whole blood, while CFZ533 failed to mediate any cell depletion. In addition, CFZ533 was unable to mediate complement-dependent cytotoxicity (CDC) of Raji B cells, in contrast to Rituximab (FIG. 5B).

CFZ533 is Internalized by B Cells in a CD40-Dependent Manner

Figure 6:
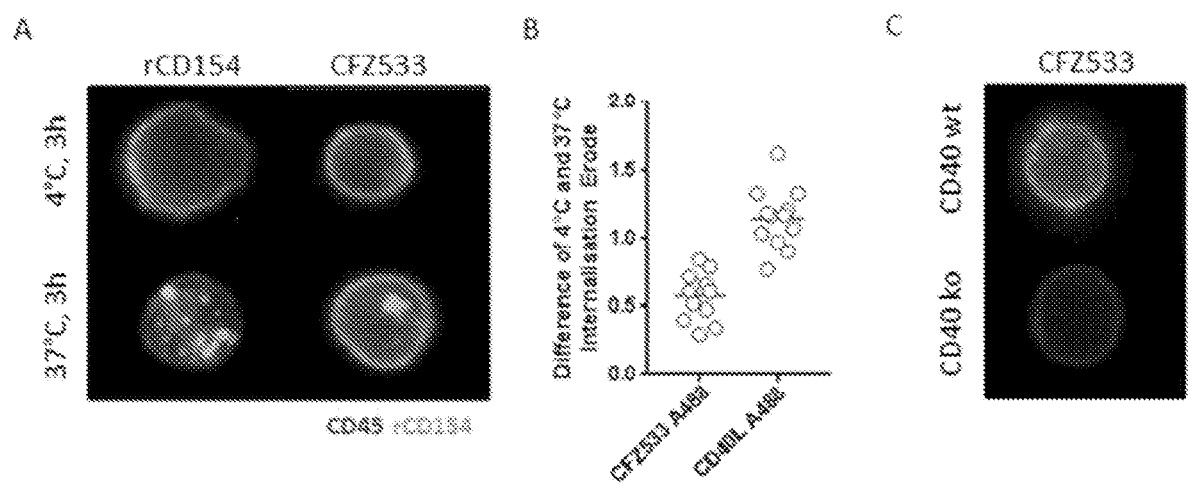
FIG. 6 is representative images of individual RI-1 B cells showing internalization of CD40 receptors upon binding by recCD154 or CFZ533.

We next wanted to examine whether CFZ533 could be internalized by the CD40 expressing human B cell line RI-1. FIG. 6A indicates that rCD154 was internalized under permissive conditions (37° C.) in comparison to non-permissive conditions (4° C.), where weak staining of rCD154 could be observed on the plasma membrane. CFZ533 was also internalized, although there did appear to be residual membrane staining at 37° C. FIG. 6B indicated that the extent of internalization of rCD154 appeared to be greater than that observed for CFZ533. Using a CD40 knockout RI-1 B cell line, we could demonstrate that binding and internalization of CFZ533 (FIG. 6C) and rCD154 (data not shown) was CD40 dependent.

FIG. 6A shows Representative images of individual RI-1 B cells cultured with AlexaFlour 488 labeled rCD154 or CFZ533 for 3 hours at 37° C. or 4° C. FIG. 6B. Relative internalization erode of CFZ533 and rCD154 under permissive conditions (non-permissive erode values subtracted). Each dot represents data from an individual experiment and the population mean is indicated as a horizontal red line. FIG. 6C. Representative images of individual CD40 expressing or CD40 knock-out RI-1 cells cultured with Alexa488 labeled CFZ533 for 3 hours at 37° C. In all experiments, cells were co-stained with AlexaFlour 647 labeled CD45 to demark the cell membrane.

Pharmacokinetic Properties of CFZ533 in Non-Human Primates

Figure 7:
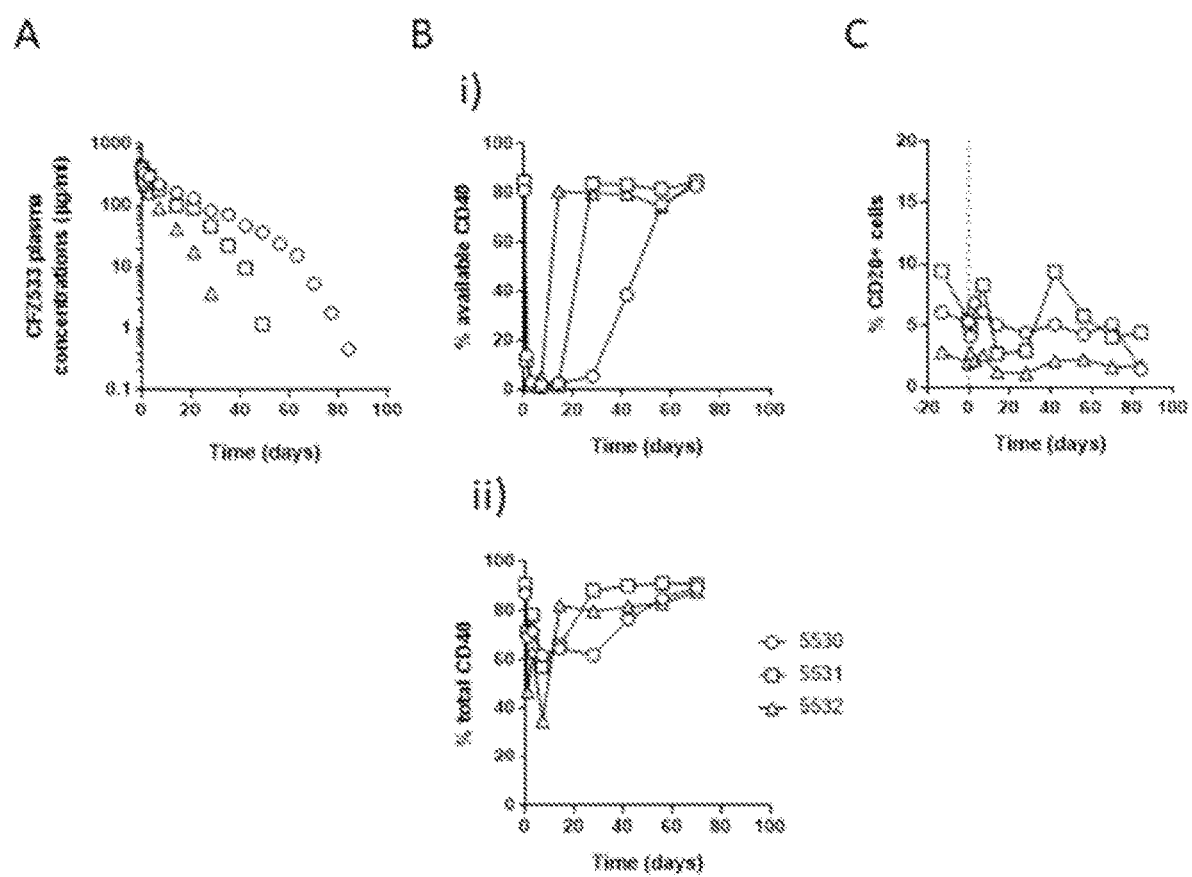
FIG. 7 is graphs showing the pharmacokinetic and pharmacodynamic (target engagement; no B cell depletion) properties of CFZ533 in non-human primates.

FIG. 7A. Serum concentrations of CFZ533 in three cynomolgus monkeys after single dose administration at calculated doses of 16.2 (5532), 18.5 (5531) and 20 (5530) mg/kg intravenously. FIG. 7B. CD40 occupancy: percent available CD40 (i) and percent total CD40 (ii) C. Peripheral B/T cells: percentage of peripheral blood B cells after single dose. Day 0 is when CFZ533 was administered.

Data above indicated that CFZ533 bound NHP CD40, and could inhibit rCD154-induced activation of NHP B cells with similar potencies. This suggested that cynomolgus and rhesus monkeys would be suitable species for in vivo studies investigating the relationship between CFZ533 PK and PD. Data in FIG. 7A shows the PK profiles of three cynomolgus monkeys following a single intravenous dose of CFZ533 (calculated doses of 16.2, 18.5 and 20 mg/kg). Typical for a monoclonal antibody targeting an internalizing membrane bound antigen (Mager et al. 2006 and Ng et al. 2006), the time course of CFZ533 concentration exhibited clear target-mediated disposition, resulting in non-linear PK profiles and concentration-dependent clearance rate and half-life. The inflection point observed in the PK profiles is a marker of target engagement and is associated with an increased contribution of CD40 to the overall clearance of CFZ533, and a shorter half-life. Further, the inflection point in the PK profiles coincided with the time where a drop of CD40 saturation was observed (FIG. 7B, i). This occurred at approximately 10-20 µg/ml, when CFZ533 was subject to more rapid elimination. In all animals, there was no loss of CD40 receptor expression on cells (FIG. 7B, ii). Further, CFZ533 did not deplete peripheral blood B cells (FIG. 7C) or T cells (data not shown), despite some observed variations throughout the study.

CFZ533 Inhibits Recall T Cell-Dependent Antibody Production

Figure 8:
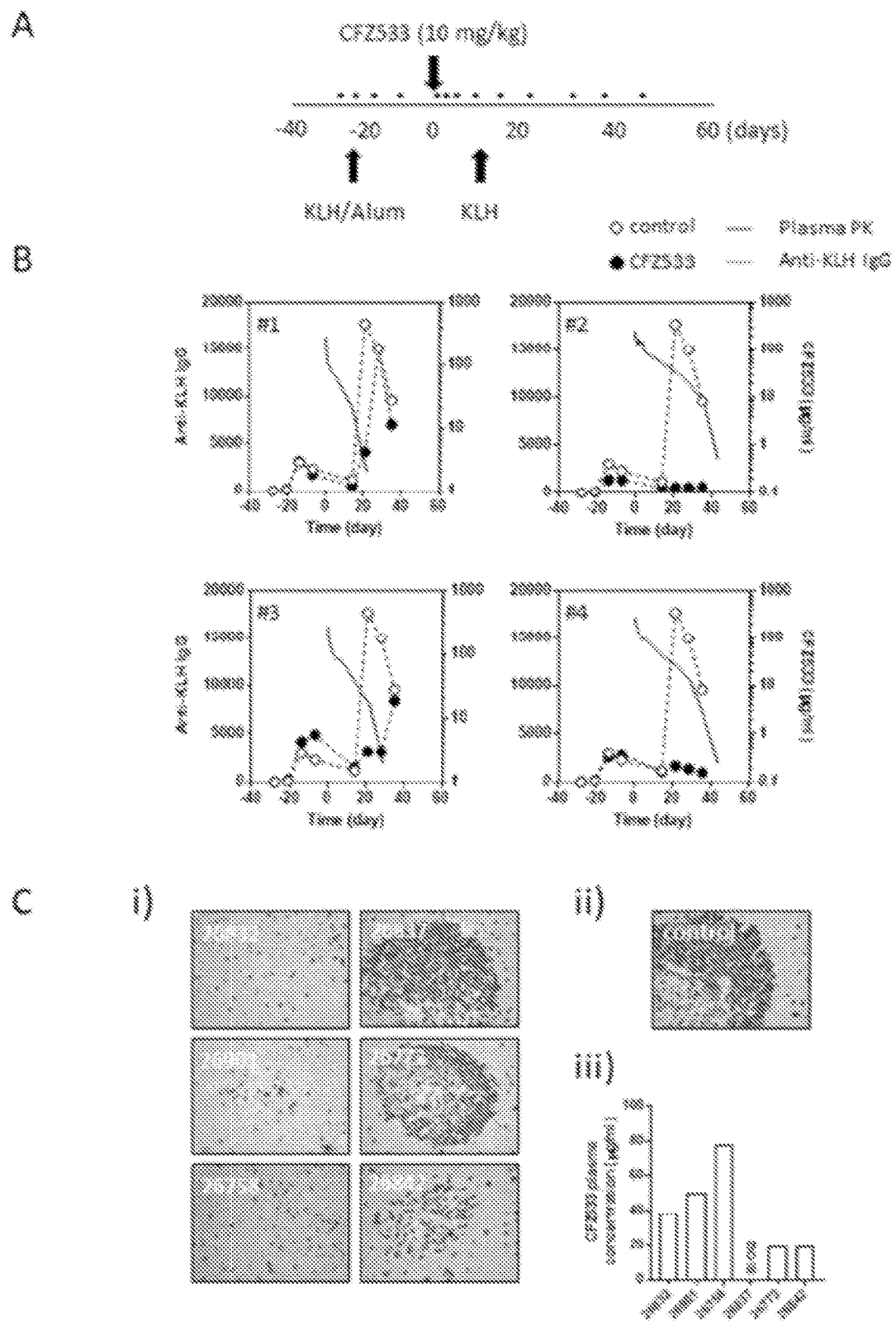
FIG. 8A is an experimental design schematic of a PK/PD and vaccination study in non-human primates.
FIG. 8B is graphs showing anti-KLH IgG (immune response) and plasma CFZ533 levels (pharmacokinetics).
FIG. 8C shows results of a histological analysis of germinal centers.

FIG. 8A shows experimental design schematic for evaluating the effect of CFZ533 on recall TDARs. Arrows below the x-axis highlight primary and secondary KLH immunizations. The timing of a single dose of 10 mg/kg CFZ533 is shown above. The asterisks indicate time points at which anti-KLH IgG and/or CFZ533 levels were measured. FIG. 8B. Each graph shows anti-KLH IgG (closed symbols) and plasma CFZ533 levels (log-scale; unbroken line) for an individual animal. Average anti-KLH IgG levels from control animals (open symbols) are overlaid on each graph for comparative purposes. FIG. 8C. Histological analysis of germinal centers (Ki67 staining) in mLNs from Rhesus monkeys from a 1 mg/kg/week subcutaneous multiple dose 26-week study using CFZ533. Representative mLN sections from six animals are shown (i) along with a control image (ii). iii. Average steady state CFZ533 serum concentrations over a dosing interval from individual animals at the end of the treatment period.

An expected on-target, PD effect of CD40 blocked is inhibition of a TDAR (Kawabe et al. 1994). CFZ533 inhibits primary TDARs in NHPs and humans, and we also wanted to examine the effects of this antibody on a recall TDAR. The experimental design is summarized in FIG. 8A. Briefly, four rhesus monkeys were immunized with KLH in Alum at study day −28 (priming), prior to a single intravenous dose of CFZ533 at 10 mg/kg on study day 1, followed by a second KLH immunization on study day 15.

FIG. 8B illustrates the effects of CFZ533 on anti-KLH IgG recall responses in four individual animals in comparison to data from immunized controls (no CFZ533). There was inter-animal variability in PK profiles of CFZ533, with more rapid elimination of CFZ533 observed in animals #1 and #3. Higher plasma concentrations were observed for a longer period of time in animals #2 and #4. Interestingly, these animals displayed complete suppression of an anti-KLH IgG (and IgM; data not shown) recall response on study day 15 (note all animals mounted a primary TDAR to KLH). In contrast, anti-KLH IgG responses were observed (albeit with some delay) in animals with more rapid clearance of CFZ533 (higher delay for animal #3 as compared to animal #1), notably when serum CFZ533 levels were less than approximately 40 μg/ml at the time of second KLH immunization. As has been observed with previous in vivo experiments with CFZ533 in transplanted (Cordoba et al. 2015) and nontransplanted animals (FIG. 7B), no peripheral B cell depletion was observed (data not shown).

The above results indicated that CFZ533 serum concentrations higher than approximatively 40 μg/ml were required for complete suppression of a recall TDAR in NHPs. We wanted to further examine the relationship between CFZ533 exposure and CD40 pathway-relevant tissue pharmacodynamic effects. At the termination of a 26-week toxicology study, at 1 mg/kg/week CFZ533 subcutaneously we performed histological and molecular analysis of GCs in mesenteric lymph nodes (mLNs). FIG. 8C (i) indicates that of the six animals dosed, we could observe complete suppression of GCs in three individuals, whereas GCs could still be observed in the mLNs of the remaining animals. FIG. 8C (iii) indicates that serum concentrations of at least 38 μg/mL (average steady-state concentration over the dosing interval) were associated with complete suppression of GC development in cortical B cell areas of lymph nodes, whereas incomplete (animal 26842) or no suppression (animals 26772 and 26837) of GCs was observed at serum concentrations below 20 μg/mL, despite full CD40 occupancy on whole blood $CD20^{pos}$ B cells (animals 26842 and 26772; data not shown). There was no evidence of peripheral B cell depletion (data not shown).

DISCUSSION

CFZ533 is being developed as a potential therapy for solid organ transplantation and autoimmune diseases associated with dysregulation of the CD40-CD154 co-stimulatory pathway. Here we describe the characterization of the functional properties of CFZ533 in CD40-pathway relevant in vitro and in vivo model systems as well as investigating the relationship between CFZ533 exposure and PD effects.

CFZ533 was able to bind CD40 and completely prevent rCD154-induced pathway activation on different human immune cell types including B cells and DCs. In addition, it appears that in excess of 90% CD40 occupancy was required for CFZ533 to completely block pathway activation in whole blood. Collectively these data suggested that CFZ533 has the potential to block CD40 pathway-dependent effector functions irrespective of cell type, assuming sufficient receptor occupancy was achieved. Our data also indicated that in PBMCs, CFZ533 was able to displace pre-bound rCD154 from CD40 suggesting that the epitopes of the mAb and physiological ligand may overlap; a notion under investigation in structural studies.

In vivo, a concentration-dependent clearance rate and half-life was observed for CFZ533 in single dose PK studies. This PK profile suggested that CD40 receptor expression affected the elimination of CFZ533. At low CFZ533 concentrations (i.e. incomplete target saturation), the contribution of CD40 to the overall clearance of CFZ533 was elevated and the half-life was somewhat shorter than usually observed for IgG1 type antibodies. At higher concentrations corresponding to complete target saturation (and full functional pathway inhibition), the contribution of the receptor to the overall clearance of CFZ533 was limited and the half-life was increased. The target-mediated clearance of CFZ533 was consistent with CD40-mediated internalization of CFZ533 observed in vitro, that is likely followed by lysosomal degradation of the complex.

An additional finding from the PK/PD studies confirmed the inability of CFZ533 to deplete peripheral B cells in vivo (Cordoba et al. 2015). As mentioned, the inability of CFZ533 to deplete CD40 expressing cells is due to the presence of a N297A mutation in the antibody leading to the absence of N-linked glycosylation in the hinge region, rendering it unable to bind FcγRIIIA or mediate ADCC or CDC. Fc-silencing of CFZ533 was done to prevent depletion of CD40-expressing cell types; of particular concern given the broad tissue distribution of this receptor on immune and non-immune cell types, particularly under inflammatory conditions.

In addition to efficacy in NHP renal transplantation (Cordoba et al. 2015), results in this paper indicated that CFZ533 completely inhibited recall TDARs. This result suggested that memory B cell responses to T cell-dependent antigens were fully dependent on CD40-CD154 interactions. The extent of inhibition of the recall response appeared to be related to the concentration of CFZ533, with serum levels in excess of 30-40 μg/ml (for at least a week after boosting) being required for full suppression of an antigen-specific antibody response. This relationship between serum concentration and a CD40 pathway-relevant tissue PD readout also held when examining the effect of CFZ533 on mesenteric lymph node GCs, where a minimum threshold of average, steady-state serum CFZ533 concentrations was required for complete suppression of GCs. These data point to the importance of establishing a relationship between peripheral drug exposures and a target-relevant PD effect in tissue in order to inform dosing strategies. Several biologics targeting the CD40-CD154 costimulation pathway are being developed for various autoimmune diseases. In addition to anti-CD40 mAbs like CFZ533, anti-CD154 mAbs remain in the clinic, despite the potential risk for thromboembolic events (Boumpas et al., 2003). Recent results have suggested that Fc-silencing and pegylated F(ab')2 approaches may eliminate the thromboembolic liabilities of antibodies targeting CD154, however there are reports that Fc-silent anti-CD154 mAbs may be less efficacious. To date there is no evidence of thromboembolic events associated with administration of multiple anti-CD40 antibodies in preclinical models or in the clinic.

In conclusion, our data indicate that CFZ533 is a pathway blocking, non-depleting anti-CD40 antibody with minimal agonistic properties. At sufficient, pharmacologically relevant exposures, CFZ533 is able to completely inhibit recall TDARs as well as suppress germinal centers without depleting CD40 expressing cell types. These data, combined with preclinical efficacy in kidney transplantation provide solid scientific rationale for the potential clinical utility of CFZ533 in select autoimmune diseases and solid organ transplantation.

Example 8. CD40 Pathway Inhibition and Hidradenitis Suppurativa

Analysis of skin samples from human HS patients shows that the target (CD40) of CFZ533 as well as the ligand (CD40LG) are more abundant both on RNA and protein level compared to healthy skin. Furthermore experiments show that CD40 expression can be induced by disease relevant cytokines (TNF, IFNG) in cell types that constitute the major components of the skin (keratinocytes and dermal fibroblasts) and that subsequent CD40LG induced signaling is mirrored in HS patients. In addition it can be shown that tertiary lymphoid structures with germinal centers are formed in diseased tissue and autoantibodies can be found in serum from HS patients. Taken together the evidence suggests that the CD40 pathway is active and disease relevant and thus inhibition of it will benefit HS patients.

1. Materials and Methods

Transcriptomics

Transcriptomics analysis of 19 HS skin biopsies versus 8 healthy skin biopsies were derived as follows: From snap frozen skin tissue, a homogenate was prepared using recommended buffers from Qiagen RNeasy mini kit. The total RNA of the cells was extracted according to manufacturers protocol. cDNA of the samples was prepared from the same starting amount of RNA using a High capacity cDNA reverse Transcription Kit (Applied Biosystems). Samples were processed by CiToxLAB France on Affymetrix HG_U133_Plus2 microarrays. RMA normalized data was analyzed using GeneSpring 11.5.1 (Agilent Technologies, Santa Clara, CA) and the results were interpreted using Illumina BaseSpace Correlation Engine software and Qiagen IPA. Initially, the data was subject to standard QC control by CiToxLAB and in GeneSpring (PCA, hybridization controls). Subsequently, it was filtered on expression levels to probesets above the 20th percentile in 100% of the samples in any one of the conditions before further analysis.

To create differentially expressed gene lists, probesets were selected that were more that 2× and significantly different between the groups (i.e. lesional vs. healthy) using $p<0.05$ in an unpaired T Test and Benjamini Hochberg FDR.

Histology

Twenty seven skin biopsies (16 lesional and 11 non-lesional) from 11 HS patients and three skin biopsies from healthy volunteers were received from the University Hospital Basel, Department of Plastic, Reconstructive & Aesthetic Surgery and Hand Surgery in Basel, Switzerland as part of a non-interventional biomarker study (TRI1270397, approved by EKNZ).

Three-µm-thick paraffin sections were cut and stained using Ventana XP immunostainer (Roche Diagnostics, Switzerland) stainings for CD40 (polyclonal rabbit anti-CD40 antibody: E3702, Lot: 130507MD, Spring Bioscience, USA) and CD40L (polyclonal goat anti-CD40 Ligand/TNFSF5: AF617, Lot: BFW0314021, R&D, UK). In addition, CD3 for T cells (clone: SP7, NeoMarkers Inc., USA), CD20 for B cells (clone L26, Dako, Denmark), CD68 for macrophages (clone KP-1, Dako, Denmark) immunostainings were performed. Specific isotype controls were used as negative controls. All biopsy samples were digitalized using ScanScope XT slide scanner (Aperio, Leica Biosystems, Switzerland) with objective ×20 or ×40.

2. Results

Figure 9A:
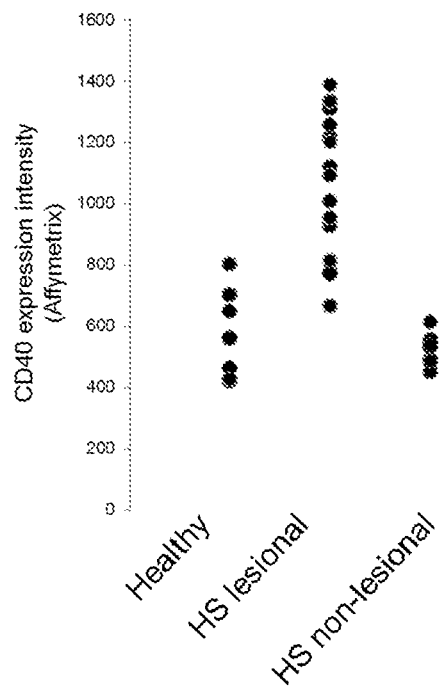
FIG. 9A is a graph showing CD40 expression in different tissue types and FIG. 9B is a graph showing CD40L expression in different tissue types.
Figure 9B:
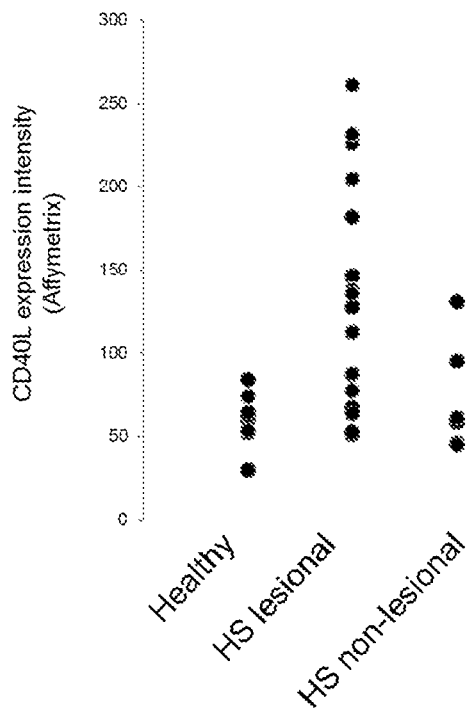

Analysis of the HS transcriptome from patients show an increase of mRNA message level of both CD40 and CD40LG in HS lesions compared to levels of non-lesional or healthy tissue. The result is shown in FIG. 9, where it is clearly seen that CD40 (FIG. 9A) and CD40L (FIG. 9B) expression intensity is higher in HS lesional samples than in HS no-lesional samples and healthy samples.

Figure 10:
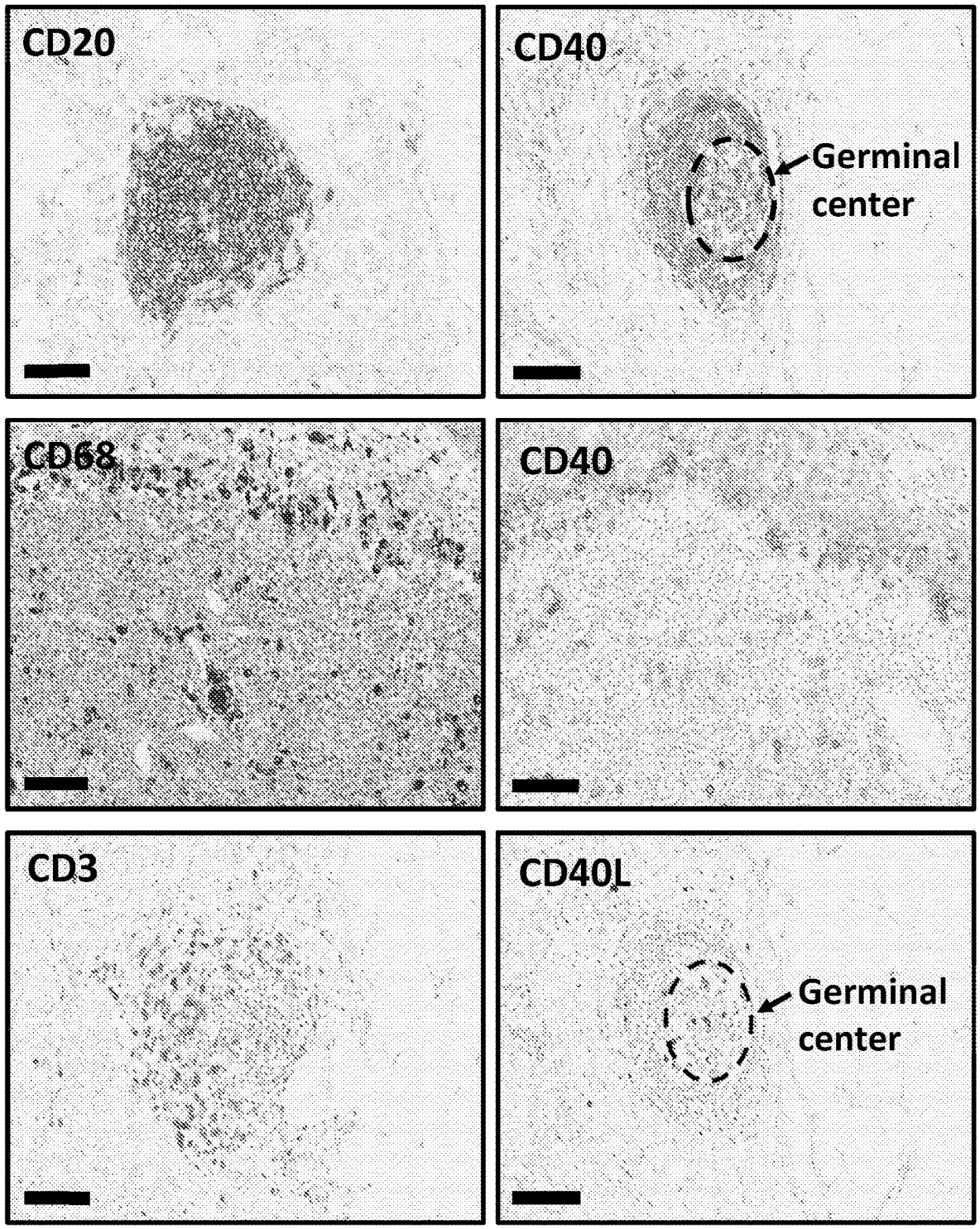
FIG. 10 shows histology results.

As shown in FIG. 10, immunohistochemical staining revealed expression of CD40 in the area of CD20-positive B cells in tertiary lymphoid structures containing germinal centers and CD68-positive macrophages (including multi-nucleated giant cells) in the dermis. In addition CD40L staining occurred mainly within the germinal centers of the tertiary lymphoid structures where CD3 (T-cell marker) staining was observed. The scale bar indicates 100 µm.

In data not shown we found that CD40 mRNA (by RT-PCR) and protein (FACS) expression can be induced in keratinocytes and dermal fibroblasts with cytokines like TNF and IFNG, both of which are abundant in lesions of HS patients. Subsequent transcriptomic analysis of thus primed cells stimulated with CD40LG revealed the upregulation of genes which are also increased in HS lesional tissue.

Additional data (not shown) indicates that HS patients have increased auto-antibody levels indicating that the increased number of CD40 positive B-cells and the ectopic germinal center have a functional consequence for the patient.

Thus, the disclosed CD40 antagonists and compounds according to any one of embodiments, such as CFZ533, may be used in vitro, ex vivo, or incorporated into pharmaceutical compositions and administered in vivo to treat HS patients (e.g., human patients).

3. CD40 Pathway Inhibition

The median treatment duration of comparative HS trials in a recent Cochrane review was 16 weeks (Ingram et al 2016). This was also the duration of a similar placebo-controlled phase 2 study with adalimumab, recently approved for the treatment of HS (Kimball et al 2012) while another placebo-controlled trial was up to 24 weeks in a very similar HS population (Tzanetakou et al 2016). Placebo treatment may have some effect on the disease, reflecting the natural history, regression to the mean effects or a tighter clinical management of the subjects in part also due to concomitant medication. In this trial, the use of topicals for wound care is allowed, as well as short term (<2 weeks) antibiotics, if medically justified, including for skin infections. If medically justified, subjects may receive additional treatment (according to standard of care) after the end of the treatment period during the safety follow up period. If a lesion needs incision or limited excision to relieve the subject, this is permitted and must be recorded.

HS subjects present with a high inflammatory status which is likely to be associated with high CD40 expression and therefore the loading phase is justified to overcome the efficient CD40-mediated elimination of iscalimab when iscalimab is administered s.c. in conditions where CD40 expression in tissues is likely to be elevated.

This has been demonstrated in Study CCFZ533X2203 in pSS subjects. In Cohort 1 of that study (s.c. regimen; data not shown) most subjects demonstrated lower than expected PK profiles due to efficient presystemic CD40-mediated elimination, likely in the interstitium, lymphatic capillaries and/or lymph nodes. As CD40 receptors have been reported to be upregulated on parenchyma in inflamed tissues, an increased level of CD40 receptors is likely to be the origin of the efficient pre-systemic CD40-mediated elimination of iscalimab. Iscalimab is subject to target mediated elimination, and elevated CD40 expression is associated with high elimination rate of iscalimab if CD40 receptors are not fully saturated.

In HS subjects, the 600 mg s.c. weekly regimen during the loading period is expected to provide, at start of treatment, rapid and complete CD40-CD40L pathway blockade in target tissues.

In Study CCFZ533X2203, to demonstrate that an s.c. regimen was able to deliver steady state trough plasma concentrations similar to Cohort 2 (i.v. regimen; data not shown) and had the ability to overcome the CD40-mediated elimination of iscalimab, Cohort 3 was introduced: 600 mg s.c. weekly on 4 occasions (loading), followed by 300 mg s.c. weekly on 9 occasions (maintenance; data not shown). Preliminary data indicated that this regimen was safe and well tolerated.

During the maintenance phase of the study disclosed in Example 9 (from Day 43 (Week 7) to Day 99 (Week 15)) iscalimab will be administered at 600 mg s.c. every other week (Q2W; 5 doses).

Figure 11:
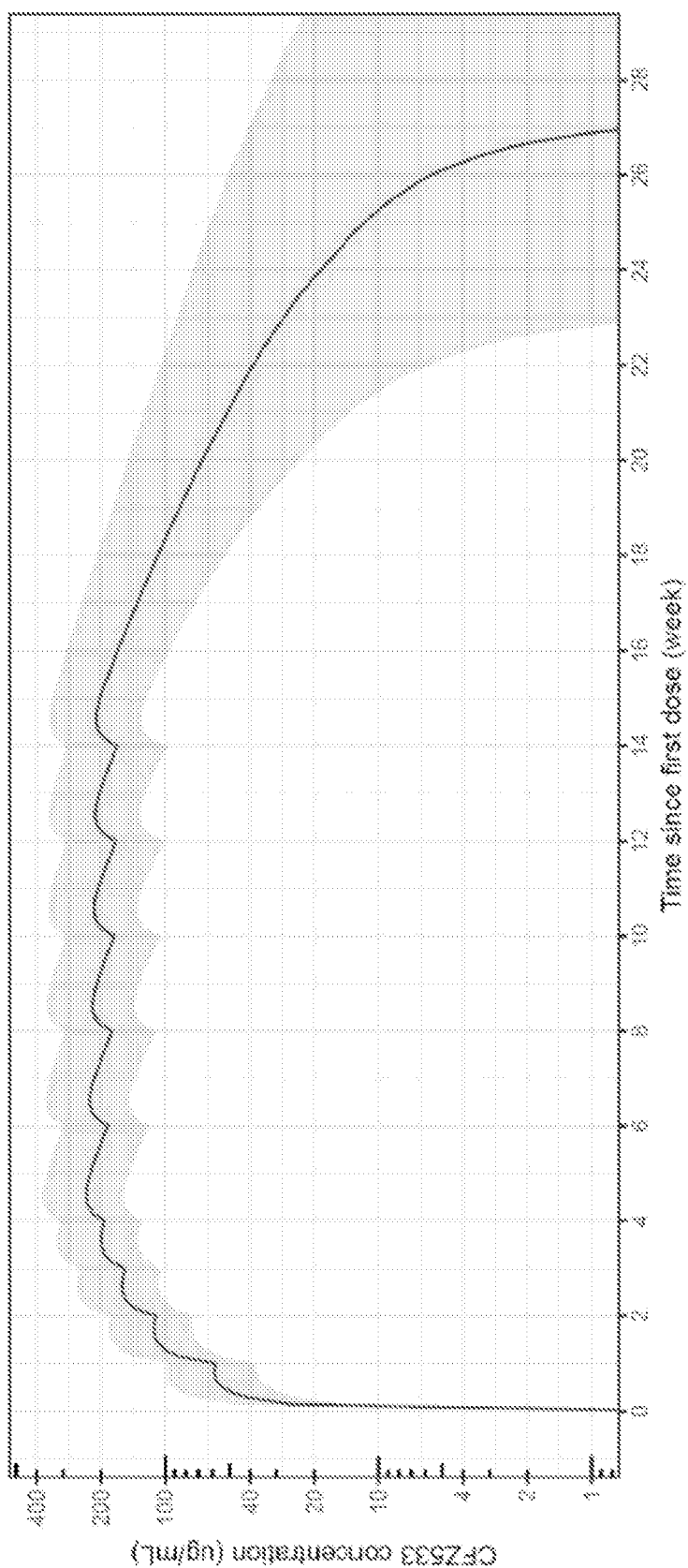
FIG. 11 is a graph representing the predicted plasma concentration-time profiles for CFZ533.

The 600 mg Q2W maintenance regimen is expected to deliver steady state trough plasma concentrations of about 160-170 μg/mL (FIG. 11), which is slightly above those observed in Study CCFZ533X2203-Cohort 2 (10 mg/kg IV regimen) in pSS subjects. In Study CCFZ533X2203-Cohort 2, steady state iscalimab trough plasma concentrations of 100-120 μg/mL were associated with clinical efficacy, such as clinical improvement of the EULAR Sjögren's Syndrome Disease Activity Index, and suppression of a biologically relevant biomarker CXCL13 (chemokine CXC ligand 13 protein; a marker of germinal center activity).

In HS (a follicular skin disease with deep dermal nodules/ boils (in apocrine gland-bearing skin) and abscesses), tissue penetration of iscalimab is key and is likely to require higher plasma exposure as compared to pSS.

4. Hidradenitis Suppurativa

HS is a chronic, inflammatory, scarring condition involving primarily the intertriginous skin of the axillary, inguinal, inframammary, genito-anal, and perineal areas of the body. Three diagnostic criteria establish a diagnosis of HS: typical lesions (deep-seated painful nodules [blind] boils in early primary lesions, or abscesses, draining sinuses, bridged scars, and "tombstone" open comedones in secondary lesions); typical topography (axillae, groin, genitals, perineal and perianal regions, buttocks, and infra- and intermammary areas; and chronicity and recurrence (Margesson and Danby (2014)). The physical extent of HS can be classified at baseline using Hurley's clinical staging, shown below in Table 2:

| Stage I | Abscesses only (single or multiple) without sinus tracts and cicatrization (scarring) |
| Stage II | Abscesses (single or multiple) with tract formation or cicatrization, single or multiple widely separated lesions (e.g., >10 cm apart) |
| Stage III | Diffuse or near diffuse involvement, or multiple interconnecting tracts or abscesses across entire area |

Table 2: Hurley's Stages of HS. Practically speaking, a patient having Hurley's stage III may have burned-out Stage III, but active Stage I or II lesions.

HS consists of follicular plugging, ductal rupture, and secondary inflammation. Patients first experience a plug in the follicular duct, which, over time leads to duct leak and horizontal rupture into the dermis. When repair of the folliculo-pilosebaceous (FPSB) fails, the follicular fragments stimulate three reactions that begin the HS disease course. The first is an inflammatory response, triggered by the innate immune system, causing purulence and tissue destruction, and leading to foreign body reactions and extensive scarring. The second reaction leads to epithelialized sinuses, which may evolve from stem cells derived from the FPSB unit that survive the destruction caused by the inflammatory response. Third, an invasive proliferative gelatinous mass is produced in most cases, consisting of a gel containing inflammatory cells, and, it is postulated, the precursors of the epithelialized elements described above. (See Margesson and Danby (2014)). As used herein, the phrase "slowing HS disease progression" means decelerating the advancement rate of any of the aspects of the HS disease course described above, particularly the inflammatory response. In some embodiments of the disclosure, treatment with the anti-CD40 antibody slows HS disease progression.

Recurrence of HS in a patient includes the development of papules, pustules or inflammatory nodules, pain and itching, abscesses, draining, and any combination thereof. As used herein, "HS flare" (and the like) is defined as at least a 25% increase in abscesses and inflammatory nodule counts (AN), with a minimum increase of two ANs relative to a baseline.

In some embodiments of the disclosure, treatment according to the disclosed methods with the Anti-CD40 antibodies prevents HS flares, decreases the severity of HS flares, and/or decreases the frequency of HS flares. In some embodiments, when a population of HS patients is treated according to the disclosed methods, less than 5%, less than 10%, less than 15% or less than 20% experiences a flare during the first 16 weeks of treatment.

As used herein, the phrase "decreasing the severity of HS flares" and the like means reducing the intensity of an HS flare, e.g., reducing the number and/or size of abscesses and/or inflammatory nodules, reducing the strength of a particular flare component (e.g., reducing the number, size, thickness, etc. of abscesses and/or inflammatory nodules, reducing the extent of skin irritation (itching, pain) etc.), and/or reducing the amount of time a flare (or component thereof) persists.

As used herein, the phrase "decreasing the frequency of HS flares" and the like means reducing the incidence of HS flares, e.g., reducing the incidence of abscesses and/or inflammatory nodules. By decreasing the frequency of HS flares, a patient will experience fewer HS relapses. The incidence of flares may be assessed by monitoring a patient over time to determine if the prevalence of flares decreases.

As used herein, the phrase "preventing HS flares" means eliminating future HS flares and/or flare components.

The effectiveness of an HS treatment may be assessed using various known methods and tools that measure HS disease state and/or HS clinical response. Some examples include, e.g., Hurley's staging, severity assessment scoring system (SAHS), a Sartorius score, a modified Sartorius score, the HS physicians' global assessment (HS-PGA) score, a visual analog scale (VAS) or numeric rating scale (NRS) to rate skin related pain, the dermatology life quality index (DLQI), HS clinical response based on sum of abscesses and inflammatory nodules (HiSCR), simplified HiSCR, EuroQuol-5D (EQ5D), hospital anxiety and depression scale, healthcare resources utilization, Hidradenitis Suppurativa Severity Index (HSSI), Work productivity index (WPI), inflamed body surface area (BSA), Acne Inversa Severity Index (AISI) etc. (see, e.g., Deckers and Prens (2016) Drugs 76:215-229; Sartorius et al. (2009) Br. J. Dermatol 161:831-39; Chiricozzi et al. (2015) Wounds 27(10):258-264). In some embodiments, the effectiveness of the method of the invention disclosed herein may be assessed by the HS physicians' global assessment (HS-PGA), severity assessment scoring score (SAHS), score numeric rating scale (NRS), the dermatology life quality index (DLQI), HS clinical response based on sum of abscesses and inflammatory nodules (HiSCR), and/or simplified HiSCR Preferably, the effectiveness of the HS treatment as disclosed herein may be assessed by HS clinical response based on sum of abscesses and inflammatory nodules (HiSCR), and/or simplified HiSCR.

In some embodiments, an HS patient achieves a HiSCR in response to HS treatment. In some embodiments, when a population of HS patients is treated according to the disclosed methods, at least 30%, at least 40%, at least 50%, at least 60% or at least 70% achieve a HiSCR by week 16 of treatment.

In other embodiments, the effectiveness of the HS treatment as disclosed herein can be measured by the difference between the responder rate in the treated patients (i.e. patient achieving a HiSCR response to the HS treatment with compound of the invention) and the responder rate in the placebo treated patients, by week 16 of treatment. In some embodiment, this difference in the responder rate as measured by HiSCR is at least 15%, at least 25%, at least 30% or at least 35%.

Preferred scoring systems for treatment response are the HiSCR, simplified HiSCR, NRS (especially NRS30), severity assessment scoring system (SAHS), HS-PGA, inflammatory lesion count (count of abscesses, inflammatory nodules, and/or draining fistulae), and the DLQI.

The Hidradenitis Suppurativa Clinical Response (HiSCR) is a measure of clinical response to HS treatment. A HiSCR response to treatment (compared to baseline) is as follows: 1) at least 50% reduction in abscesses and inflammatory nodules, and 2) no increase in the number of abscesses, and 3) no increase in the number of draining fistulae. As used herein the "simplified HiSCR" or "sHiSCR" refers to a modified HiSCR that does not include the abscess count versus baseline when assessing progression of lesions. In preferred embodiments, an HS patient achieves a simplified HiSCR in response to HS treatment. In some embodiments, when a population of HS patients is treated according to the disclosed methods, at least 40%, at least 50%, at least 60%, or at least 70% achieve a simplified HiSCR by week 16 of treatment.

Pain can be assessed using a numeric rating scale (NRS). In some embodiments, an HS patient achieves an improved NRS in response to HS treatment. NRS30 is defined as at least 30% reduction in pain and at least 1 unit reduction from baseline in Patient's Global Assessment (PGA) of Skin Pain from baseline in patients with a baselines score of 3 or higher. In some embodiments, an HS patient achieves an NRS30 in response to HS treatment. In some embodiments, when a population of HS patients is treated according to the disclosed methods, at least 25%, at least 30%, at least 40%, at least 50%, or at least 60% achieve an NRS30 by week 16 of treatment. In a preferred aspect of this embodiment, when a population of HS patients is treated according to the disclosed methods, at least 30% achieve an NRS30 by week 16 of treatment. In some embodiments, in response to treatment according to the claimed methods, the patient experiences rapid reduction in pain, as measured by VAS or NRS, as early as 1 week after initial dosing.

The severity assessment scoring system (SAHS) is described by Hessam S, Scholl L, Sand M, et al (2018). The severity of HS can be assessed by the SAHS score, for which the following items are surveyed: number of involved regions (axilla left, axilla right, submammary left, submammary right, intermammary or chest, abdominal, mons pubis, groin left, groin right, genital, perianal or perineal, gluteal left, gluteal right, and others [eg, neck, retroauricular]), number of inflammatory and/or painful lesions other than fistula (ILOF), and number of fistula. These physician-rated items were completed by 2 patient-reported items: patients were asked for number of new boils or number of existing boils, which flared up during the past 4 weeks and to rate the current severity of pain (NRS) of the most symptomatic lesion in the course of their daily activities (eg, sitting, moving, or working) on a numerical rating scale. The SAHS score is a composite score of all the collected information above. A mild case of HS is defined by a SAHS score of 4 or less. A moderate HS is defined by a SASH score of 5 to 8, and a severe case of HS is defined by SASH of 9 or higher.

In some embodiments, an HS patient achieves an improved SAHS score in response to HS treatment. In some embodiments, an HS patient achieves at least one point reduction from baseline in the SAHS score in response to HS treatment. In other embodiments, an HS patient achieves at least two points reduction or at least 3 points reduction from baseline in the SAHS score in response to HS treatment. Preferably, the SAHS score was at least 4 at baseline before treatment with an anti-CD40 antibody.

The DLQI is the most established dermatological life quality instrument. It consists of questions regarding the impact of the skin disease on feelings and different aspects of daily life activities during the last week. Each question is scored from 0 (not at all) to 3 (very much). A total of 30 points is the maximum score, where 0-1 is regarded as no effect, 2-5 small, 6-10 moderate, 11-20 very large and 21-30 as extremely large effect on the patient's life. (See Finlay and Khan (1994) Clin Exp Dermatol 19:210-16). In some embodiments, an HS patient achieves an improved DLQI in response to HS treatment.

In some embodiments, in response to treatment according to the claimed methods, the patient experiences rapid reduction in CRP, as measured by standard CRP assay or a high sensitivity CRP (hsCRP) assay, as early as 1 week after initial dosing. As used herein, "C-reactive protein" and "CRP" refer to serum C-reactive protein, a plasma protein commonly used as an indicator of the acute phase response to inflammation. The level of CRP in plasma may be given in any concentration, e.g., mg/dl, nmol/L. Levels of CRP may be measured by a variety of standard assays, e.g., radial immunodiffusion, electroimmunoassay, immunoturbidimetry, ELISA, turbidimetric methods, fluorescence polarization immunoassay, and laser nephelometry. Testing for CRP may employ a standard CRP test or a high sensitivity CRP (hs-CRP) test (i.e., a high sensitivity test that is capable of measuring low levels of CRP in a sample using laser nephelometry). Kits for detecting levels of CRP may be purchased from various companies, e.g., Calbiotech, Inc, Cayman Chemical, Roche Diagnostics Corporation, Abazyme, DADE Behring, Abnova Corporation, Aniara Corporation, Bio-Quant Inc., Siemens Healthcare Diagnostics, etc.

The Sartorius HS score (also called the HS score, or HSS) is made by counting involved regions, nodules, and sinus tracts in an HS patient. (Sartorius et al. (2003) Br J Dermatol 149:211-13). The modified Sartorius HS score is a revision of the original version of the HSS by making minor simplifications which made it more practical to use, e.g., fewer specific lesions to include in the score, changes to the number of points given for each parameter, etc. (Sartorius et al. (2009)). In some embodiments, an HS patient achieves an improved modified Sartorius HS in response to HS treatment.

The HS physicians' global assessment (HS-PGA) is a 6-scale evaluating scale (scores range from 0-5) based on the number of HS lesions (i.e., abscesses, draining fistulas, inflammatory nodules, and noninflammatory nodules). (Kimball A B, Kerdel F, Adams D et al Adalimumab for the treatment of moderate to severe hidradenitis suppurativa: a parallel randomized trial. Ann Intern Med 2012; 157: 846-855). In some embodiments, an HS patient achieves an improved HS-PGA in response to HS treatment. In some embodiments, an HS patient achieves at least a 2 points reduction from baseline in the HS-PGA score in response to HS treatment. Preferably, the HS-PGA score was at least 3 at baseline before treatment with an anti-CD40 antibody.

In some embodiments, when a population of HS patients are treated according to the disclosed methods, at least 40%, at least 50%, at least 60%, at least 70%, at least 80% or at least 90% of patients who have responded to treatment by week 16 (e.g., patients achieving a HiSCR or simplified HiSCR by week 16) have sustained response 3 months after the end of treatment or 6 months after the end of treatment, or 12 months after the end of treatment. In another aspect of this embodiment, at least 40% of patients or at least 50% of patients who have responded to treatment by week 16 (e.g., patients achieving a HiSCR or simplified HiSCR by week 16) have sustained response 3 months after the end of treatment. Preferably at least 70% of patients who have responded to treatment by week 16 (e.g., patients achieving a HiSCR or simplified HiSCR by week 16) have sustained response 3 months after the end of treatment. As used herein the term "sustained" means that an outcome or goal (e.g., pain reduction, inflammation reduction) is substantially maintained for a given time.

Lesion-related itching can be assessed by a patient survey. The patient is asked to rate the lesion-related itching from 0 (no itching) to 10 (worse possible itching). In some embodiments, when a population of HS patients are treated according to the disclosed methods, the itching score improves by at least 2 points, preferably a least 3 points. Furthermore, when compared to the placebo group, a difference between the treated group and the placebo group is at least 3 points.

The odor caused by the draining of the lesion can be assessed by a patient survey. The patient is asked to rate the odor caused by the draining of the lesion from 1 (no odor), 2 (a little odor), 3 (moderate odor) to 4 (a lot of odor). In some embodiments, when a population of HS patients are treated according to the disclosed methods, the itching score improves by at least 1 point, preferably a least 2 points. Furthermore, when compared to the placebo group, a difference between the treated group and the placebo group is at least 1 point.

The impact on HS on the ability to complete work can be assessed by a patient survey. The patient is asked to rate how much HS impacts the ability to complete work from 1 (no at all), 2 (a little), 3 (moderately), 4 (a great deal) to 5 (unable to do any work). In some embodiments, when a population of HS patients are treated according to the disclosed methods, the itching score improves by at least 1 point, preferably a least 2 points. Furthermore, when compared to the placebo group, a difference between the treated group and the placebo group is at least 1 point.

Example 9. A Randomized, Subject and Investigator Blinded, Placebo Controlled and Multi-Center Study, to Assess Efficacy and Safety of CFZ533 Drugs in Patients with Moderate to Severe Hidradenitis Suppurativa Provided below are the details of the clinical trial design to demonstrate the efficacy of the anti-CD40 antibody CFZ533.

Blinding of subjects and investigators allows for an unbiased assessment of subjective readouts such as lesion counts in HS or global HS-PGA scores, as well as adverse events.

A randomized, subject and investigator blinded, placebo-controlled, multi-center and parallel-group study is run to assess efficacy, safety and tolerability of several active treatment compounds, such as anti-CD40 antibody CFZ533, in subjects with moderate to severe HS. After a screening period of approximately 4-week, the treatment period is planned for 16 weeks and is followed by a safety follow-up of approximately 12 weeks. Subjects are given iscalimab, 600 mg (2 injections of 2 mL; weekly then bi-weekly) s.c. or its corresponding placebo (2×2 mL) s.c.

Subjects included in this study are adult male and female subjects of 18 to 65 years of age, presenting with moderate to severe HS diagnosed with recurrent inflammatory lesions for at least 12 months. The requirements for a subject to be included in the study is that he has at least 5 inflammatory lesions. Baseline evaluations may be started from Day minus 7 to allow completion of assessments on Day minus 1 prior to the treatment on Day 1. All baseline safety evaluation results must be available prior to dosing and meeting eligibility criteria. Randomization is done using a centralized Interactive Response Technology (IRT) system.

The selected primary clinical endpoint is simplified HiSCR (Hidradenitis Suppurativa Clinical Response) after 16 weeks of treatment.

On Day 113 (Week 17), after safety and other assessments have been performed, all subjects enter the follow-up period without administration of any drug. If medically justified, and if no potential safety concerns have been identified (after discussion with the sponsor), subjects may receive during this follow up period previously prohibited medication.

Safety and efficacy assessments are conducted at the follow-up visits on Day 141 (week 21) and Day 197 (week 29). Pharmacokinetics (PK) and pharmacodynamic (PD) are collected. The blinding is maintained for the investigator and the subject until the end of the study. The end of study visit occurs on Day 197 (Week 29), which includes study completion evaluations followed by discharge from the study.

Approximately 45 subjects are randomized, 30 on active and 15 on placebo. On Day 1, a dose of 600 mg iscalimab or matching placebo (2 injections of 2 mL) will be administered by subcutaneous injection (s.c.) by trained site personnel. Clinical assessments will be performed as well as PK, PD, IG, biomarkers and safety assessments. Subjects will be discharged from the site on the same day after completion of all assessments, provided there are no safety concerns. Following the first administration, subjects should be observed for immediate injection site reactions for at least one hour at the site, or longer at the discretion of the Investigator.

Subjects will return to the study center to receive weekly s.c. doses of either 600 mg iscalimab or matching placebo (same as they have received on Day 1) on Day 8 (Week 2), Day 15 (Week 3), Day 22 (Week 4) and Day 29 (Week 5).

After Week 5, subjects will receive 600 mg s.c. iscalimab every other week, on Day 43 (Week 7), Day 57 (Week 9), Day 71 (Week 11), Day 85 (Week 13), and Day 99 (Week 15; last dose).

Safety and selected efficacy assessments will be conducted during these visits and PK/PD/IG/biomarker samples will be collected.

The primary objective is to show preliminary efficacy of treatment with the anti-CD40 antibody CFZ533, in HS subjects after 16 weeks of treatment in comparison to placebo. After the 16-weeks treatment period a follow up period for 12 weeks is included to observe a sustainability of the effect can be sustained or increased after 16 weeks of treatment.

A 2:1 randomization is planned based on the fact to favor exposure to active while limiting exposure of subjects to placebo.

The study includes multiple clinical endpoints, to better evaluate the properties of these selected endpoints:

For this study, the simplified HiSCR (modified from Kimball 2014) was selected as the primary endpoint. The simplified HiSCR is defined as 50% decrease in the total number of abscesses plus inflammatory nodules, without any increase in draining fistulae.

The inflammatory lesions of HS will be counted as individual lesions (inflammatory nodules, abscesses and draining fistulae) in the typical anatomical areas. In addition to the count, a global assessment scale (Hidradenitis suppurativa-physician global assessment or HS-PGA) as well as a composite score (Severity Assessment of Hidradenitis suppurativa score or SAHS) will be used.

Several patient reported outcomes will be used, including the Dermatology Life Quality Index (DLQI). Finally, as from a subject's perspective skin related pain is the most important symptom, the numerical rating scale (NRS) for pain is included.

1. Additional Information on Clinical Assessments:

HS-PGA (Hidradenitis Suppurativa-Physician Global Assessment): The score will be used as exploratory objective to assess HS and was used and described in Kimball A B, Kerdel F, Adams D, et al (2012).

The SAHS score is a composite score (Hessam S, Scholl L, Sand M, et al (2018)) and will be derived from the collected information for inflammatory lesion count, the fistulae count, and the NRS pain. In addition, the anatomical areas and the new or flared existing boils will be collected in both cohorts.

Skin Pain—NRS (numerical rating scale for pain): An NRS for skin related pain was used in adalimumab studies (Kimball et al. (2016)) and will be used as skin or HS related pain is one of the highest burden for the patient (Matusiak et al (2017)). The pain that is HS related will be recorded on average in the last 24 hours and at worst (in the last 24 hours).

Other Patient reported outcomes (PRO) will include aspects as itching, fatigue and work impairment, as well as Dermatology Life Quality Index (DLQI) and dermatology related Quality of life (QoL) tool with validated scores available in many countries and languages. It includes a Patient Global Assessment.

2. Study objectives and endpoints

| Primary objective(s) | Endpoints related to primary objective(s) |
|---|---|
| To demonstrate efficacy of the anti-CD40 antibody CFZ533, compared to the placebo in moderate to severe inflammatory hidradenitis suppurativa (HS) patients | Proportion of patients achieving clinical response evaluated by the simplified Hidradenitis Suppurativa Clinical Response (HiSCR) after 16 weeks of treatment |
| Secondary objective(s) | Endpoints related to secondary objective(s) |
| To assess the safety and tolerability of anti-CD40 antibody CFZ533 in patients with moderate to severe hidradenitis suppurativa (HS) | Number and severity of AEs Incidence of changes in safety laboratory, vital sign and ECG parameters Physical examination and vital signs at baseline and repeatedly until study completion visit |
| To evaluate the effect of anti-CD40 antibody CFZ533 versus placebo on clinical outcome assessments over time | Hidradenitis suppurativa - physician global assessment (HS-PGA) score over time Inflammatory nodule count over time Abscesses count over time Draining fistulae count over time Non-inflamed nodules count over time |
| To evaluate the effect of the anti-CD40 antibody CFZ533 to reduce HS flares versus respective placebo | Proportion of patients who experience at least one flare over 16 weeks of treatment Flare is defined as an at least 25% increase in total abscess and inflammatory nodule counts (AN counts) with a minimum increase of 2 AN relative to baseline. |
| To assess the effect of the anti-CD40 antibody CFZ533 compared to placebo on patient reported outcomes | Dermatology Life Quality Index (DLQI) Patient's Global Assessment Proportion of patients achieving NRS30 after 16 weeks of treatment, among patients with baseline Skin Pain NRS ≥ 3 Number of new boils or existing boils which flare up in the past four weeks. |

3. Key Inclusion Criteria

Male and female subjects, 18 to 65 years of age, with clinically diagnosed HS for at least 12 months prior to Screening A total of at least 5 inflammatory lesions, i.e., abscesses and/or inflammatory nodules, and No more than 10 fistulae, and At least two anatomical area need to be involved with HS lesions Subject must have a minimal body weight of 50 Kg (inclusive)

4. Key Exclusion Criteria

Use of investigational drugs at the time of screening, or within 30 days of enrollment or 5 half-lives of enrollment or until the expected pharmacodynamic effect has returned to baseline, whichever is longer; or longer if required by local regulations.

Use of IL12 and IL23 blocking biologics such as ustekinumab or guselkumab within the last 6 months prior to randomization/first treatment.

Use of B-cell targeting or B-cell depleting biologics or similar such as rituximab or belilumab within 12 months; For patient who received these drugs earlier, B cellcount must be within normal range.

Use of biological immunomodulating agents other than above (e.g., adalimumab, secukinumab, etanercept, infliximab, etc.) 3 months prior to randomization/first treatment or 5 half-lives (whichever is longer);

Use of rituximab or belilumab within 12 months;

Use of any systemic treatment for HS in the last 4 weeks prior to randomization (such as retinoids or other immunomodulating therapies, e.g., methotrexate, cyclosporine A, corticosteroids).

Use of cyclophosphamide within the last 6 months

Use of systemic antibiotics for HS in the last week prior to randomization/first treatment If spironolactone or other antiandrogens (finasteride, cyproterone acetate, etc.) are used (for HS), only patients with a stable dose for the last 3 months and who are planning to continue for the duration of the study are eligible.

Surgical treatment for HS in the last 4 weeks prior to randomization/first treatment. Surgical treatment does not include sporadic excisional biopsies Receipt of any high injected corticosteroid bolus (>1 mg/kg) within 3 months 5. Treatment The investigational drugs, iscalimab, and their corresponding matching placebos, is prepared by Novartis and supplied to the investigational site as double-blinded medication kits. Details on the requirements for storage and management of study treatment, and instructions to be followed for subject numbering, prescribing/dispensing and taking study treatment, are outlined in the Site Operations Manual/Pharmacy Manual.

For iscalimab, the dosage form of the supplied drug is a "ready to use" aqueous buffered sterile solution, also referred to as "CFZ533 Concentrate for injection (liquid in vial)". The solution contains 150 mg/ml iscalimab and the excipients L-histidine, sucrose, and polysorbate 20, pH 6.0±0.5. The placebo control, selected for this study, is a solution with a matching composition of inactive excipients.

Subjects will receive iscalimab, 600 mg (2 injections of 2 mL; weekly then bi-weekly) s.c. or its corresponding placebo (2×2 mL) s.c.

Subjects will be randomized to the investigational treatment arm or its corresponding placebo in a 2:1 ratio. The maximum treatment duration will not exceed 16 weeks.

ENUMERATED EMBODIMENTS

1. A method of treating hidradenitis suppurativa in a human subject, comprising administering a therapeutically effective dose of CD40 antagonist to said subject.

2. The method according to embodiment 1, wherein the CD40 antagonist is an anti-CD40 antibody selected from the group consisting of:
a) an anti-CD40 antibody comprising an immunoglobulin VH domain comprising the amino acid sequence of SEQ ID NO: 7 and an immunoglobulin VL domain comprising the amino acid sequence of SEQ ID NO: 8;
b) an anti-CD40 antibody comprising an immunoglobulin VH domain comprising the hypervariable regions set forth as SEQ ID NO: 1, SEQ ID NO: 2, and SEQ ID NO: 3 and an immunoglobulin VL domain comprising the hypervariable regions set forth as SEQ ID NO: 4, SEQ ID NO: 5 and SEQ ID NO: 6;
c) an anti-CD40 antibody comprising an immunoglobulin VH domain comprising the amino acid sequence of SEQ ID NO: 7 and an immunoglobulin VL domain comprising the amino acid sequence of SEQ ID NO: 8, and an Fc region of SEQ ID NO: 13;
d) an anti-CD40 antibody comprising an immunoglobulin VH domain comprising the amino acid sequence of SEQ ID NO: 7 and an immunoglobulin VL domain comprising the amino acid sequence of SEQ ID NO: 8, and an Fc region of SEQ ID NO: 14; and
e) an anti-CD40 antibody comprising a silent Fc IgG1 region.

3. The method of treatment according to embodiment 1 or 2, wherein the antibody comprises the heavy chain amino acid sequence of SEQ ID NO: 9 and the light chain amino acid sequence of SEQ ID NO: 10; or the heavy chain amino acid sequence of SEQ ID NO: 11 and the light chain amino acid sequence of SEQ ID NO: 12.

4. The method according to any of the above embodiments, wherein the antibody is administered subcutaneously or intravenously, or a combination of subcutaneous or intravenous.

5. The method according to any the above embodiments, wherein the antibody is administered as a dose of about 3 mg to about 30 mg active ingredient per kilogram of a human subject.

6. The method according to embodiment 5, wherein the dose is about 10 mg active ingredient per kilogram of the human subject.

7. The method according to any of the above embodiments, wherein the antibody is administered as a dose of about 150 mg to about 600 mg active ingredient, such as about 300 mg active ingredient.

8. The method according to embodiment 7, wherein the dose is 150 mg active ingredient, 300 mg active ingredient or 600 mg active ingredient.

9. The method according to any of the above embodiments, wherein the antibody is administered with a loading dosing and a maintenance dosing.

10. The method according to embodiment 9, wherein the loading dosing is administered via subcutaneous injections of a first dose and the maintenance dosing is administered via subcutaneous injections of a second dose.

11. The method according to embodiment 10, wherein the first dose is between about 150 mg and about 600 mg active ingredient, such as about 300 mg active ingredient and the second dose is between about 150 mg and about 600 mg active ingredient, such as about 300 mg active ingredient.

12. The method according to embodiment 11, wherein the first dose is 150 mg, 300 mg or 600 mg active ingredient and the second dose is 150 mg, 300 mg or 600 mg active ingredient.

13. The method according to any embodiments 10 to 12, wherein the loading dosing comprises at least two subcutaneous injections and the maintenance dosing consists of weekly (Q1W), biweekly (Q2W) or monthly (Q4W) subcutaneous injections.

14. The method according to embodiment 13, wherein at least two subcutaneous injections of the loading dosing are different doses.

15. The method according to any of the above embodiments, wherein the antibody is administered together with one or more pharmaceutically acceptable carriers.

16. The method according to any of the above embodiments, wherein the patient is selected according to one of the following criteria:
a) the patient has moderate to severe HS;
b) the patient is an adult;
c) the patient is an adolescent;
d) prior to treatment with the CD40 antagonist, the patient has an HS-PGA score of ≥3;
e) prior to treatment with the CD40 antagonist, the patient has at least 3 inflammatory lesions; or
f) prior to treatment with the CD40 antagonist, the patient does not have extensive scarring (<10 fistulas) as a result of HS.

17. The method according to any of the above embodiments, wherein said patient achieves by week 16 of treatment at least one of the following:
a) a simplified HiSCR;
b) a reduction in HS flares;
c) a NRS30;
d) a reduction of ≤6 as measured by the DLQI; and/or
e) an improvement in DLQI.

18. The method according to any of the above embodiments, wherein, when said method is used to treat a population of patients with moderate to severe HS, at least 40% of said patients achieve a simplified HiSCR by week 16 of treatment.

19. The method according to any of embodiments 1 to 11, wherein, when said method is used to treat a population of patients with moderate to severe HS, or at least 25% of said patients achieve an NRS30 response by week 16 of treatment.

20. The method according to any of the above embodiments, wherein, when said method is used to treat a population of patients with moderate to severe HS, less than 15% of said patients experience an HS flare during 16 weeks of treatment.

21. The method according to any of the above embodiments, wherein the patient is treated with the CD40 antagonist for at least 16 weeks.

22. The method according to any of the above embodiments, wherein the patient has at least one of the followings as early as one week after the first dose of the CD40 antagonist:
a) a rapid reduction in pain, as measured by VAS or NRS;
b) a rapid reduction in CRP, as measured using a standard CRP assay.

23. The method according to any of the above embodiments, wherein said patient achieves a sustained response 3 months after the end of treatment, as measured by inflammatory lesion count, Hidradenitis Suppurativa Clinical Response (HiSCR), Numerical Rating Scale (NRS), modified Sartorius HS score, Hidradenitis Suppurativa-Physician Global Assessment (HS-PGA), or Dermatology Life Quality Index (DLQI).

24. The method according to embodiment 23, wherein said patient achieves a sustained response 3 months after the end of treatment, as measured by the simplified HiSCR (sHiSCR).

25. Use of a liquid pharmaceutical composition comprising a an anti-CD40 antibody, a buffer, a stabilizer and a solubilizer, and means for subcutaneously administering the anti-CD40 antibody to a patient having hidradenitis suppurativa, for the manufacture of a medicament for the treatment of hidradenitis suppurativa, wherein the anti-CD40 antibody:

is to be subcutaneously administered with a first loading dosing; and thereafter, with a second maintenance dosing, wherein said anti-CD40 antibody is selected from the group consisting of:

an anti-CD40 antibody comprising an immunoglobulin VH domain comprising the amino acid sequence of SEQ ID NO: 7 and an immunoglobulin VL domain comprising the amino acid sequence of SEQ ID NO: 8;

an anti-CD40 antibody comprising an immunoglobulin VH domain comprising the hypervariable regions set forth as SEQ ID NO: 1, SEQ ID NO: 2, and SEQ ID NO: 3 and an immunoglobulin VL domain comprising the hypervariable regions set forth as SEQ ID NO: 4, SEQ ID NO: 5 and SEQ ID NO: 6;

an anti-CD40 antibody comprising an immunoglobulin VH domain comprising the amino acid sequence of SEQ ID NO: 7 and an immunoglobulin VL domain comprising the amino acid sequence of SEQ ID NO: 8, and an Fc region of SEQ ID NO: 13;

an anti-CD40 antibody comprising an immunoglobulin VH domain comprising the amino acid sequence of SEQ ID NO: 7 and an immunoglobulin VL domain comprising the amino acid sequence of SEQ ID NO: 8, and an Fc region of SEQ ID NO: 14;

an anti-CD40 antibody comprising a silent Fc IgG1 region: and an anti-CD40 antibody comprising the heavy chain amino acid sequence of SEQ ID NO: 9 and the light chain amino acid sequence of SEQ ID NO: 10; or the heavy chain amino acid sequence of SEQ ID NO: 11 and the light chain amino acid sequence of SEQ ID NO: 12.

REFERENCES

Andersen R K, Jemec G B (2017) Treatments for hidradenitis suppurativa. Clin. Dermatol. p. 218-224.

Bettoli V, Zauli S, Virgili A (2016) Oral clindamycin and rifampicin in the treatment of hidradenitis suppurativa-acne inversa: can some factors influence the response to the treatment? G Ital Dermatol Venereol p. 216-8.

Blok J L, Li K, Brodmerkel C, et al (2016) Ustekinumab in hidradenitis suppurativa: clinical results and a search for potential biomarkers in serum. Br. J. Dermatol. p. 839-46.

Boumpas D T, Furie R, Manzi S, Illei G G, Wallace D J, Balow J E et al. A short course of BG9588 (anti-CD40 ligand antibody) improves serologic activity and decreases hematuria in patients with proliferative lupus glomerulonephritis. Arthritis Rheum 2003; 48(3):719-727.

Cordoba F, Wieczorek G, Audet M, Roth L, Schneider M A, Kunkler A et al. A novel, blocking, Fcsilent anti-CD40 monoclonal antibody prolongs nonhuman primate renal allograft survival in the absence of B cell depletion. Am J Transplant 2015; 15(11):2825.

Deckers I E, Kimball A B (2016) The Handicap of Hidradenitis Suppurativa. Dermatol Clin p. 17-22.

Dessinioti C, Zisimou C, Tzanetakou V, et al (2016) Oral clindamycin and rifampicin combination therapy for hidradenitis suppurativa: a prospective study and 1-year follow-up. Clin. Exp. Dermatol. p. 852-857.

Esmann S, Jemec G B (2011) Psychosocial impact of hidradenitis suppurativa: a qualitative study. Acta Derm. Venereol. p. 328-32.

Fimmel S, Zouboulis C C (2010) Comorbidities of hidradenitis suppurativa (acne inversa). Dermatoendocrinol p. 9-16.

Garg A, Wertenteil S, Baltz R, et al (2018) Prevalence Estimates for Hidradenitis Suppurativa among Children and Adolescents in the United States: A Gender- and Age-Adjusted Population Analysis. J. Invest. Dermatol.

Giuseppe P, Nicola P, Valentina C, et al (2018) A Case of Moderate Hidradenitis Suppurativa and Psoriasis Treated with Secukinumab. Ann Dermatol p. 462-464.

Hessam S, Scholl L, Sand M, et al (2018) A Novel Severity Assessment Scoring System for Hidradenitis Suppurativa. JAMA Dermatol p. 330-335.

Ingram J R, Woo P N, Chua S L, et al (2016) Interventions for hidradenitis suppurativa: a Cochrane systematic review incorporating GRADE assessment of evidence quality. Br. J. Dermatol. p. 970-8.

Janse I C, Deckers I E, van der Maten A D, et al (2017) Sexual health and quality of life are impaired in hidradenitis suppurativa: a multicentre cross-sectional study. Br. J. Dermatol. p. 1042-1047.

Jemec G B (2012) Clinical practice. Hidradenitis suppurativa. N. Engl. J. Med. p. 158-64.

Jemec G B, Kimball A B (2015) Hidradenitis suppurativa: Epidemiology and scope of the problem. J. Am. Acad. Dermatol. p. S4-7.

Jørgensen A R, Yao Y, Thomsen S F (2018) Therapeutic Response to Secukinumab in a 36-Year-Old Woman with Hidradenitis Suppurativa. Case Rep Dermatol Med p. 8685136.

Kanni T, Zenker O, Habel M, et al (2018) Complement activation in hidradenitis suppurativa: a new pathway of pathogenesis? Br. J. Dermatol.

Kawabe T, Naka T, Yoshida K, Tanaka T, Fujiwara H, Suematsu S et al. The immune responses in CD40-deficient mice: impaired immunoglobulin class switching and germinal center formation. Immunity 1994; 1(3):167-178.

Kelly G, Sweeney C M, Tobin A M, et al (2014) Hidradenitis suppurativa: the role of immune dysregulation. Int. J. Dermatol. p. 1186-96.

Kimball A B, Kerdel F, Adams D, et al (2012) Adalimumab for the treatment of moderate to severe Hidradenitis suppurativa: a parallel randomized trial. Ann. Intern. Med. p. 846-55.

Kimball A B, et al (2014) Assessing the validity, responsiveness and meaningfulness of the Hidradenitis Suppurativa Clinical Response (HiSCR) as the clinical endpoint for hidradenitis suppurativa treatment. British Journal of Dermatology 171, p. 1434-1442.

Kimball A B, Okun M M, Williams D A, et al (2016) Two Phase 3 Trials of Adalimumab for Hidradenitis Suppurativa. N. Engl. J. Med. p. 422-34.

Lima A L, Karl I, Giner T, et al (2016) Keratinocytes and neutrophils are important sources of proinflammatory molecules in hidradenitis suppurativa. Br. J. Dermatol. p. 514-21.

Mager D E. Target-mediated drug disposition and dynamics. Biochem Pharmacol 2006; 72(1):1-10.

Margesson and Danby (2014) Best Practices and Res. Clin. Ob. And Gyn 28:1013-1027.

Matusiak et al (2017) Increased interleukin (IL)-17 serum levels in patients with hidradenitis suppurativa: Implications for treatment with anti-IL-17 agents. J Am Acad Dermatol; 76:670-5.

Mehling et al (2001) Overexpression of CD40 Ligand in Murine Epidermis Results in Chronic Skin Inflammation and Systemic Autoimmunity. J. Exp. Med. Vol 194, Number 5, p. 615-628.

J. Musilova, A. Malara, S. Kirthi, R. Hambly, R. Hughes, B. Kirby (2018) Patients with hidradenitis suppurativa have abnormalities in circulating B cell subsets (abstract https://onlinelibrary.wiley.com/doi/full/10.1111/exd.13538)

Ng C M, Stefanich E, Anand B S, Fielder P J, Vaickus L. Pharmacokinetics/pharmacodynamics of nondepleting anti-CD4 monoclonal antibody (TRX1) in healthy human volunteers. Pharm Res 2006; 23(1):95-103.

Sartorius et al. (2009) Br. J Dermatol. 161:831-839

Schuch A, Fischer T, Boehner A, et al (2018) Successful Treatment of Severe Recalcitrant Hidradenitis Suppurativa with the Interleukin-17A Antibody Secukinumab. Acta Derm. Venereol. p. 151-152.

Shah A, Alhusayen R, Amini-Nik S (2017) The critical role of macrophages in the pathogenesis of hidradenitis suppurativa. Inflamm. Res. p. 931-945.

Sharon V R, Garcia M S, Bagheri S, et al (2012) Management of recalcitrant hidradenitis suppurativa with ustekinumab. Acta Derm. Venereol. p. 320-1.

Th'ng K H, Garewal G, Kearney L, Rassool F, Melo J V, White H et al. Establishment and characterization of three new malignant lymphoid cell lines. Int J Cancer 1987; 39(1):89-93.

Thorlacius L, Theut Riis P, Jemec G B E (2017) Severe hidradenitis suppurativa responding to treatment with secukinumab: a case report. Br. J. Dermatol.

Tzanetakou V, Kanni T, Giatrakou S, et al (2016) Safety and Efficacy of Anakinra in Severe Hidradenitis Suppurativa: A Randomized Clinical Trial. JAMA Dermatol p. 52-59.

Warncke M, Calzascia T, Coulot M, Balke N, Touil R, Kolbinger F et al. Different adaptations of IgG effector function in human and nonhuman primates and implications for therapeutic antibody treatment. J Immunol 2012; 188(9):4405-4411.

Weber P, Seyed Jafari S M, Yawalkar N, et al (2017) Apremilast in the treatment of moderate to severe hidradenitis suppurativa: A case series of 9 patients. J. Am. Acad. Dermatol. p. 1189-1191.

Zouboulis C C, Desai N, Emtestam L, et al (2015) European S1 guideline for the treatment of hidradenitis suppurativa/acne inversa. J Eur Acad Dermatol Venereol p. 619-44.

The invention claimed is:

1. A method of treating hidradenitis suppurativa in a patient in need thereof, the method comprising administering to the patient an effective amount of a CD40 antagonist, wherein the CD40 antagonist is CFZ533 and comprises a heavy chain amino acid sequence of SEQ ID NO: 9 and a light chain amino acid sequence of SEQ ID NO: 10, and wherein the effective amount is administered with a weekly loading dose of about 600 mg active ingredient, and the effective amount is subsequently administered with an every other week maintenance dose of about 600 mg active ingredient, and the route of administration is subcutaneous.

2. The method of claim 1, wherein the loading dose is administered weekly in weeks 1, 2, 3, 4 and 5.

3. The method of claim 2, wherein the maintenance dose is administered every other week beginning in week 7.

4. The method of claim 1, wherein the patient has moderate to severe hidradenitis suppurativa.

* * * * *